United States Patent [19]
Mueller et al.

[11] 3,828,660
[45] Aug. 13, 1974

[54] MACHINE FOR MAKING ICE CREAM COOKIE SANDWICHES AND SIMILAR FOOD PRODUCTS

[75] Inventors: Martin Mueller, Glenview, Ill.; Mason C. Wingo, Roanoke, Va.

[73] Assignee: Bates Packaging Service, Inc., Des Plaines, Ill.

[22] Filed: May 26, 1972

[21] Appl. No.: 257,400

[52] U.S. Cl.................. 99/450.4, 53/180, 99/450.7
[51] Int. Cl....... A21c 9/04, A21c 15/02, B65b 9/06
[58] Field of Search............ 99/450.4, 450.5, 450.7, 99/357, 171 R, 171 LP; 53/180, 182, 28, 33; 221/253

[56] References Cited
UNITED STATES PATENTS

| | | | |
|---|---|---|---|
| 2,348,400 | 5/1944 | Manspeaker | 221/253 X |
| 2,868,141 | 1/1959 | Griner | 99/450.4 |
| 2,875,708 | 3/1959 | Hensgen | 99/450.4 |
| 2,886,930 | 5/1959 | Martin | 53/180 |
| 2,910,017 | 10/1959 | Oakes | 99/450.4 |
| 2,993,453 | 7/1961 | Fay | 99/450.4 X |
| 3,544,340 | 12/1970 | Miller et al. | 53/180 X |
| 3,667,971 | 6/1972 | Brunner | 99/450.7 X |
| R25,072 | 10/1961 | Monaco | 99/450.4 |

Primary Examiner—Billy J. Wilhite
Assistant Examiner—Alan I. Cantor
Attorney, Agent, or Firm—Charles B. Cannon

[57] ABSTRACT

A machine for making ice cream cookie sandwiches and similar edible food products such, for example, as soft cheese cookie or wafer sandwiches; all hereinafter referred to as ice cream cookie sandwiches. At the first work station a first storage magazine or hopper is provided for the first or bottom cookies, wafer, or the like, from which the first or bottom cookies are deposited, one at a time, onto a guideway, or trackway along which they are moved by an endless conveyor unit which embodies article-advancing means, and by which the first or bottom cookie or wafer is carried to a second work station where a measured quantity of ice cream, or like edible body, is deposited from a rotary extruder head device onto the upper surface of the first or bottom cookie or wafer to form the edible filler body in the completed ice cream cookie sandwich, or the like. The first or bottom cookie or wafer with the ice cream filler body thereon is then moved along the guideway or trackway by the endless conveyor and the article-advancing means thereon to a third work station where a second or top cookie or wafer is deposited from a second storage magazine or hopper onto the upper surface of the edible filler body of ice cream, or the like. The thus formed ice cream cookie sandwich is then moved along the guideway or trackway by the endless conveyor and its article-advancing means to a fourth work station where it is wrapped in a web of flexible, heat-sealable water-resistant sheet wrapping material such, for example, as waxed paper, flexible plastic wrapping film, or the like. The wrapped ice cream cookie sandwich is then moved further along the guideway or trackway by the endless conveyor and its article-advancing means to a fifth work station where the parallel bottom edge portions of the flexible, heat-sealable water-resistant wrapper are heat-sealed to each other; then to a sixth work station at which the parallel end edge portions of the flexible, heat-sealable water-resistant wrapper are heat-sealed together; and finally to a seventh and final work station at which the thus wrapped and heat-sealed ice cream cookie sandwiches are severed or cut from each other, in a chain of the same, by a web-cutting or web-severing device and are delivered to a take-away or delivery conveyor for delivery to a freezer for storage or for use.

39 Claims, 96 Drawing Figures

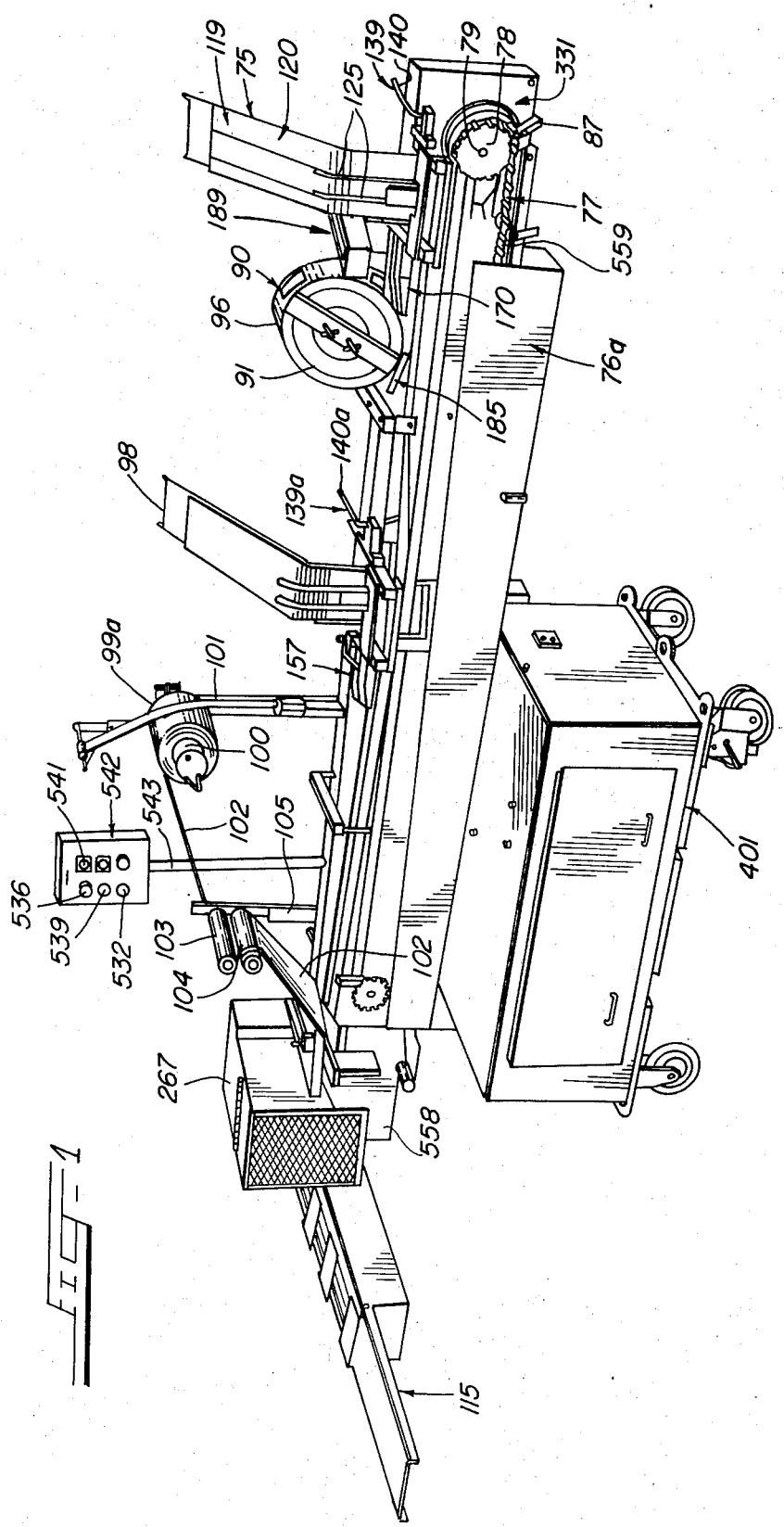

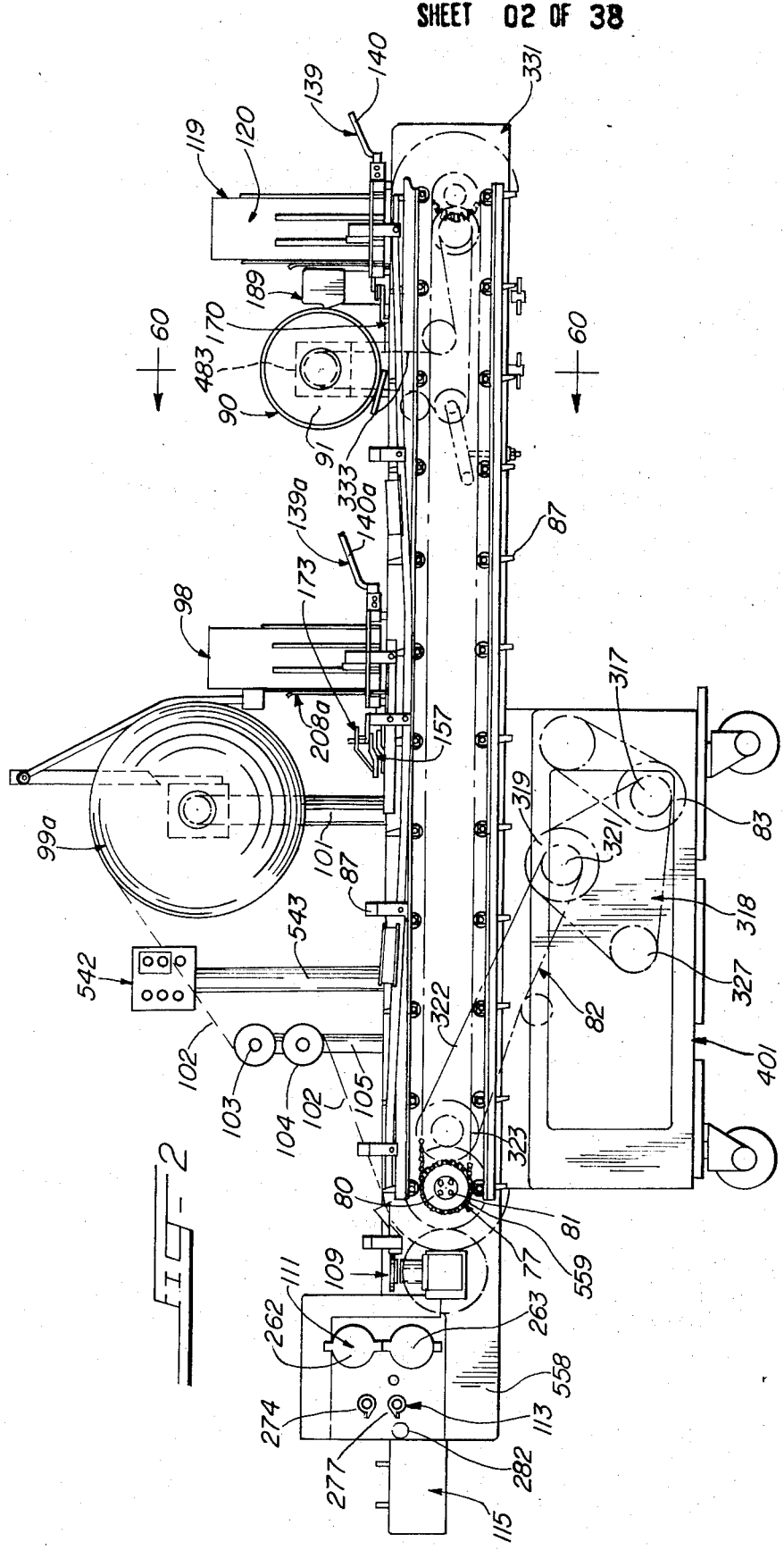

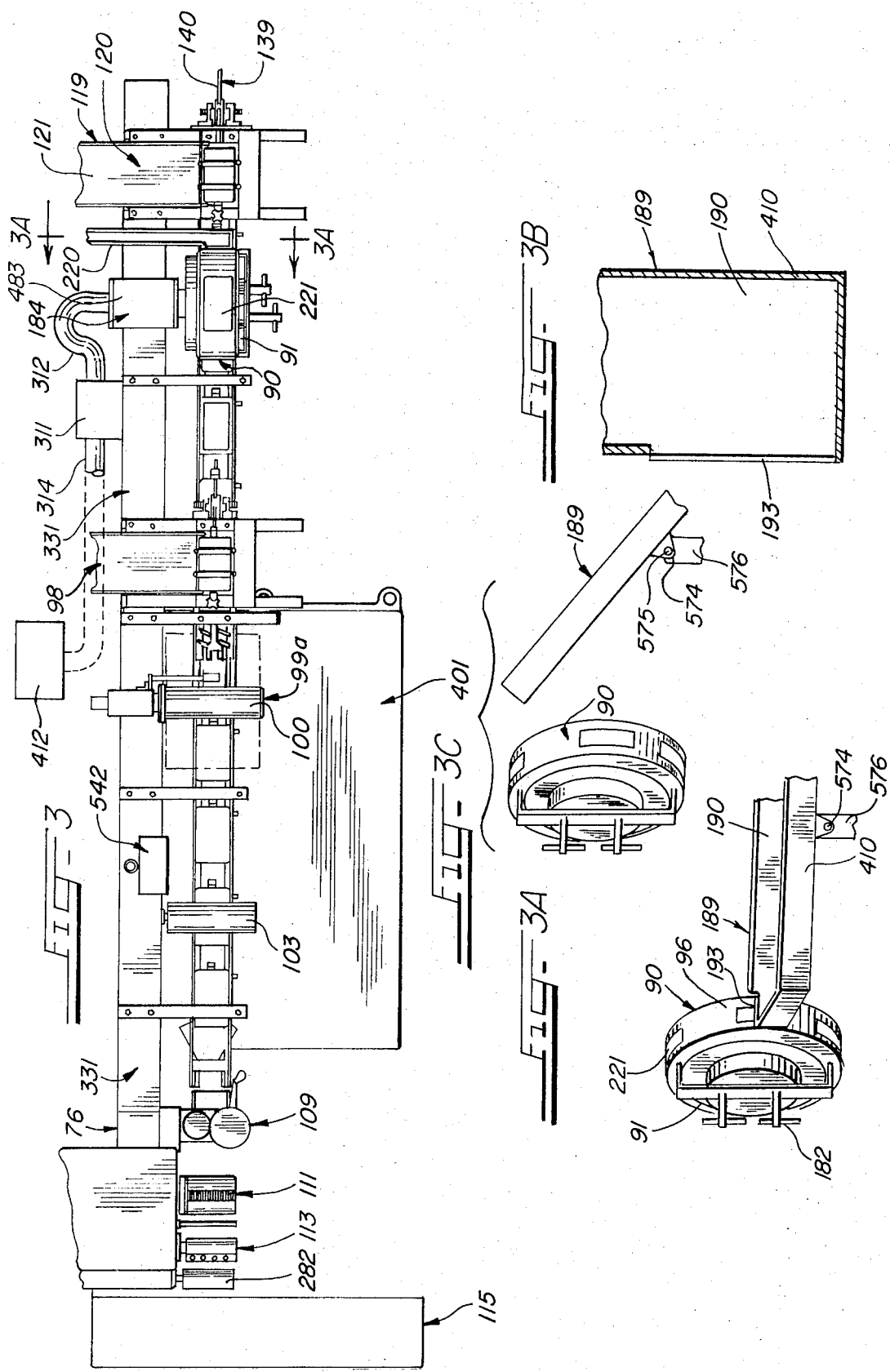

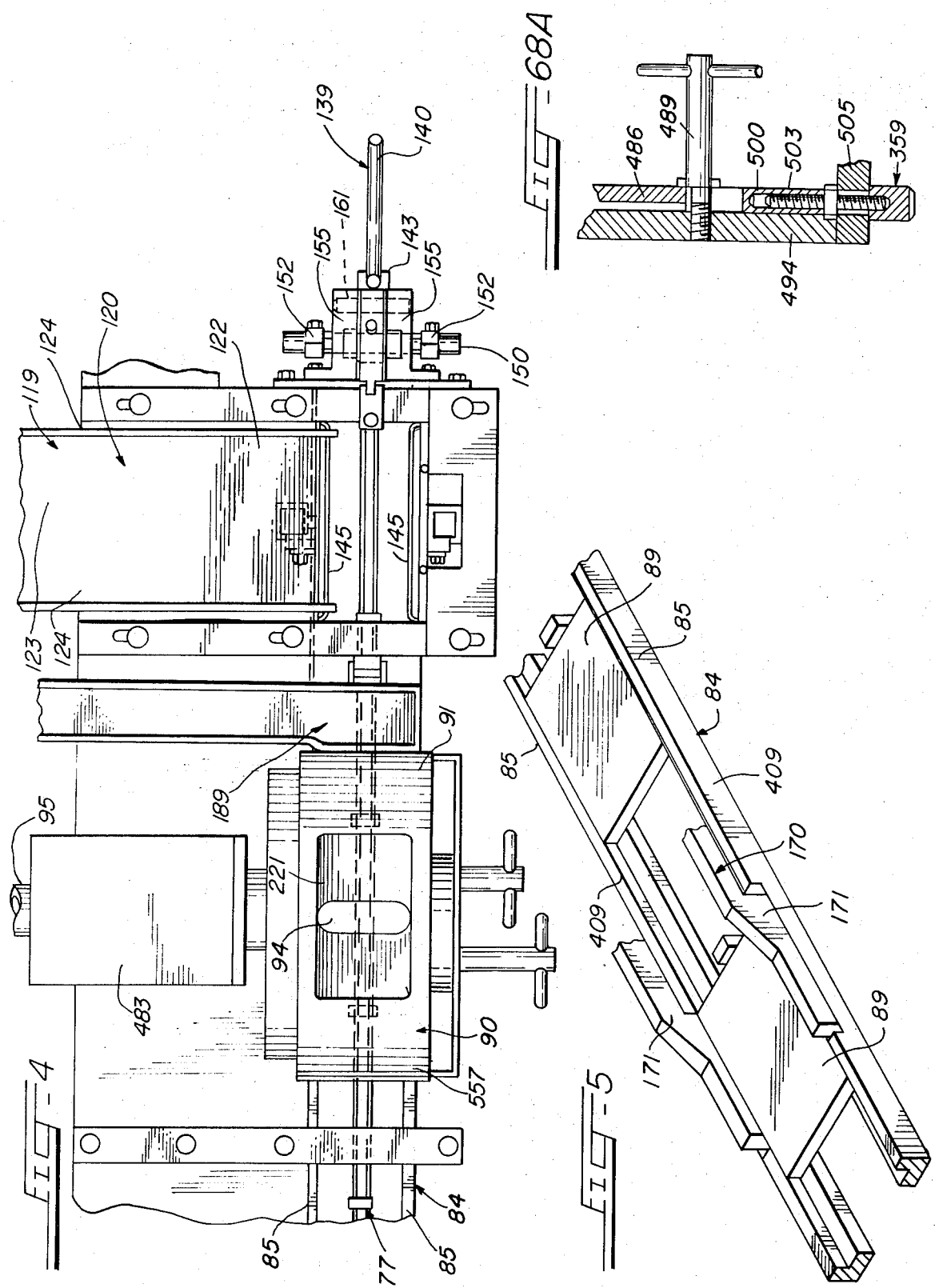

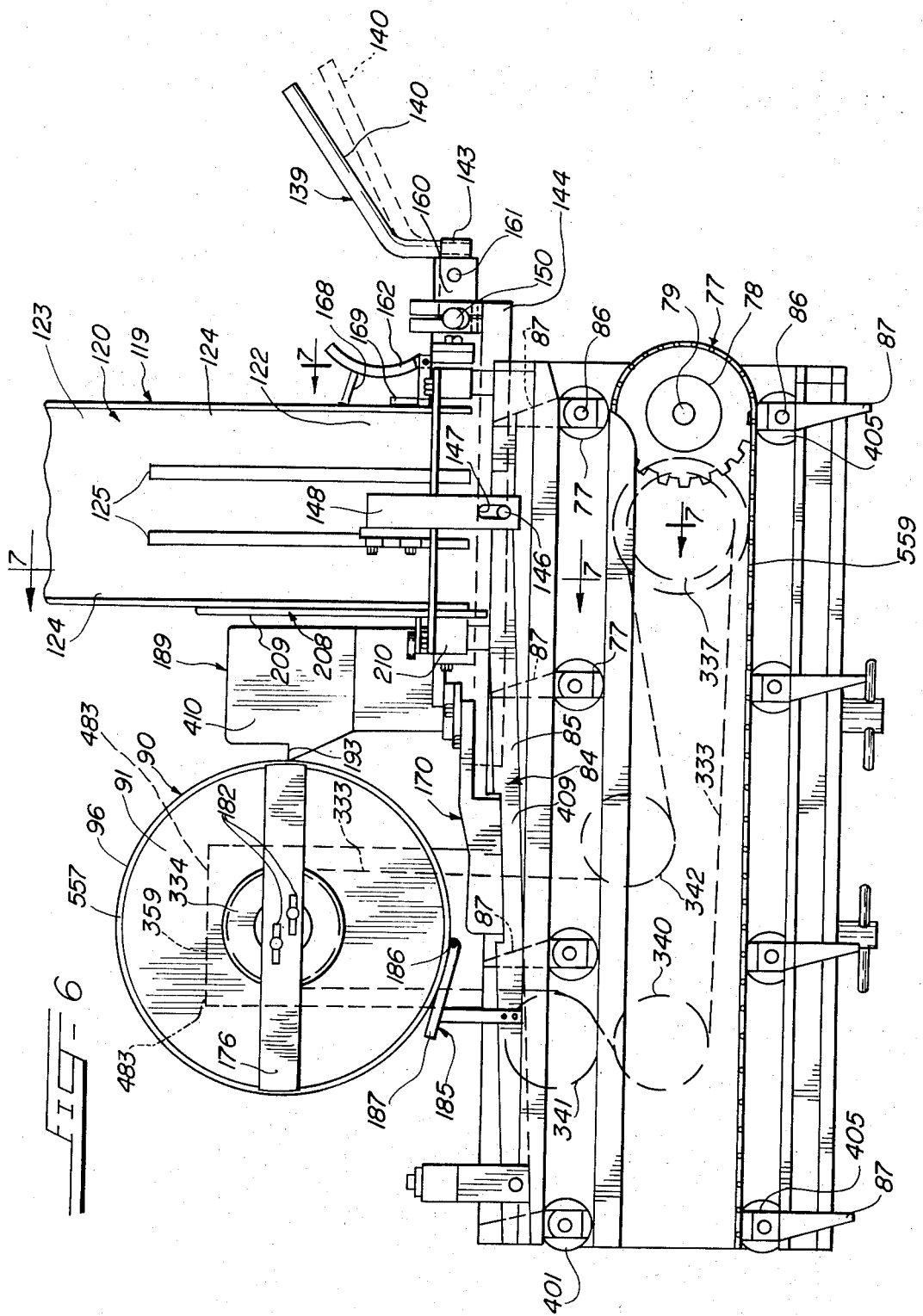

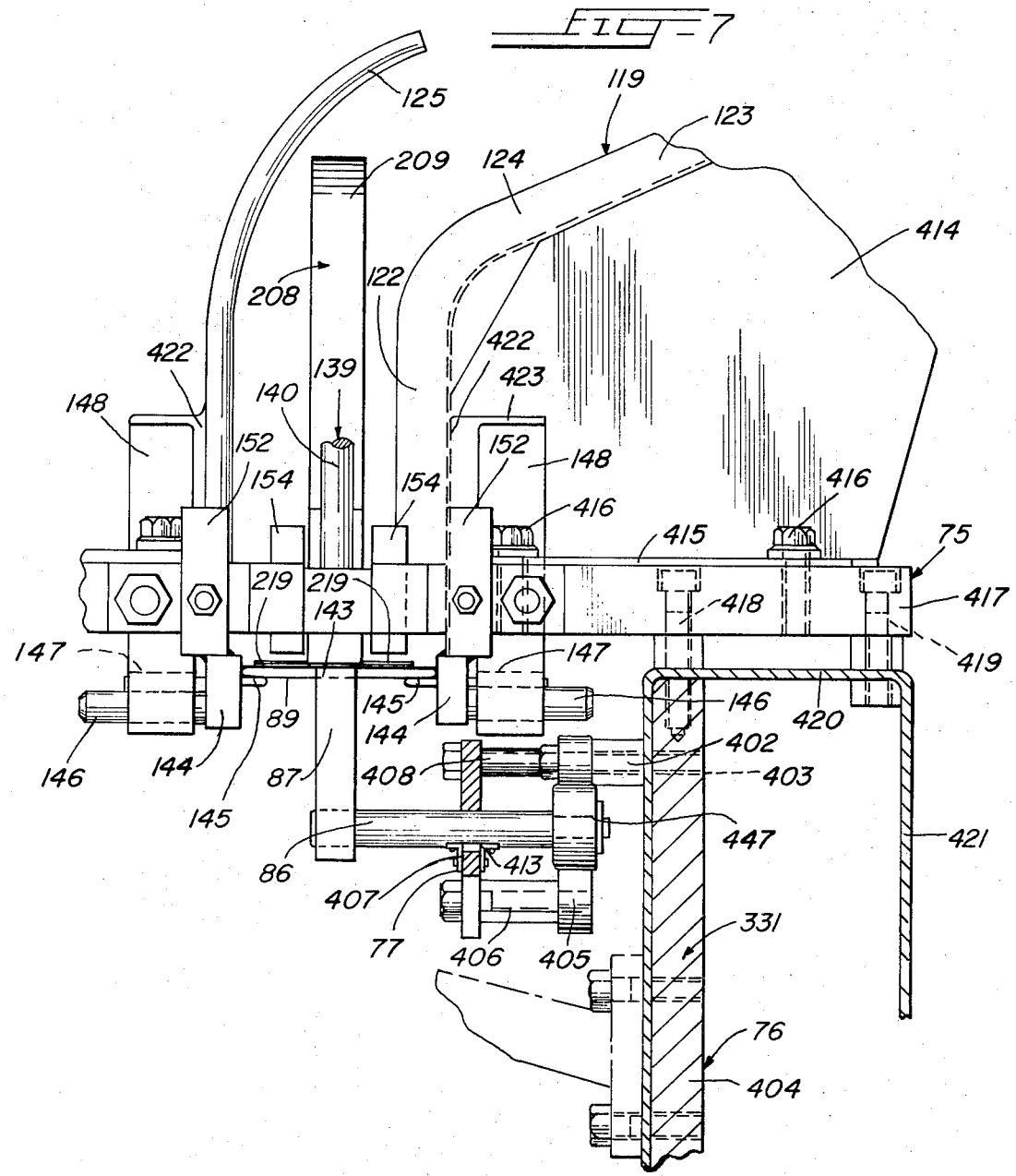

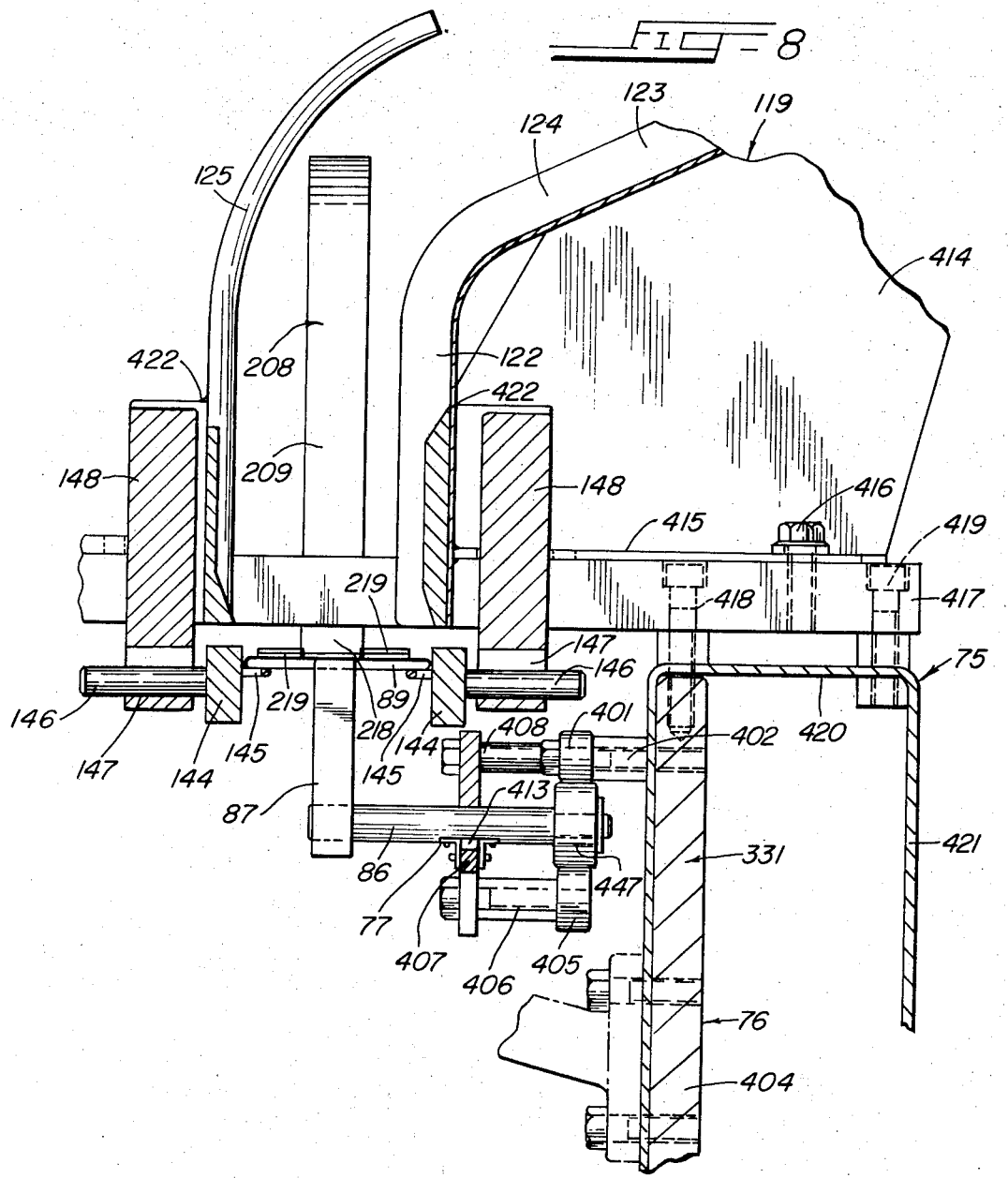

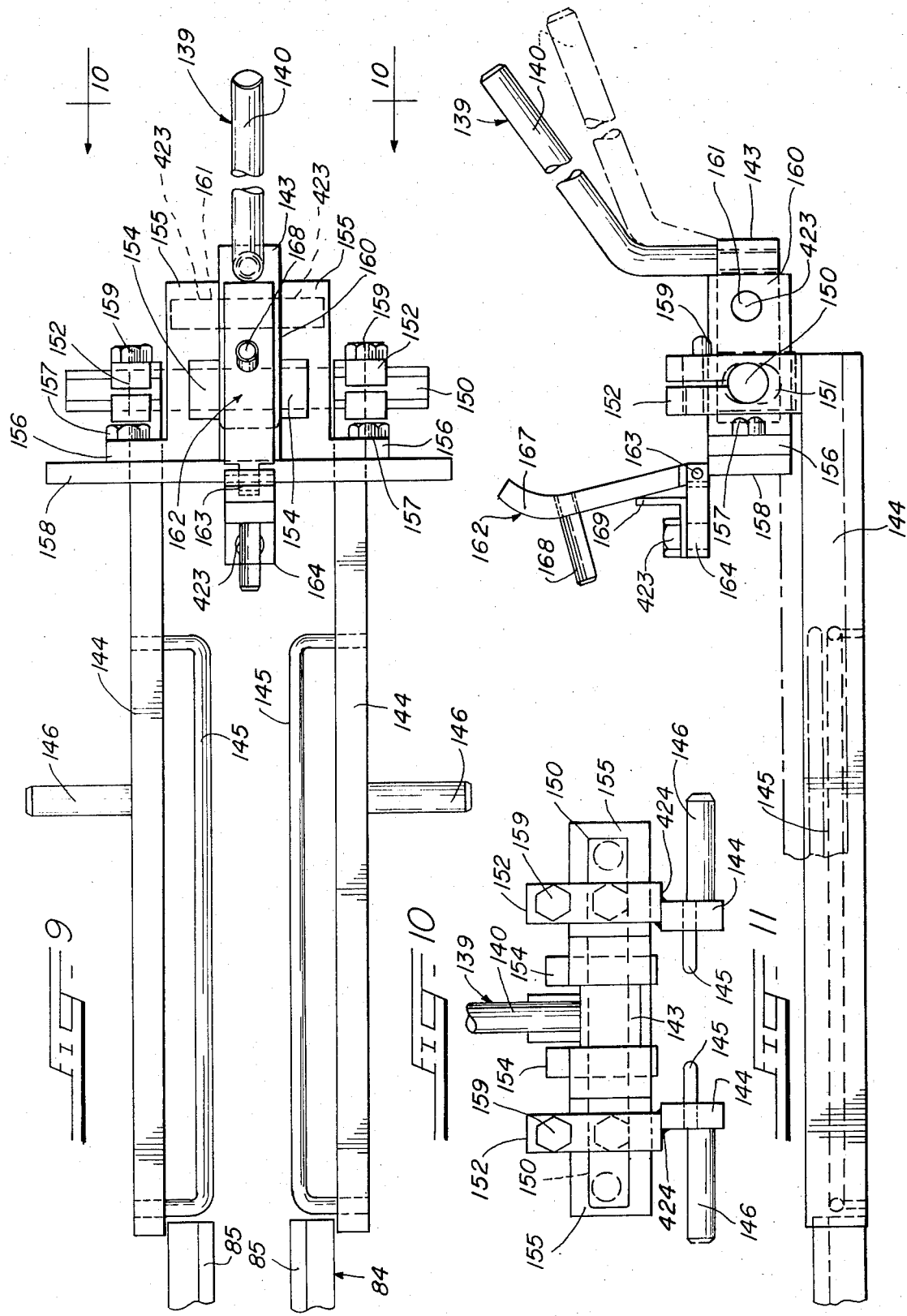

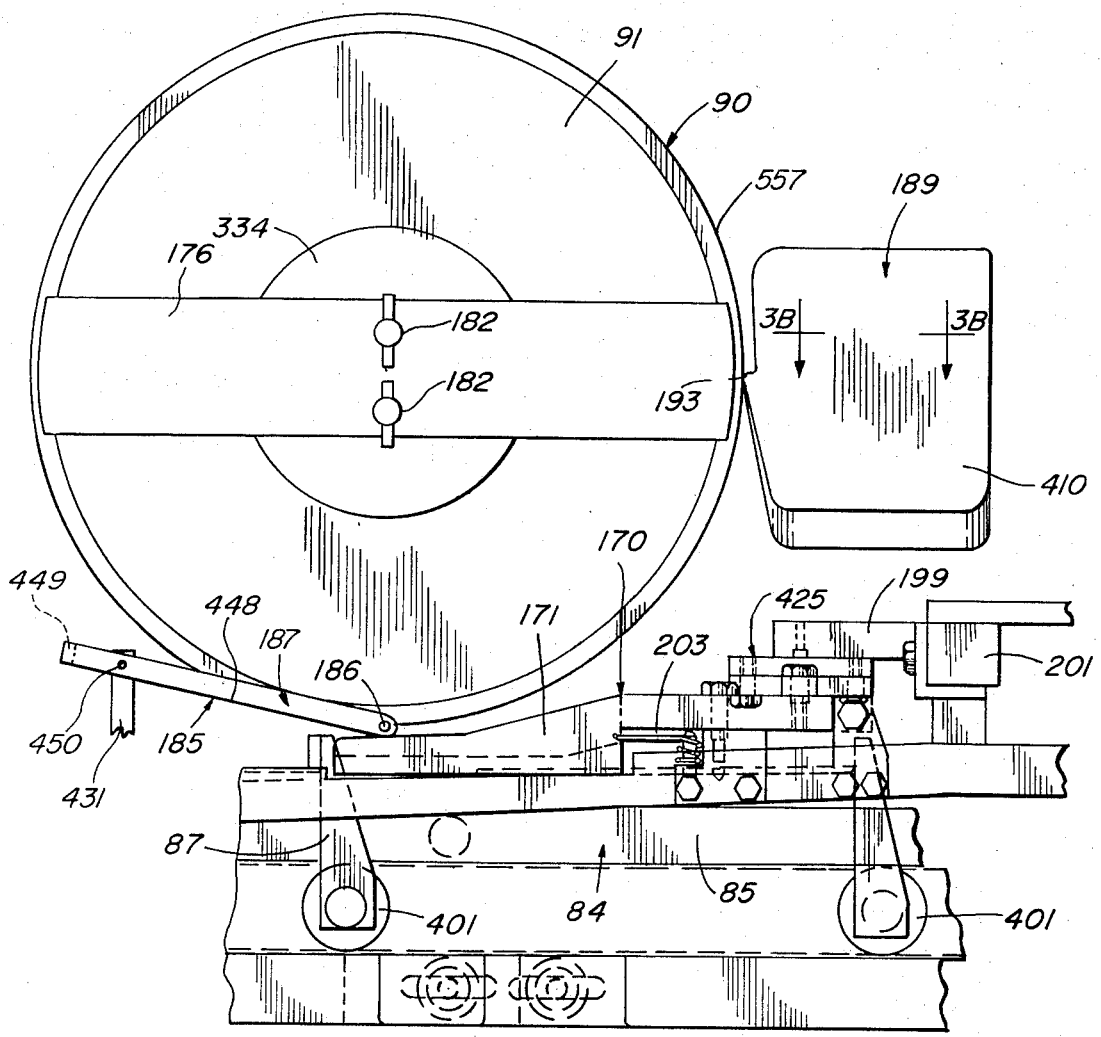
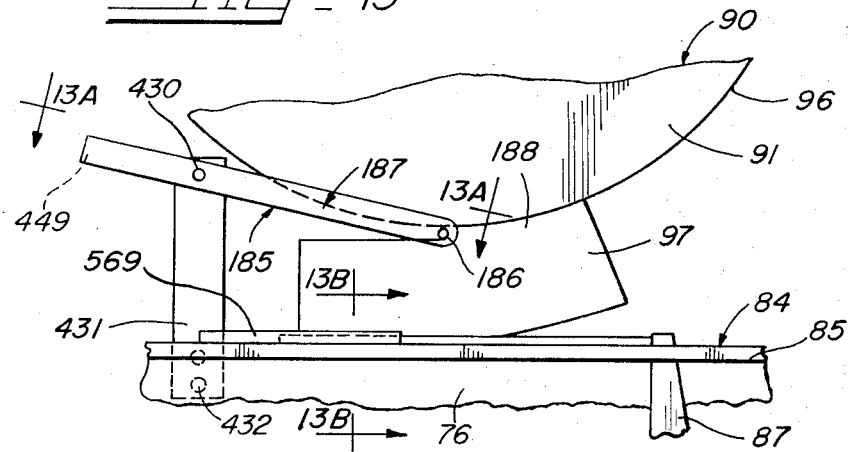

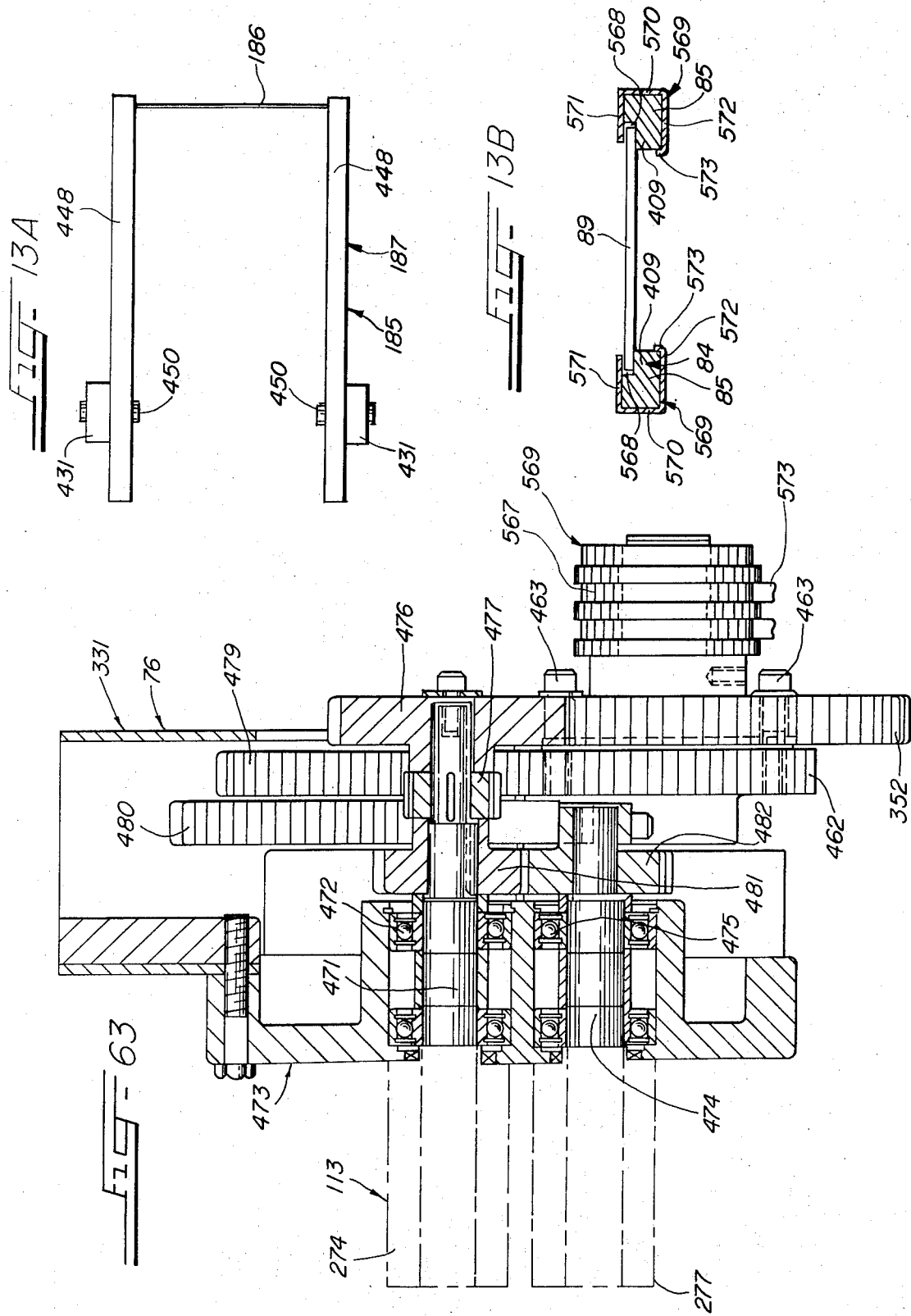

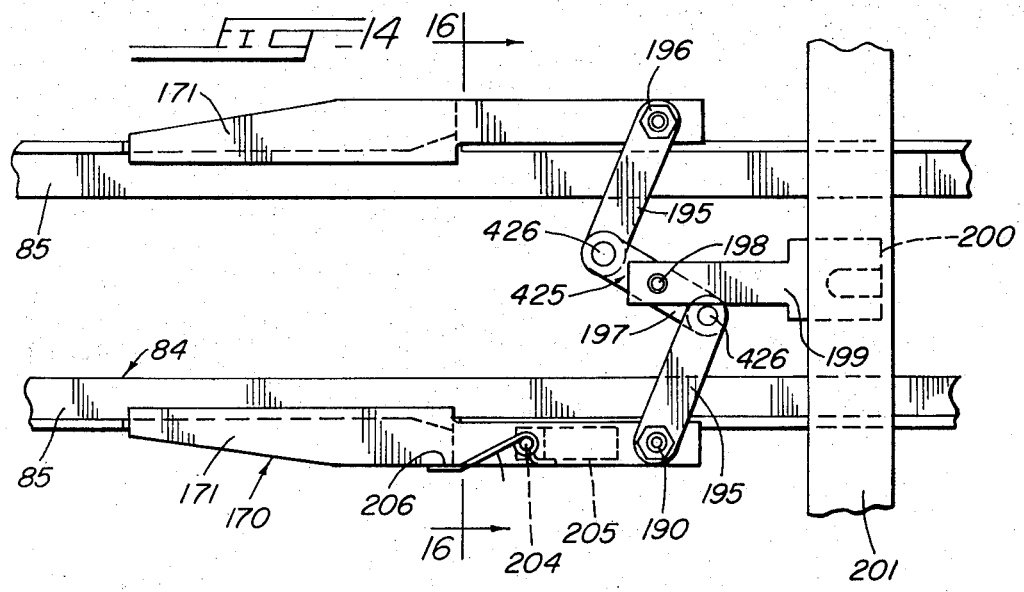
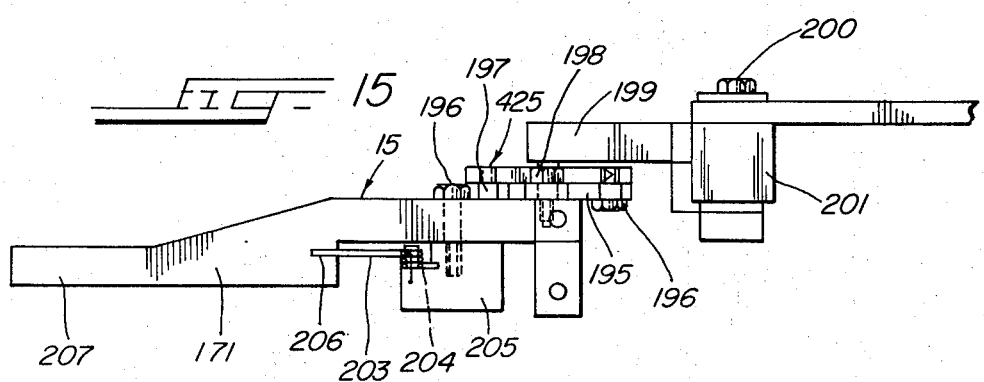
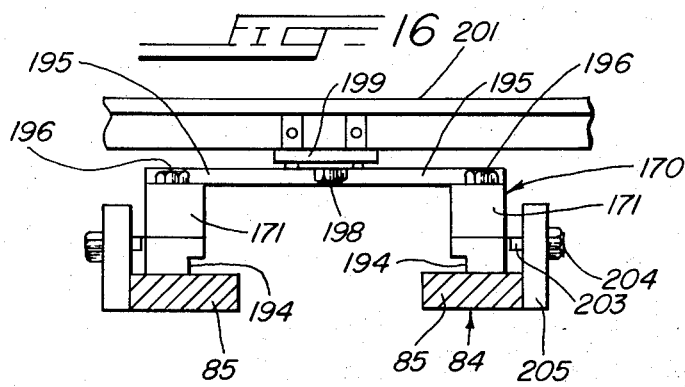

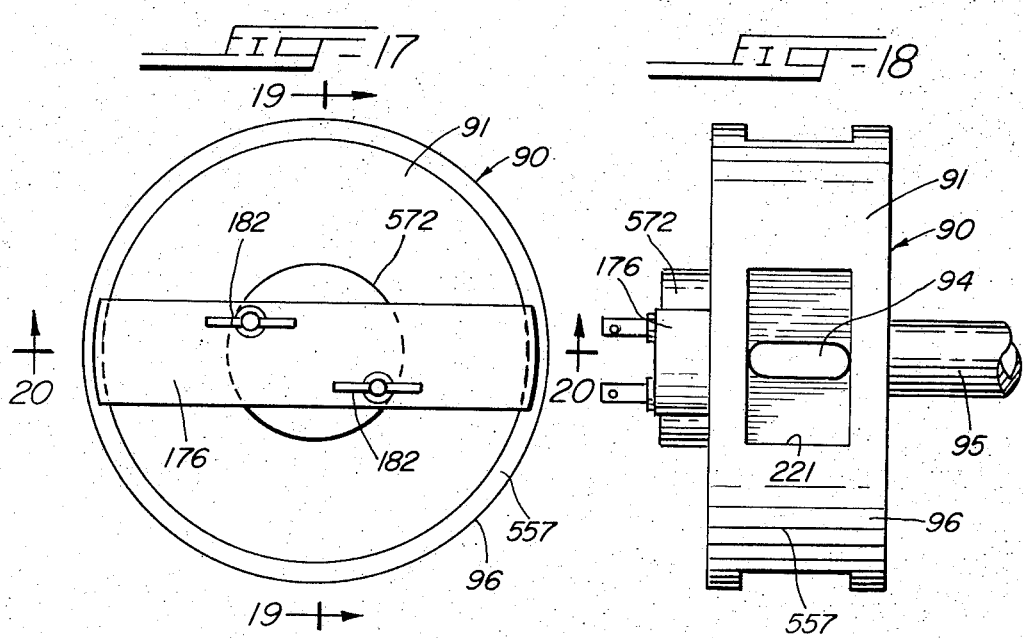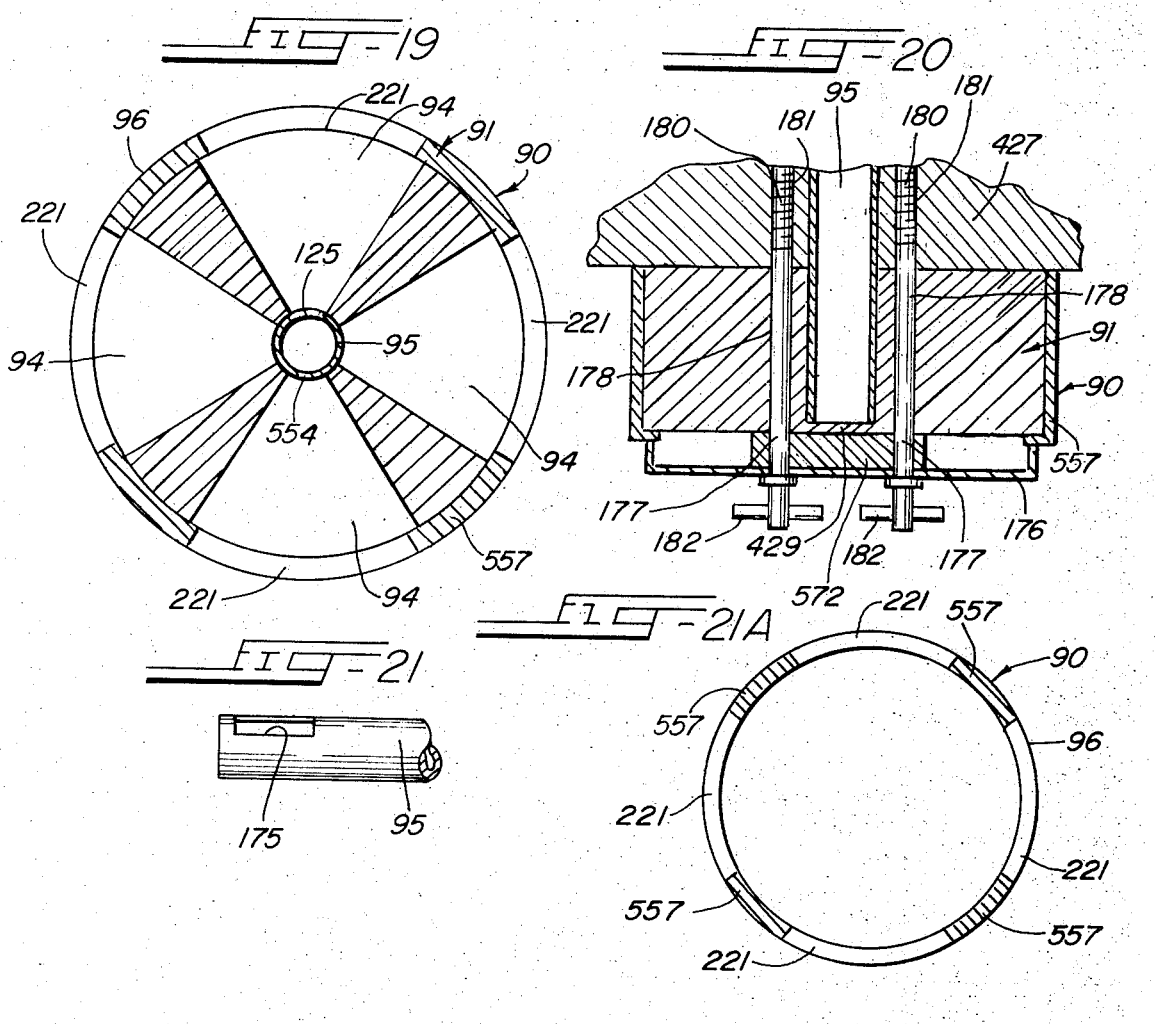

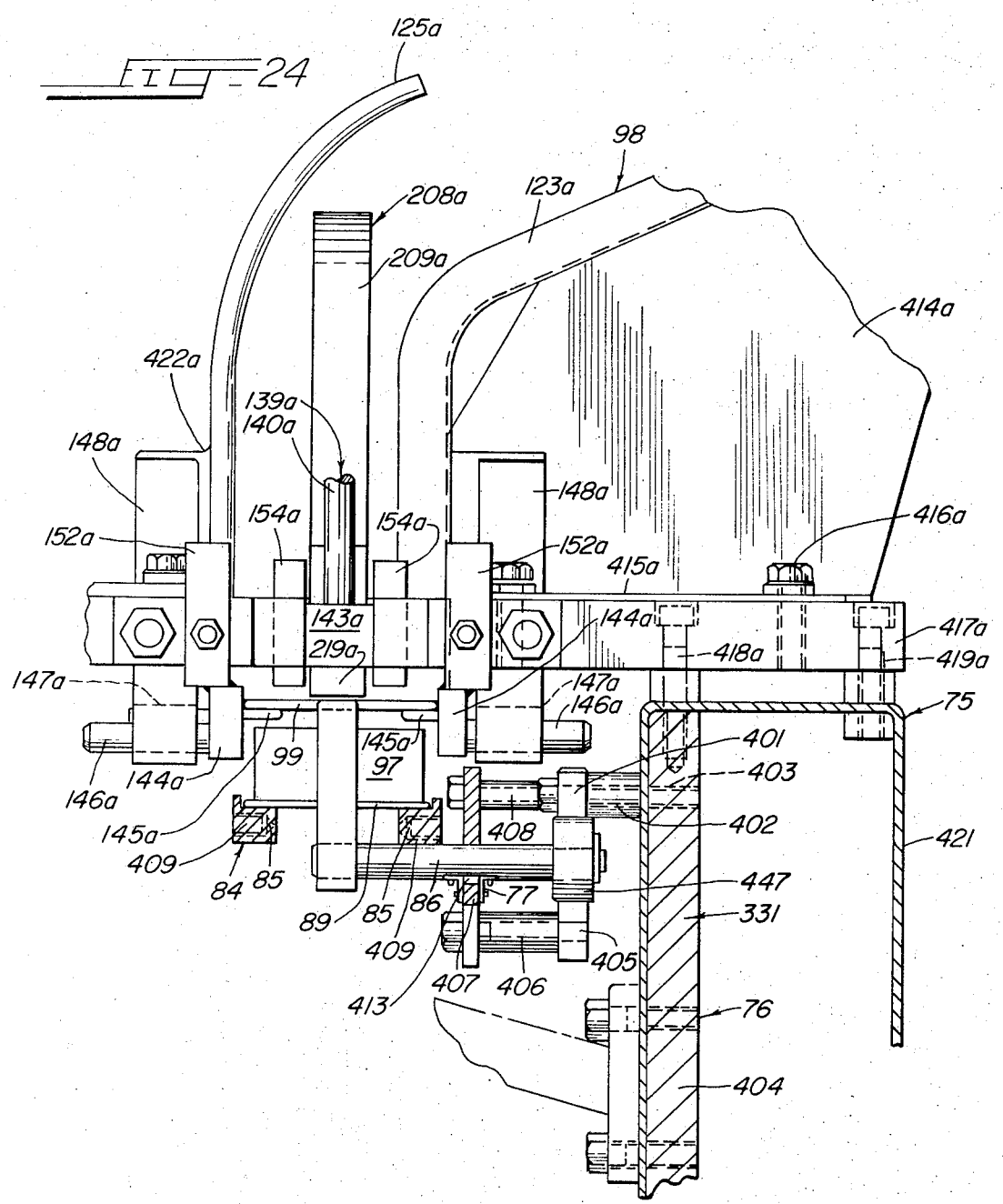

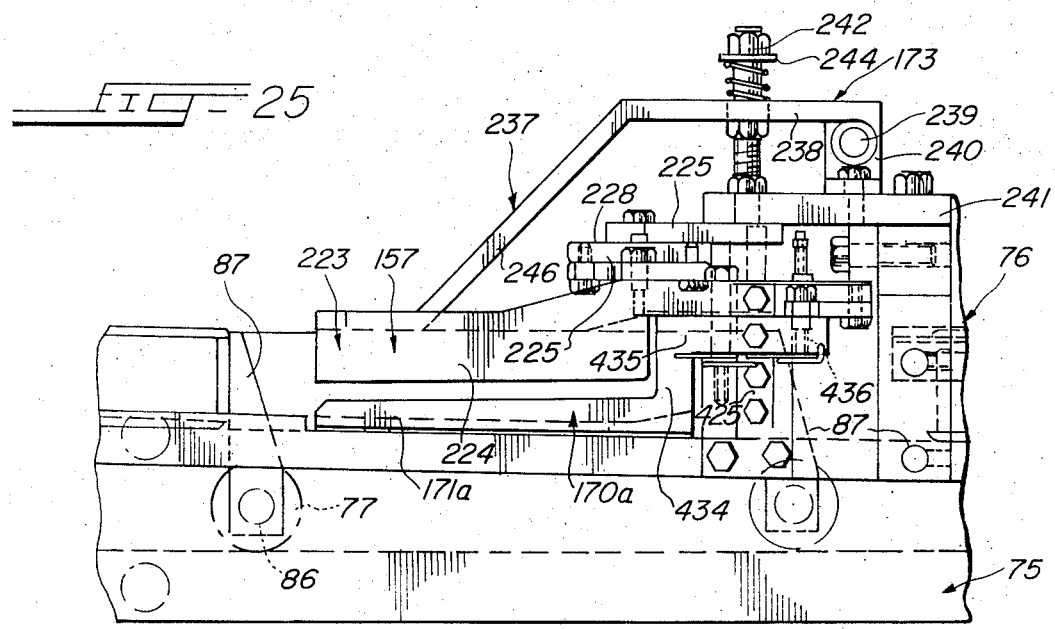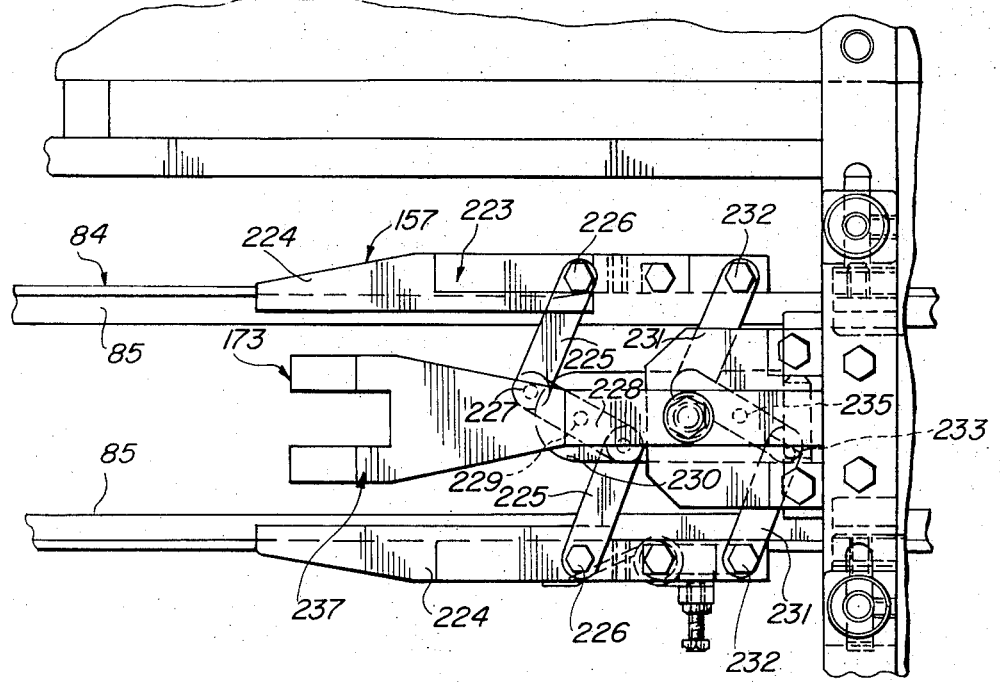

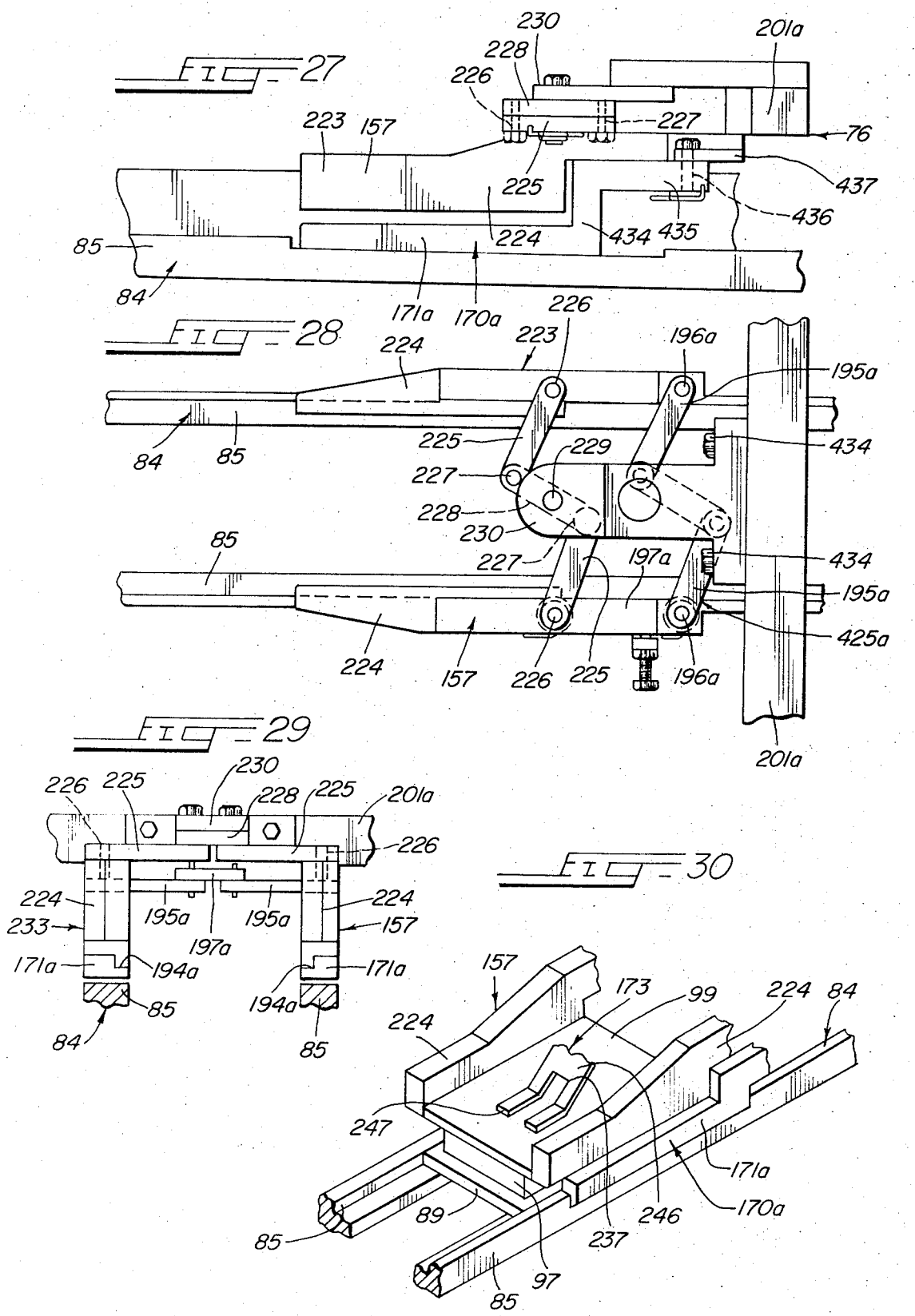

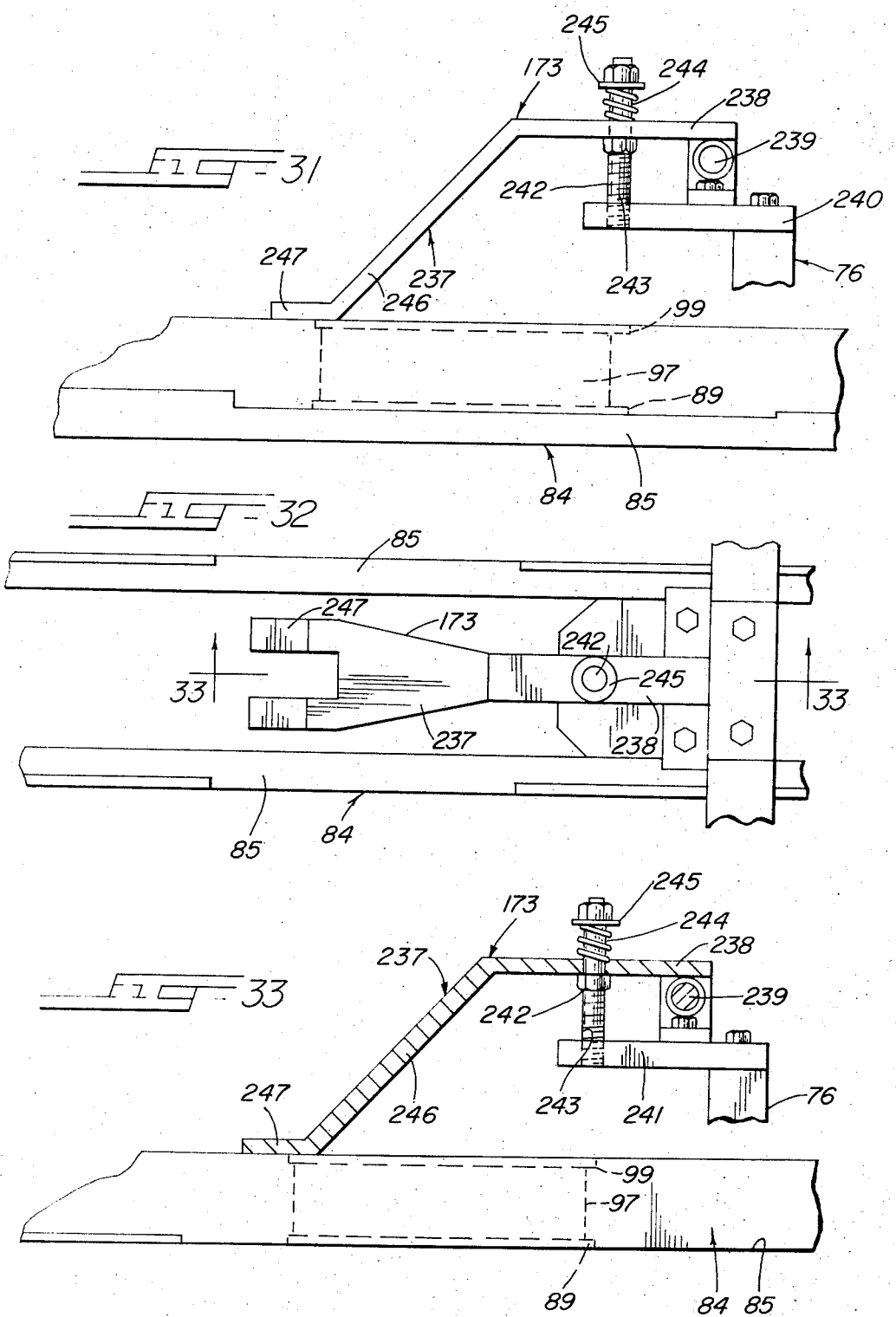

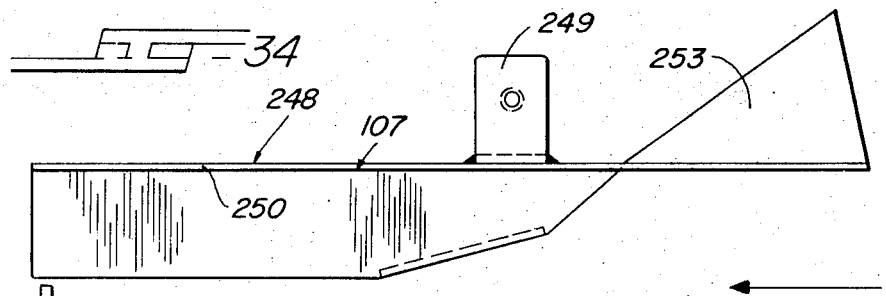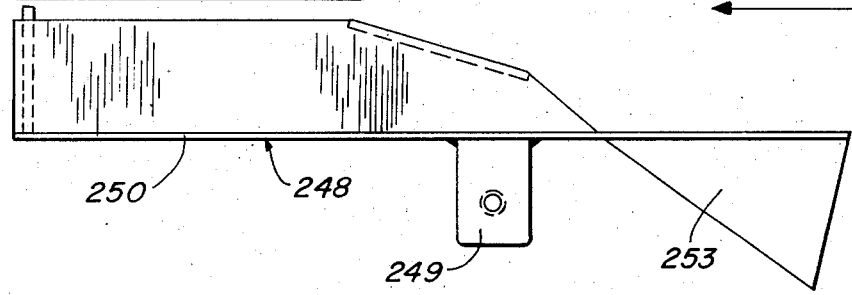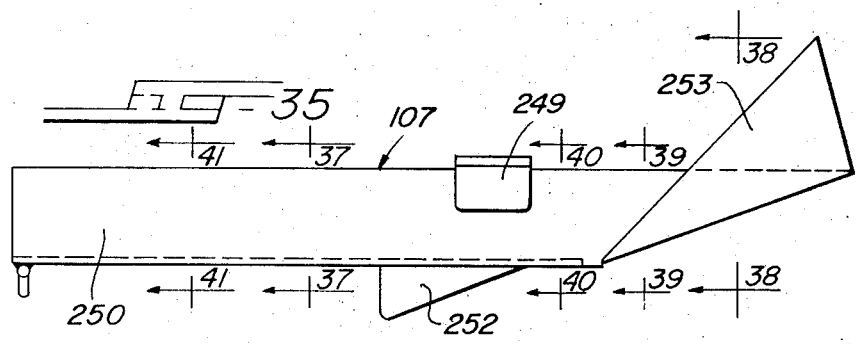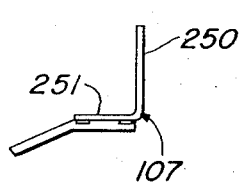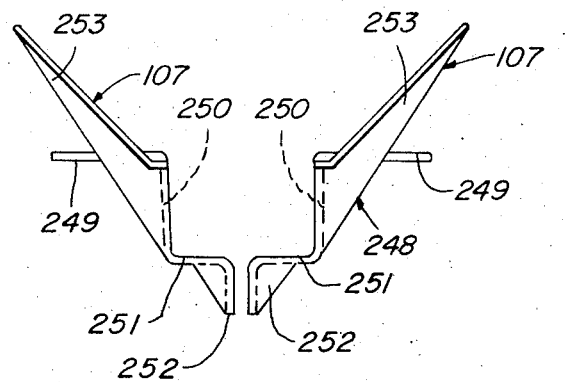

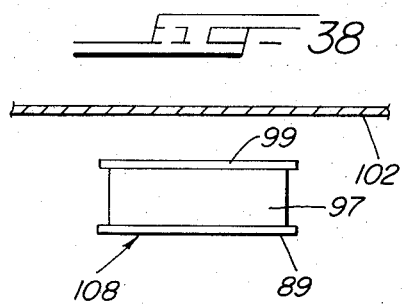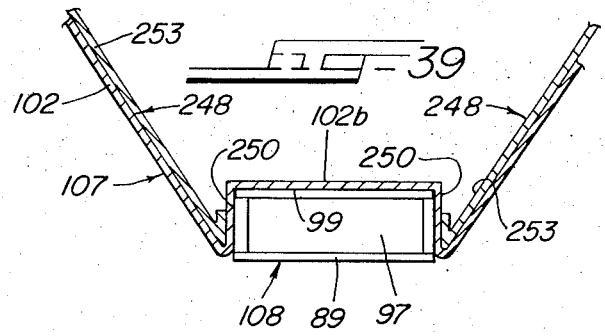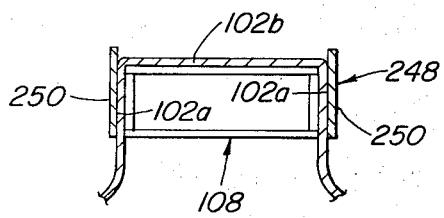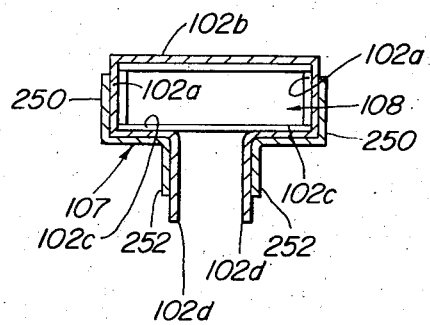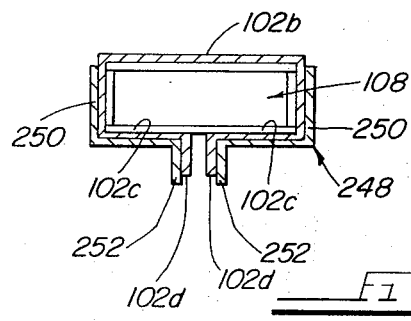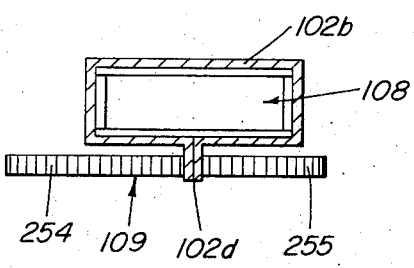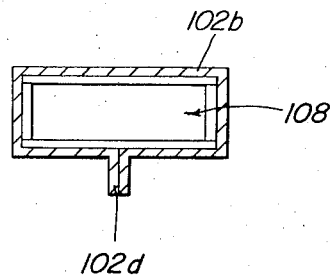

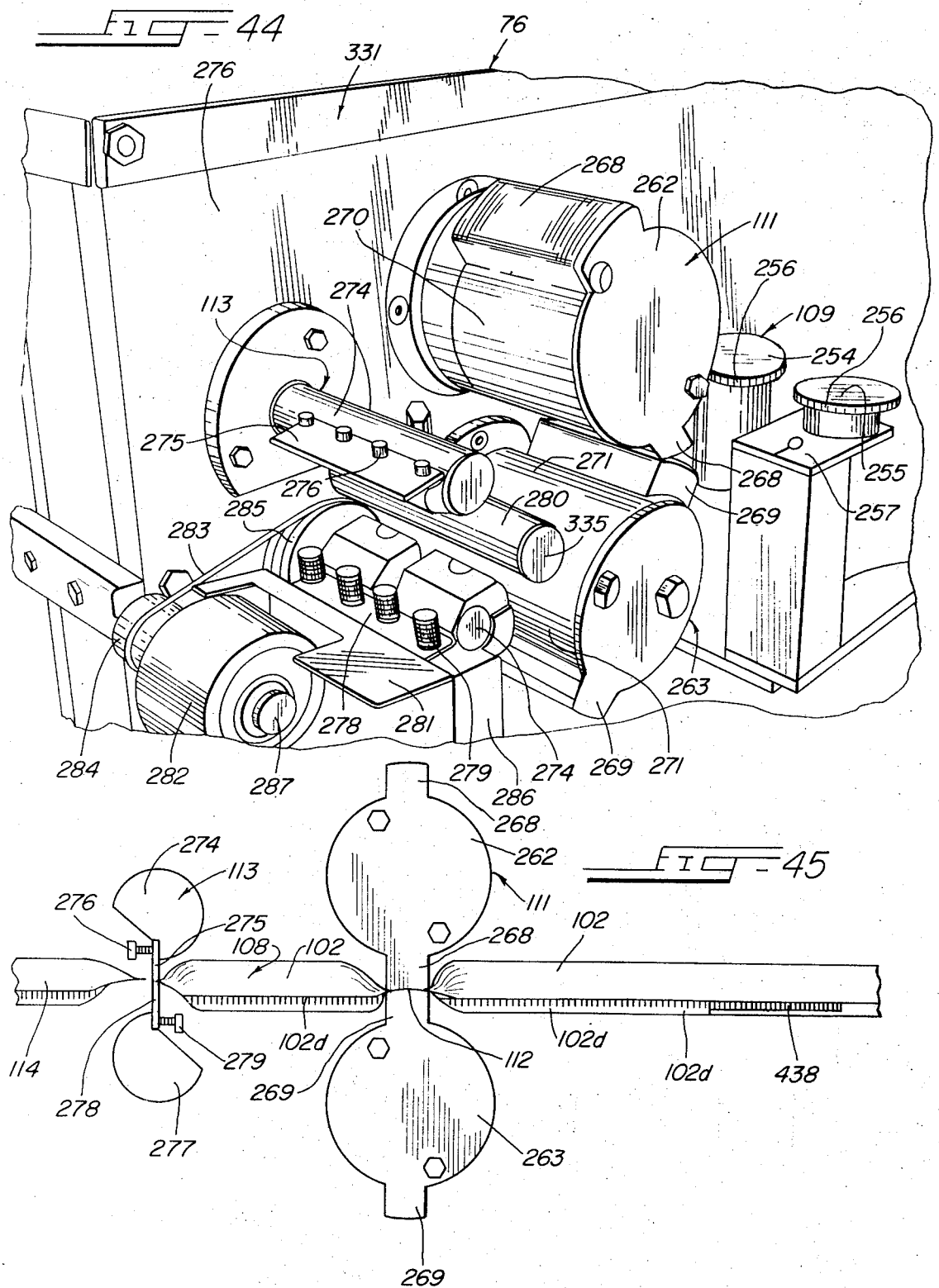

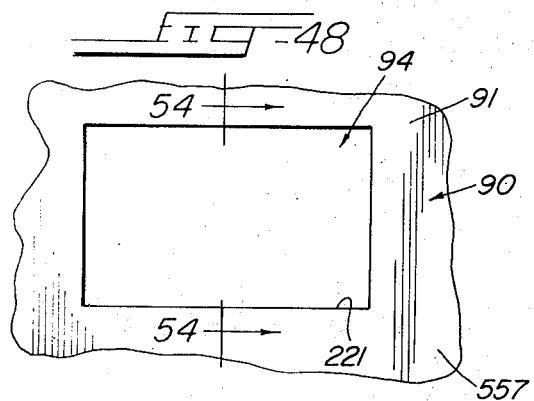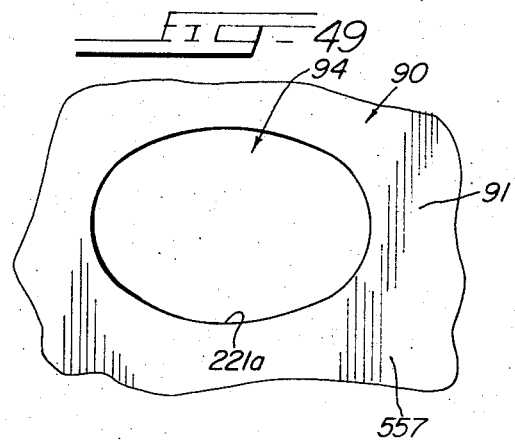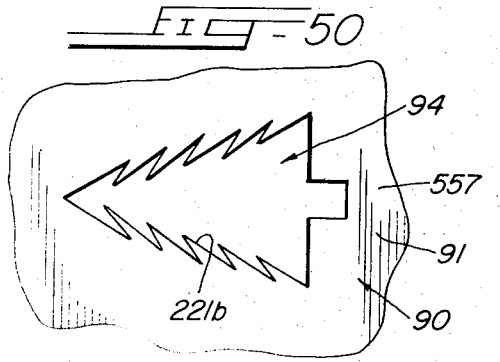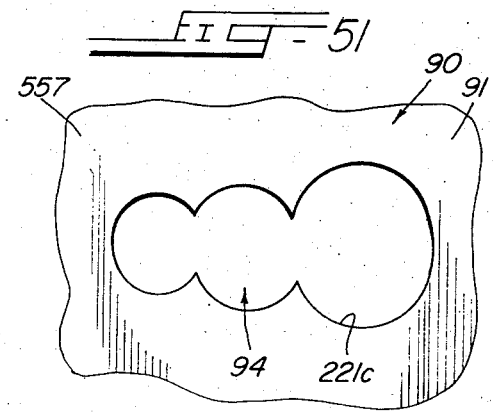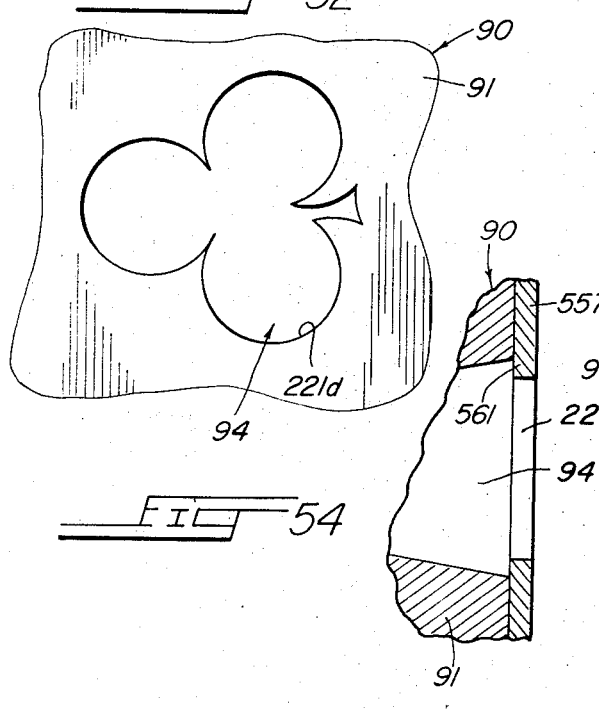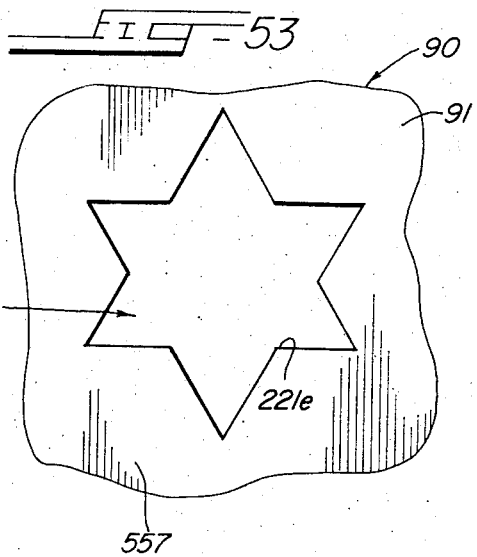

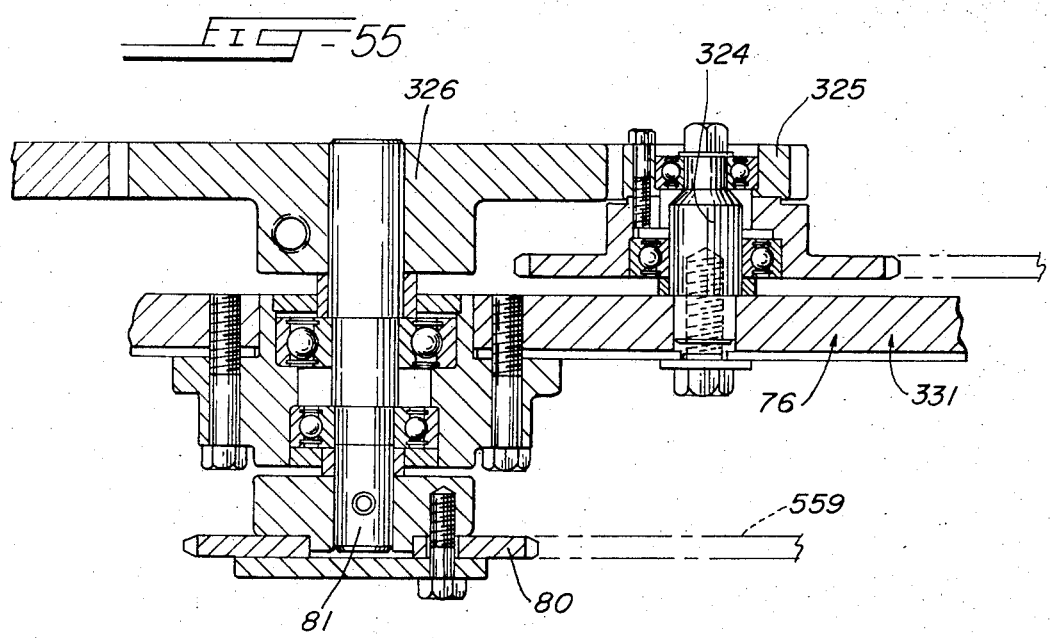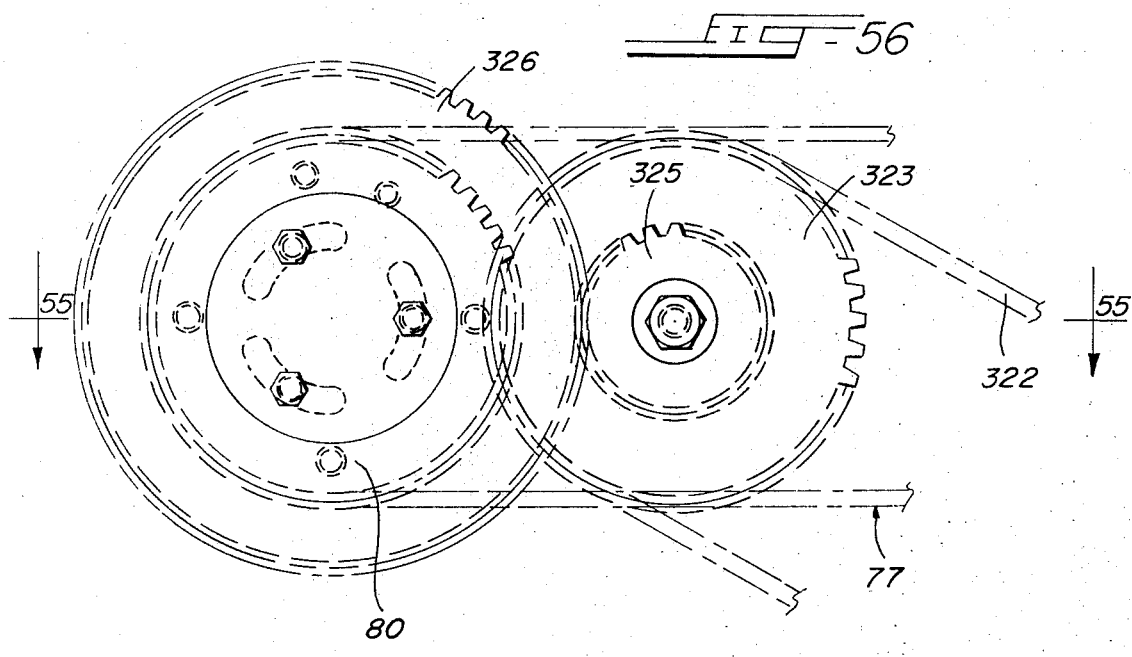

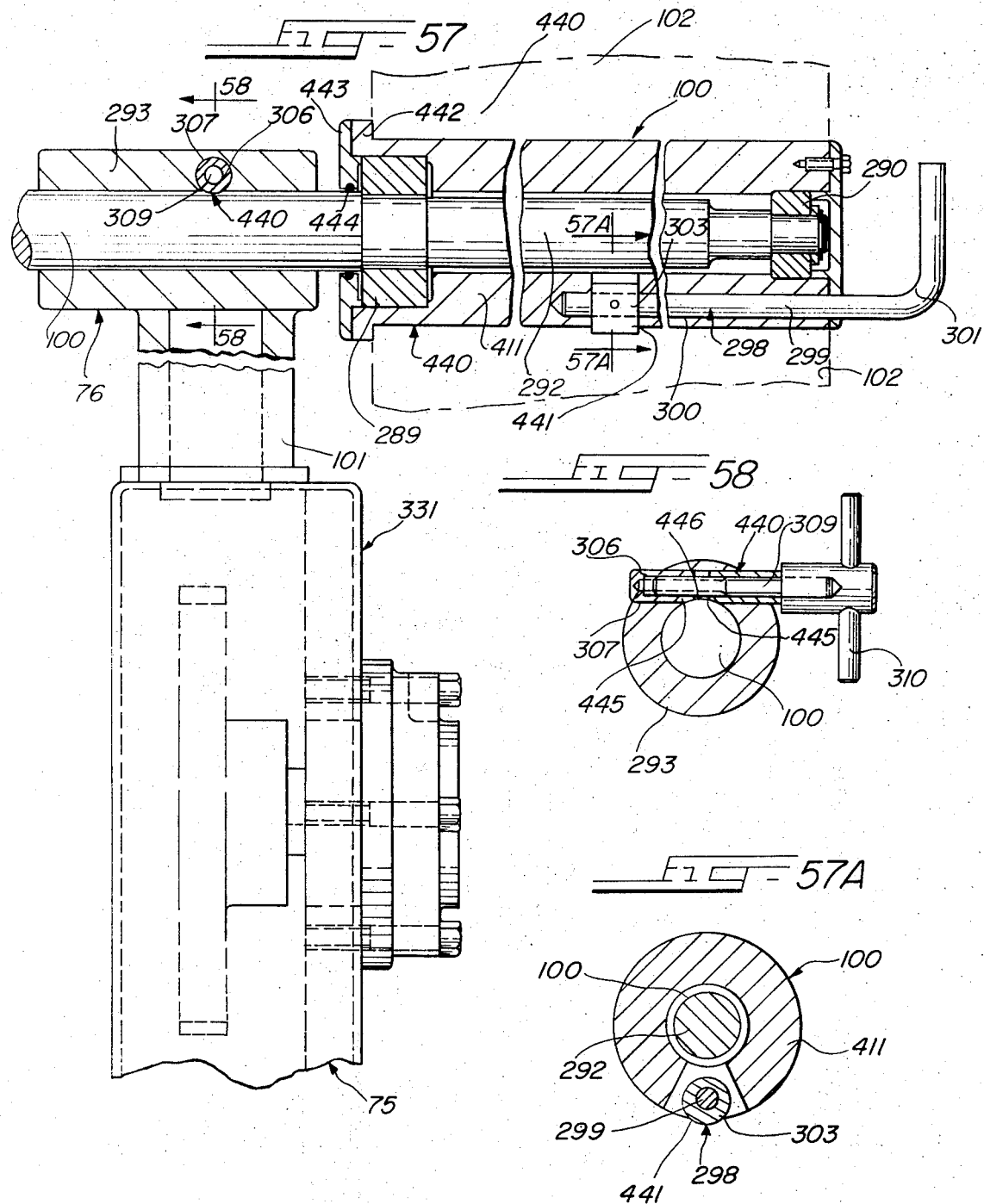

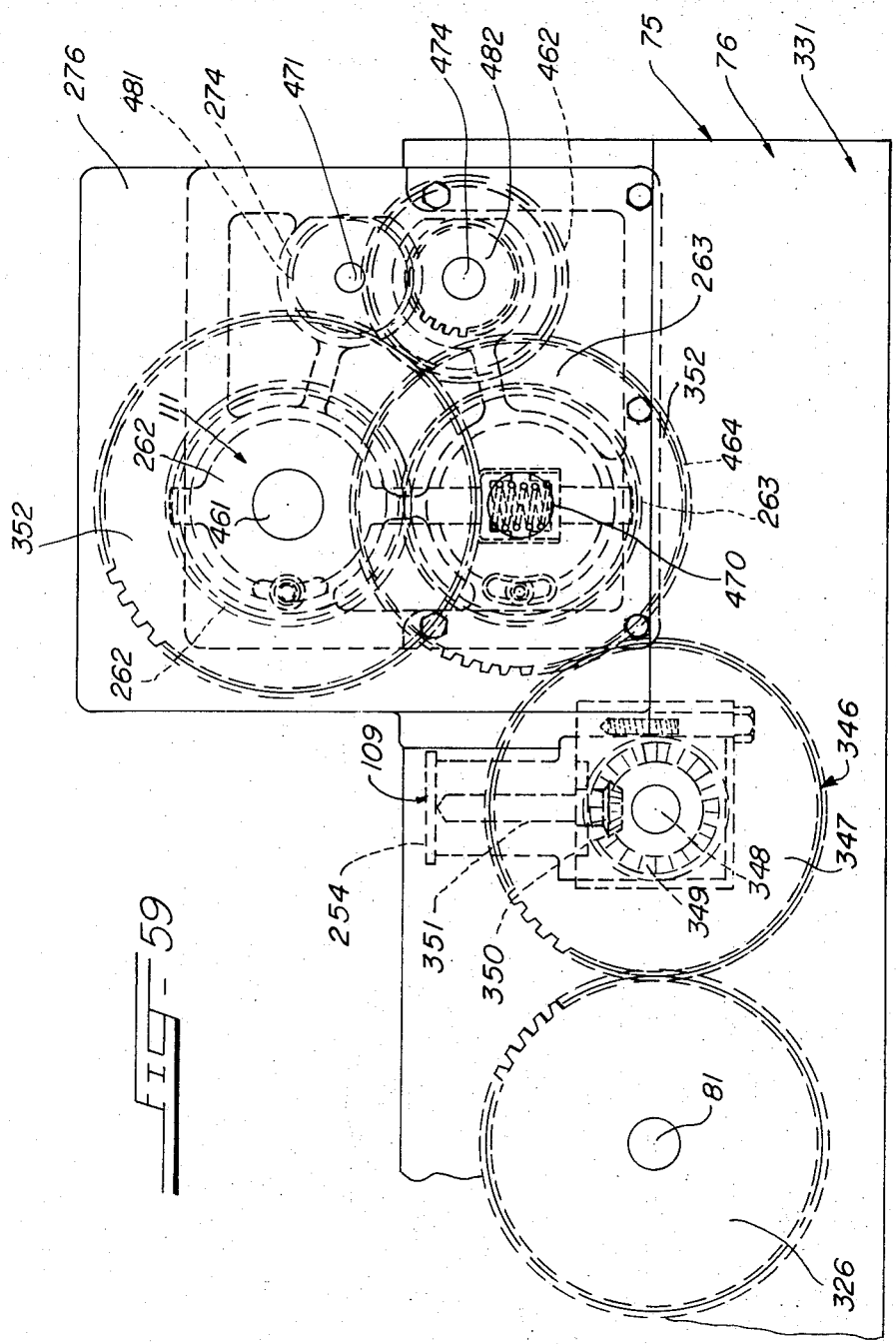

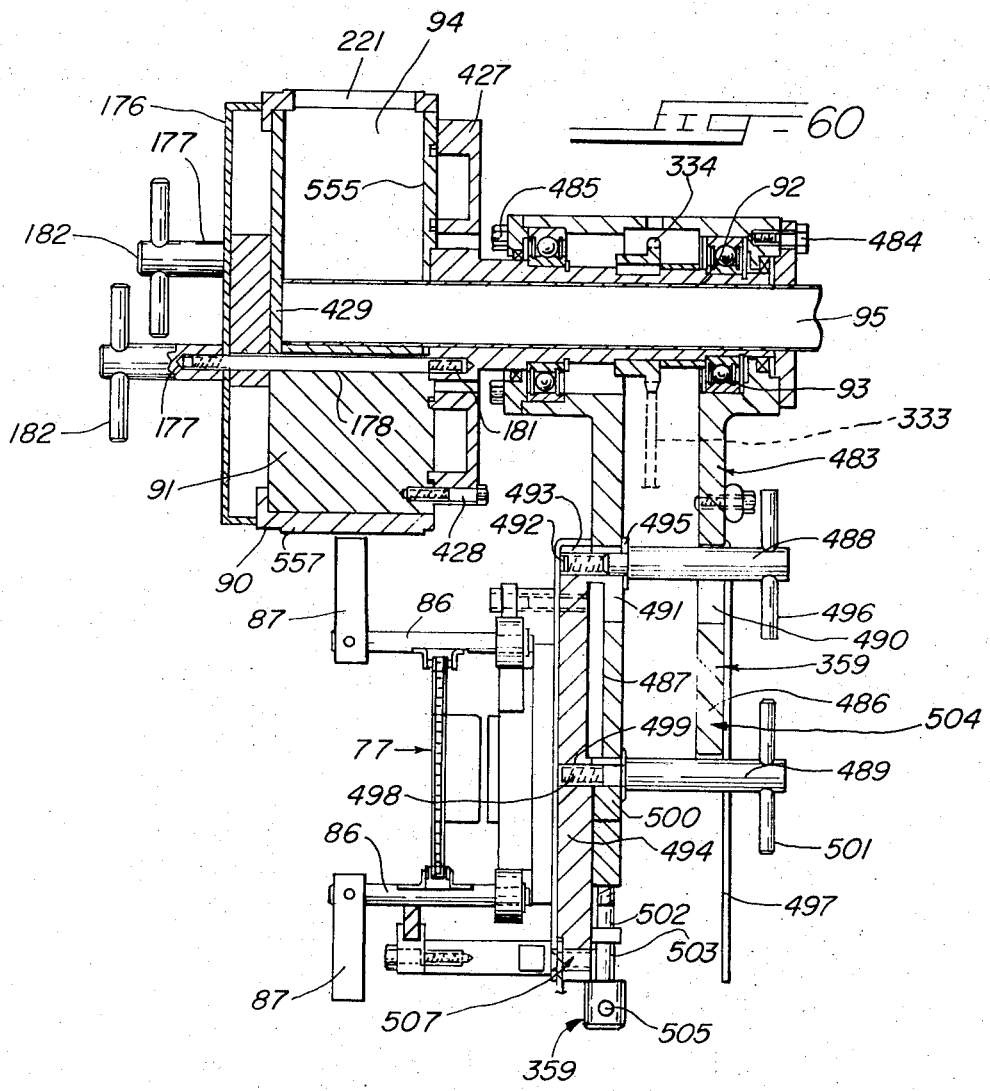
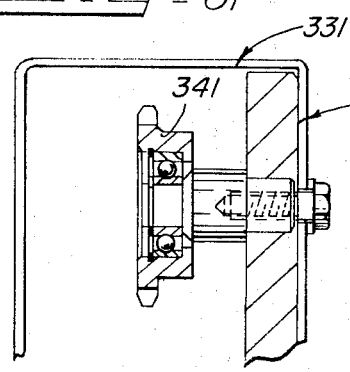

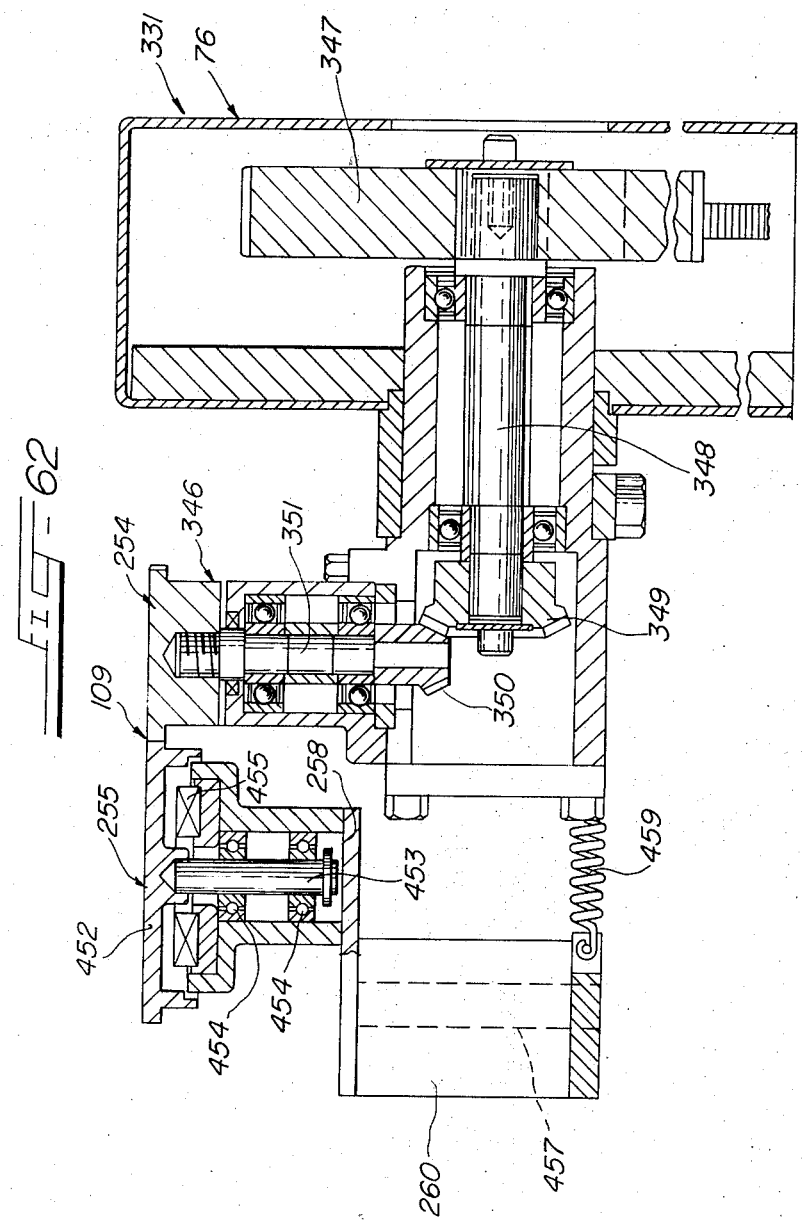

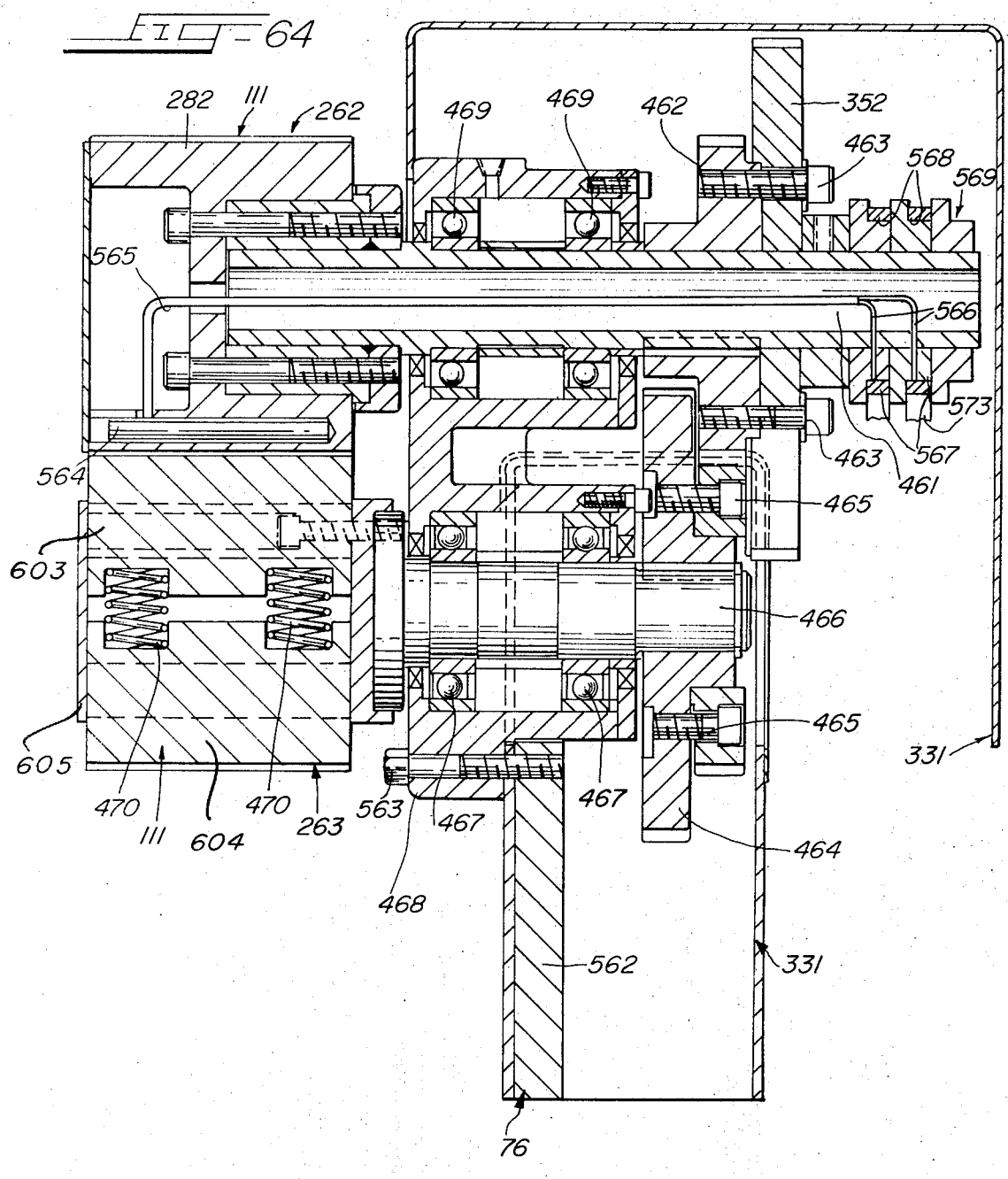

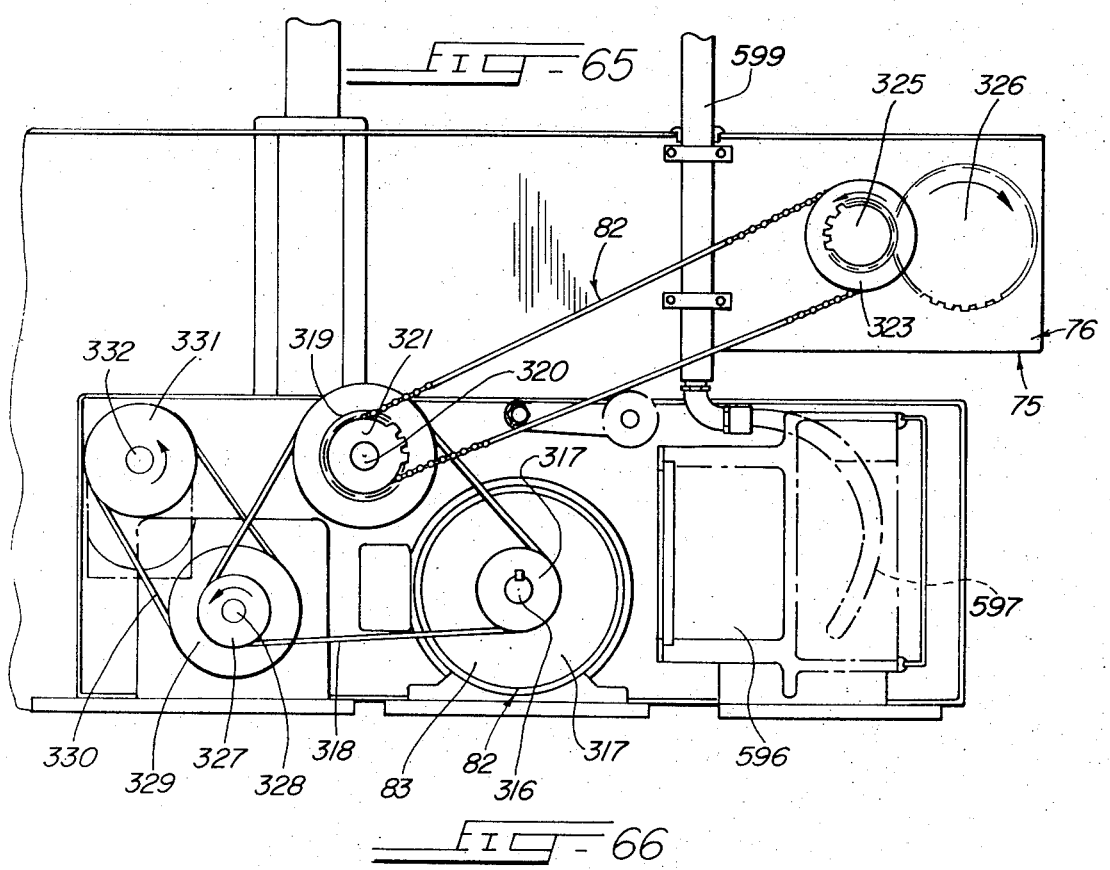
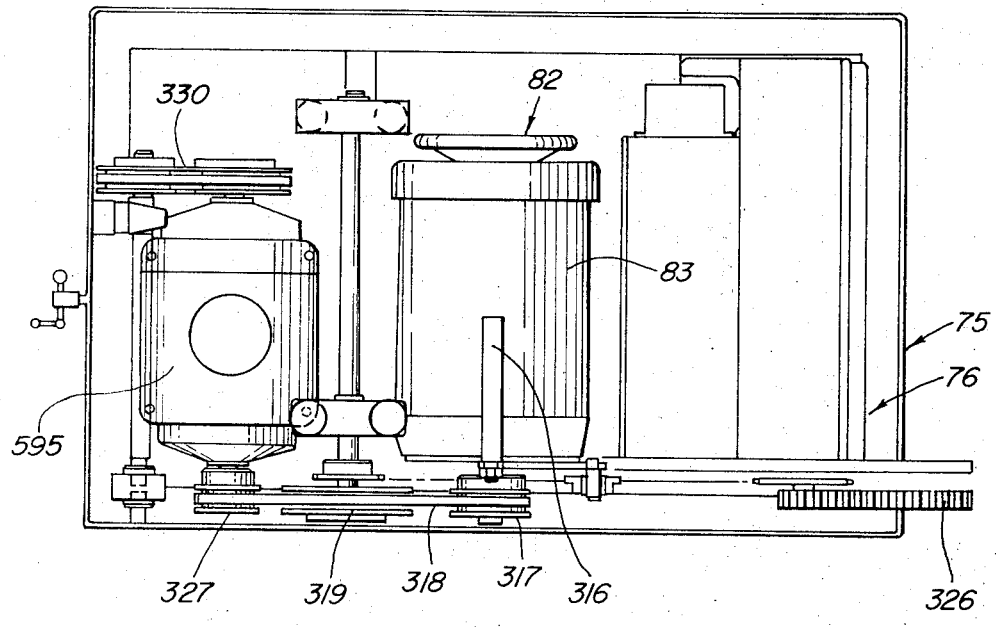

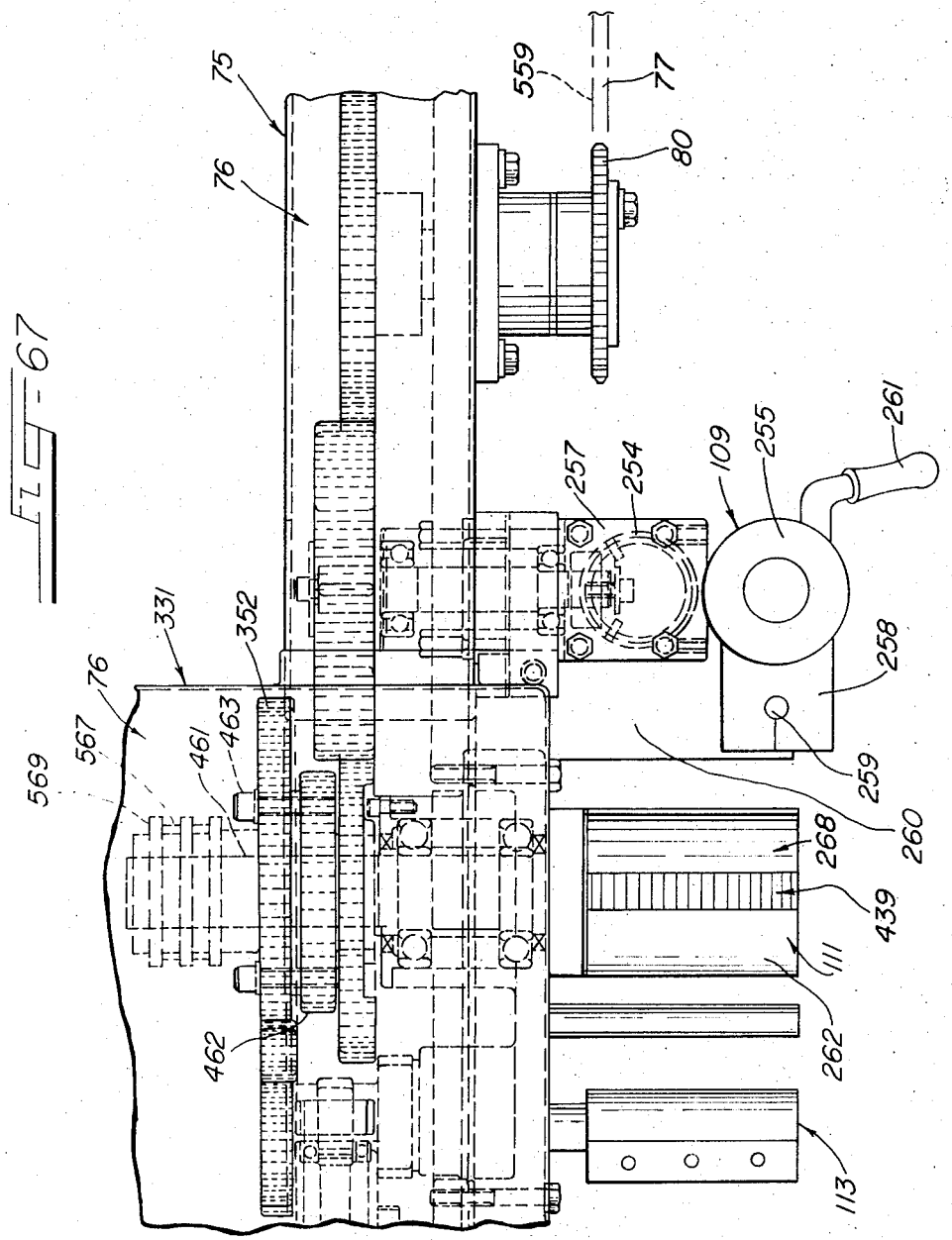

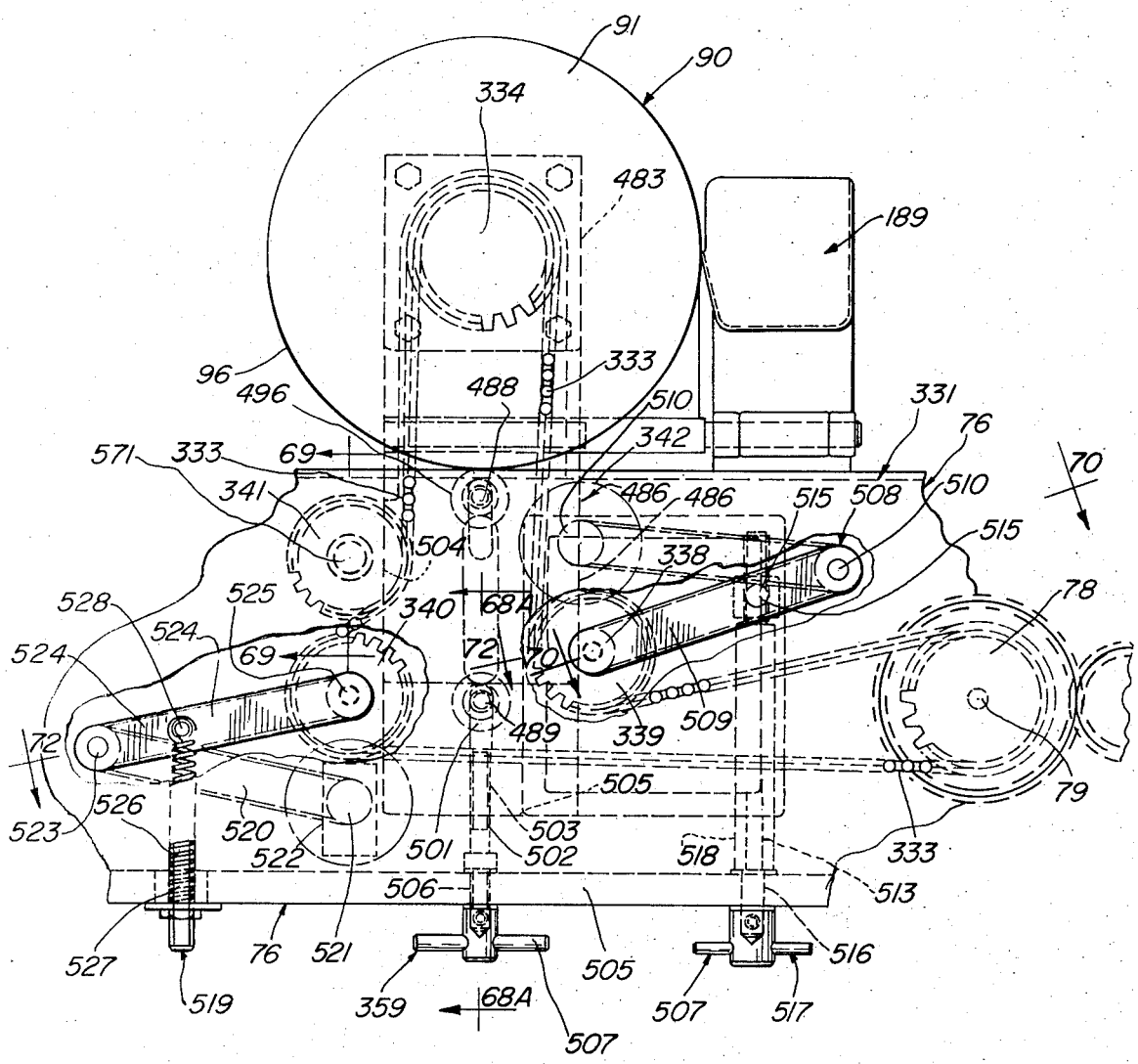

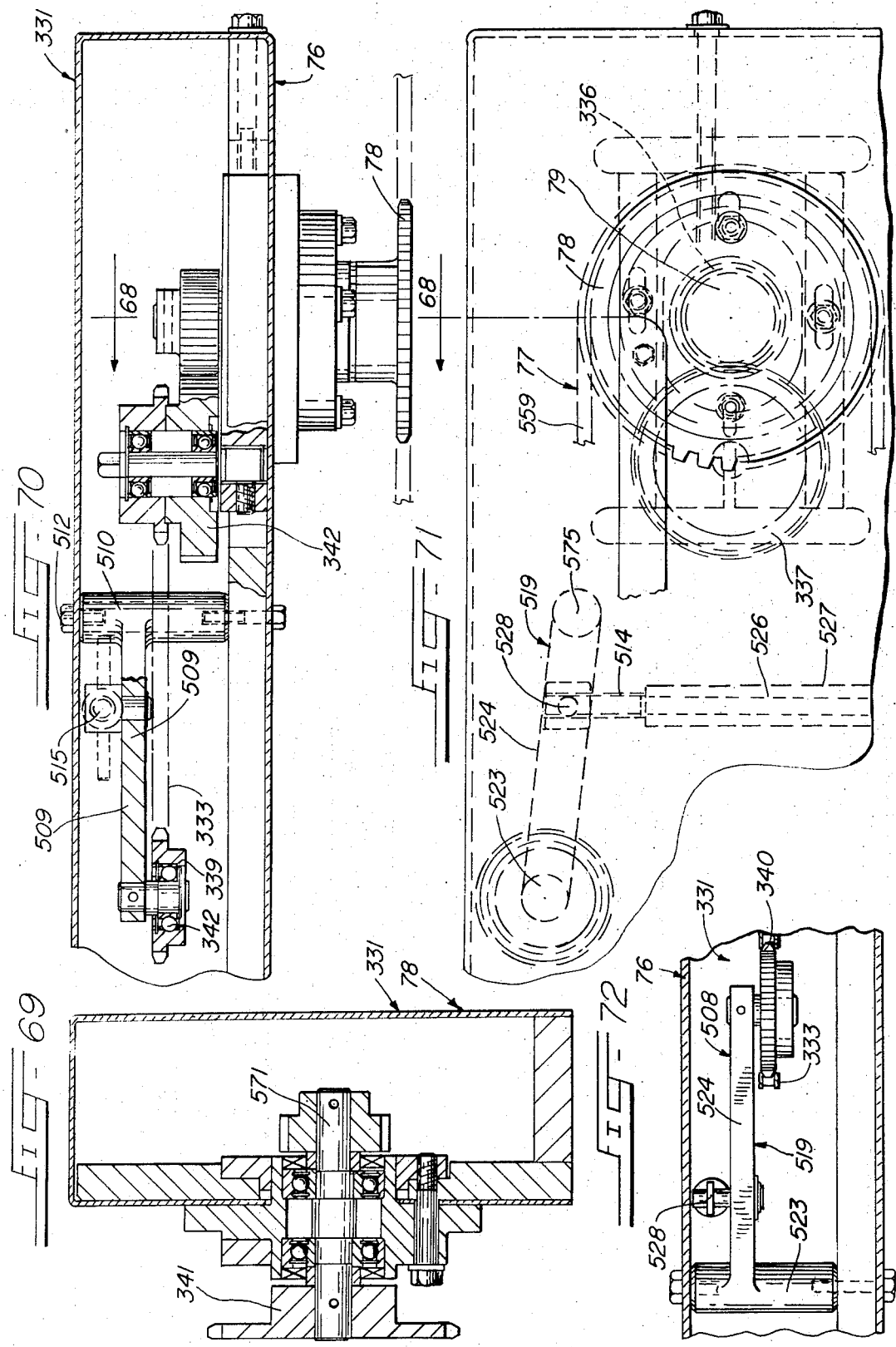

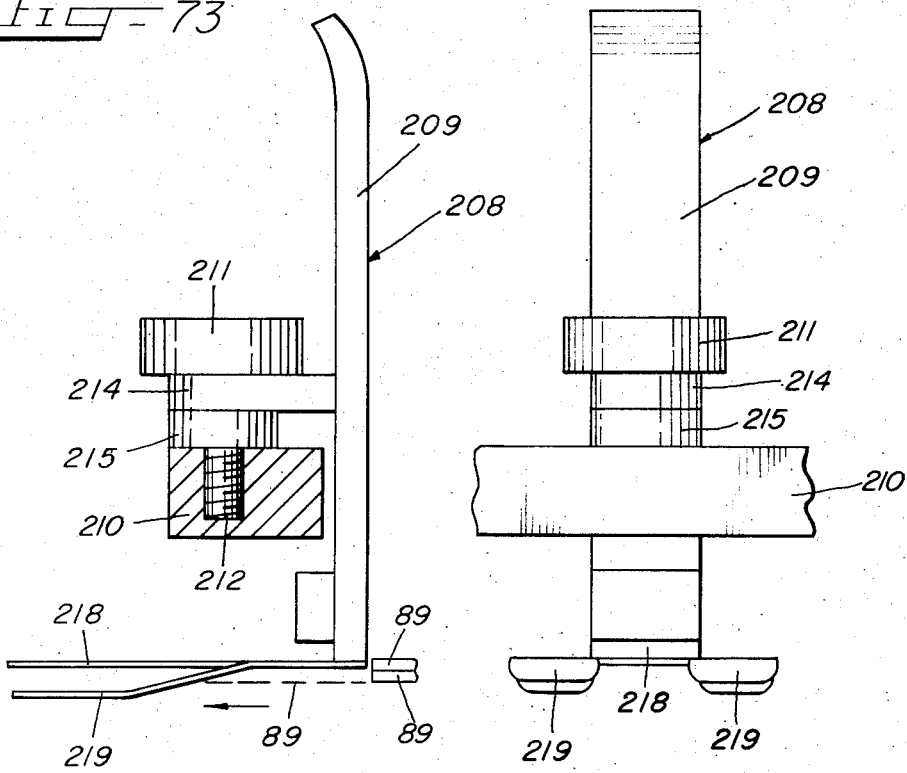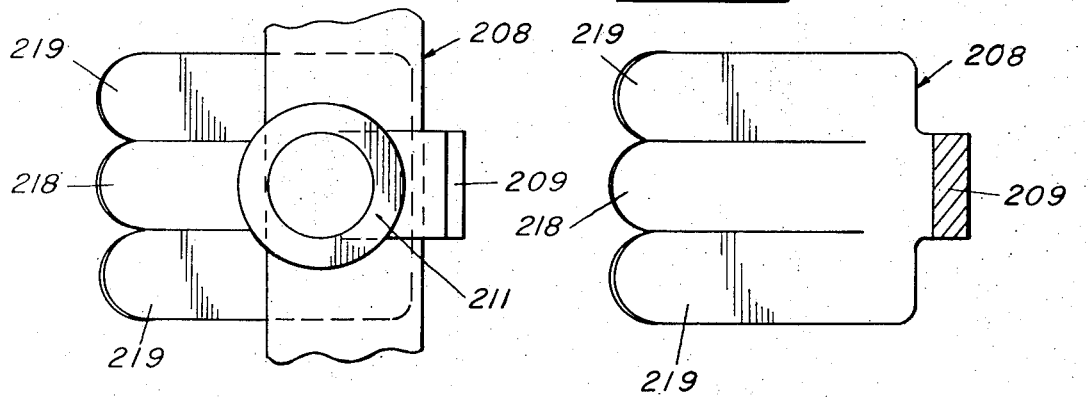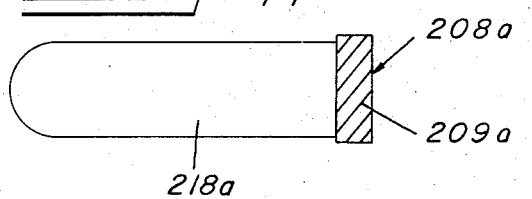

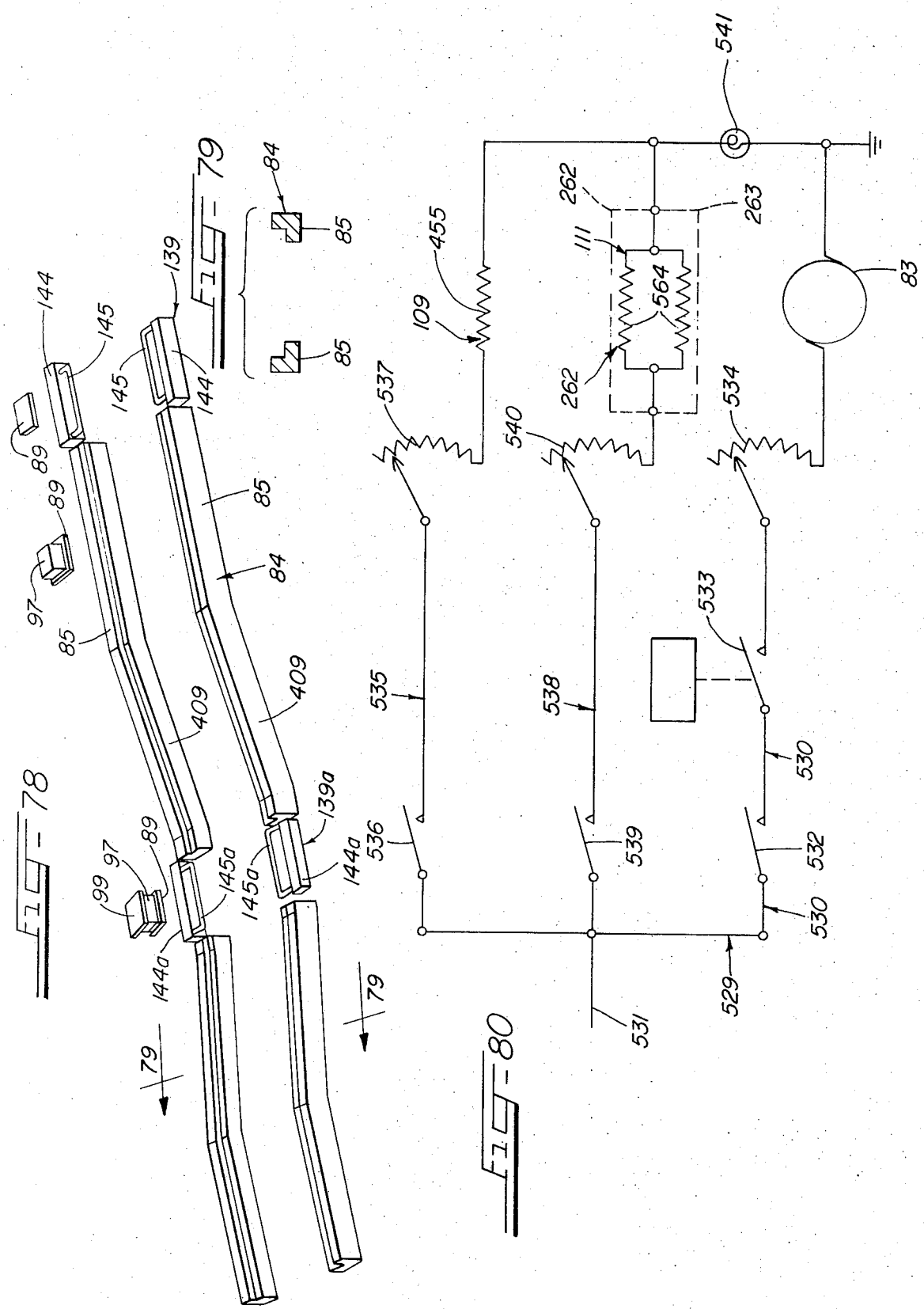

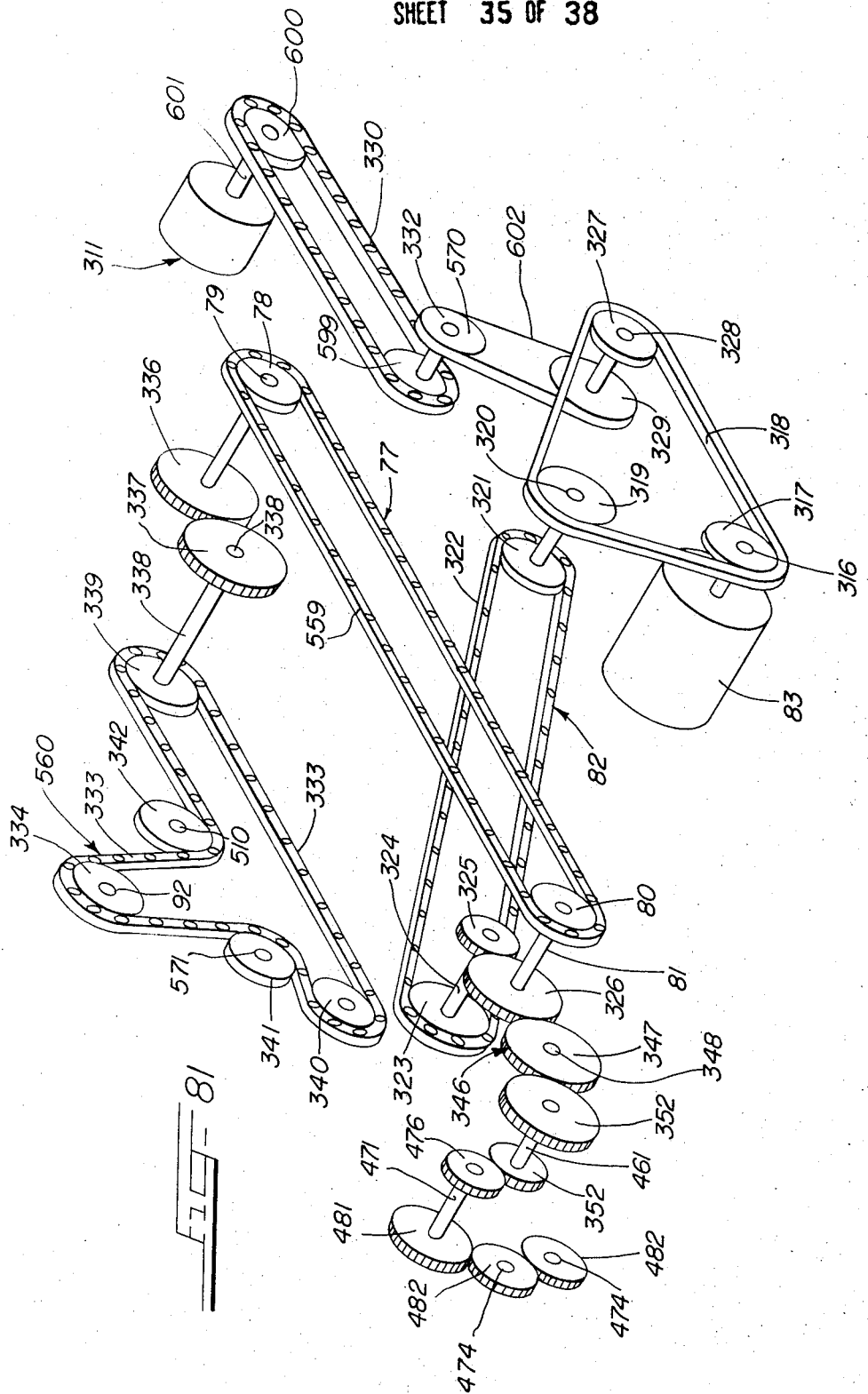

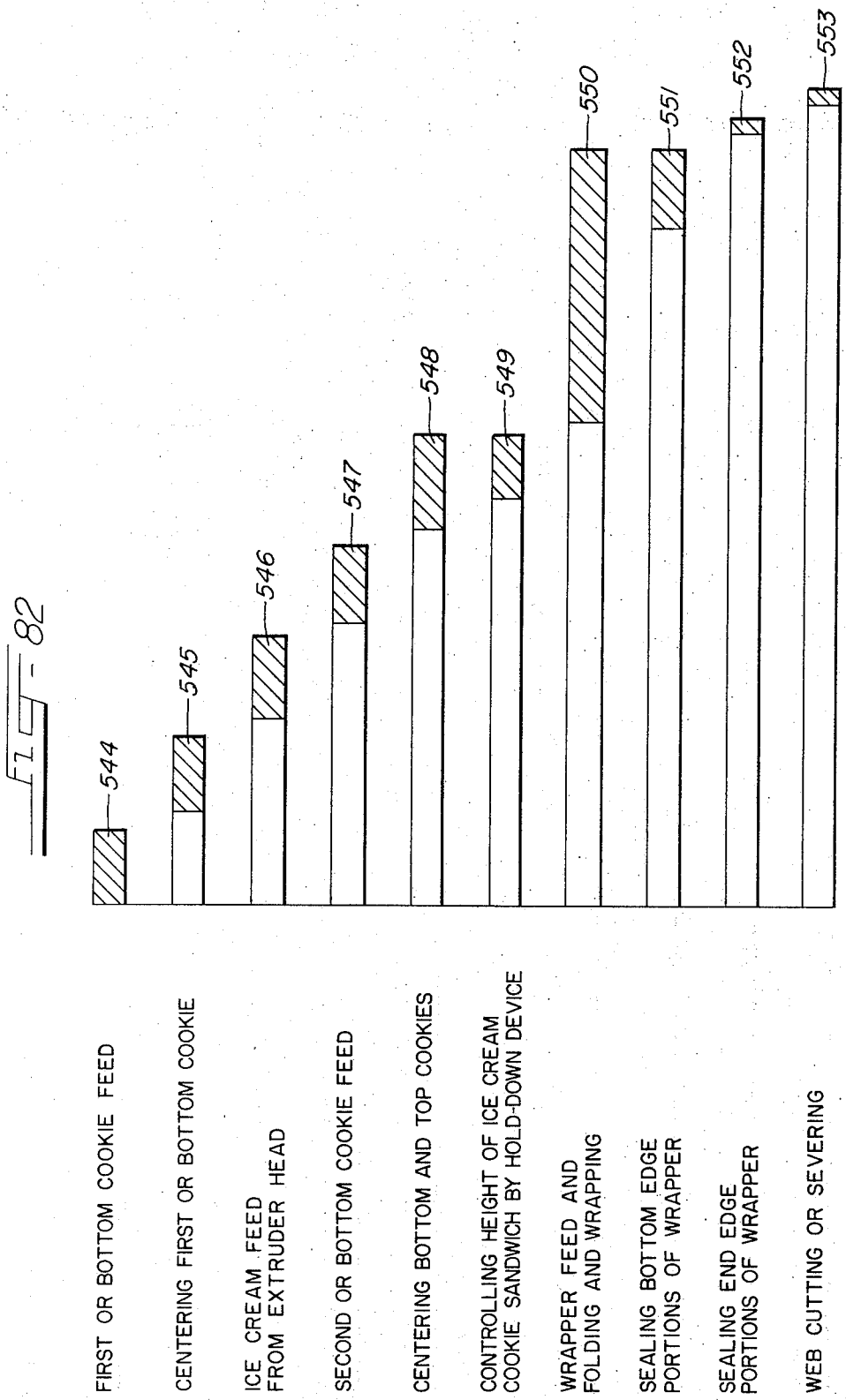

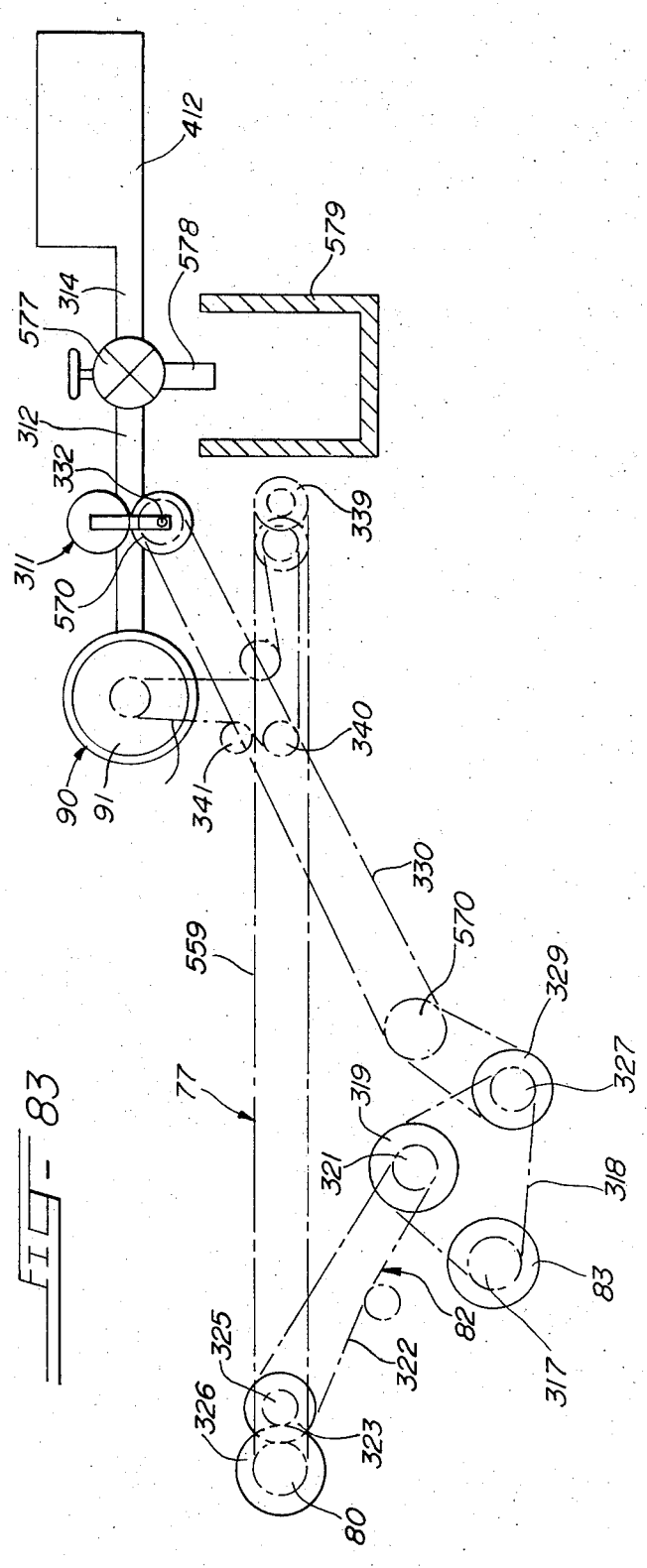

MACHINE FOR MAKING ICE CREAM COOKIE SANDWICHES AND SIMILAR FOOD PRODUCTS

OBJECTS

An object of the invention is to provide a new and improved and entirely automatic machine for making ice cream cookie sandwiches, and similar edible food products, in a high speed continuous operation.

Another object of the invention is to provide in the new machine a novel rotary ice cream extruder head device which is so designed and constructed that it assures that a uniform volume or measured quantity of ice cream will be deposited on the first or bottom cookie or wafer in and during each ice cream extruding operation of the rotary ice cream extruder head device.

Additional and further objects of the invention are to provide in the new machine novel means and novel combinations of means and devices including the following:

1. a first cookie stack-supporting and raising means forming a part of the guideway or trackway for supporting an entire stack of cookies or wafers in the first or bottom cookie storage magazine or hopper at the first work station and for lifting or raising the entire stack of cookies in the first storage magazine or hopper upwardly out of engagement with the article-advancing means or pusher members on the endless conveyor to enable the endless conveyor to run idly when desired and without engaging a first or bottom cookie at the first or bottom cookie storage magazine or hopper device at the first work station as, for example, in the event of jamming or other malfunctioning of the machine during any one of the various operations performed by the machine, or for other reasons;

2. a first centering means for maintaining the first or bottom cookie or wafer in properly centered position laterally on and relative to the guideway or trackway as it is moved along the guideway or trackway by the endless conveyor and its article-advancing means to the rotary ice cream extruder head device at the second work station;

3. a second centering means for maintaining the assembled bottom cookie and the ice cream filler body thereon in properly centered position as the first or bottom cookie with the ice cream filler body thereon is moved along the guideway or trackway by the endless conveyor and its article-advancing means to the third work station at which the second or top cookie is deposited on the ice cream filler body to complete the ice cream sandwich;

4. a second cookie stack-supporting and raising means arranged at the second or top cookie storage magazine or hopper and forming a part of the guideway or trackway for supporting a stack of cookies in the second cookie storage magazine or hopper and for lifting or raising the entire stack of cookies in the second cookie storage magazine or hopper upwardly out of the path of travel of the article-advancing means or pusher members on the endless conveyor so that the endless conveyor may run idly and not pick up a second or top cookie at the second cookie storage magazine or hopper in the event of jamming or other malfunctioning of the machine;

5. hold-down means for maintaining the assembled ice cream sandwich and its components in the proper position vertically on and relative to the guideway or trackway as they are moved along the guideway or trackway by the endless conveyor and its article-advancing means or pusher members;

6. means for adjusting the rotary ice cream extruder head device vertically relative to the guideway or trackway so as to vary the thickness of the ice cream filler body deposited on the first or bottom cookie or wafer and thus vary the thickness of the completed ice cream cookie sandwich to a desired thickness;

7. waste removal and salvage means for removing and recovering from the peripheral surface of the rotary ice cream extruder head device the initial extrusion of relatively warm and soft ice cream from the rotary ice cream extruder head device when the first ice cream extruder therefrom is relatively warm and soft during the initial stage or start-up of the machine and prior to the time the colder and harder ice cream is fed or pumped into the ice cream chambers of the rotary ice cream extruder head device from the ice cream freezer or storage hopper;

8. means embodied in the rotary ice cream extruder head device for assuring the deposit of uniform volume or measured quantity of a filler body of ice cream onto the first or bottom cookie or wafer at each extruding operation;

9. means for trimming the ice cream filler body as it is extruded from the rotary ice cream extruder head device onto the first or bottom cookie or wafer to assure that the ice cream filler body will at all times have the same and a desired uniform predetermined thickness;

10. means embodied in the rotary extruder head device for extruding the ice cream filler body therefrom in various designs and shapes so as to accomodate the new machine to the use of cookies, wafers, and the like, and to making ice cream cookie sandwiches of various designs, shapes and thicknesses;

11. means for accommodating the machine for use with cookies or wafers of varying sizes and dimensions, as to length, width, etc.;

12. means for wrapping and folding a web of flexible, heat-sealable, water-resistant paper or like flexible heat-sealable, water-resistant wrapping material, such as polyethylene film, around the completed ice cream cookie sandwich;

13. first rotary heat-sealing means for heat-sealing parallel bottom edge portions of the heat-sealable wrapper to each other and about the completed ice cream cookie sandwich;

14. second rotary heat-sealing means for heat-sealing parallel end edge portions of the heat-sealable wrapper to each other and about the ice cream sandwich;

15. rotary web-cutting or web-severing means for cutting the web of wrapping material from each wrapped and heat-sealed ice cream cookie sandwich so as to sever each wrapped and heat-sealed ice cream cookie sandwich from a chain of the same;

16. a trackway or guideway over and along which the cookies or wafers and the ice cream filler body components and the completed ice cream cookie wafer sandwiches are moved by the endless conveyor and its article-advancing means or pusher members during operation of the machine and including a downwardly inclined mid-section between the rotary ice cream extruder head device and the second cookie storage magazine or hopper to enable the first or bottom cookie with the ice cream filler body thereon to be moved by the endless conveyor and its article-advancing means under the second cookie stack-supporting and raising or lifting means at the second or top cookie storage magazine or hopper for the reception of the second or top cookie;

17. conveyor means and article-advancing means thereon for advancing the cookies and the ice cream filler body along the guideway or trackway to the various work stations at which the various operations of the machine are performed;

18. means for permitting only a single cookie or wafer to be dispensed or deposited onto the cookie guideway or trackway from each of the cookie storage magazines or hoppers at each cookie-dispensing operation thereof, and means for slowing down or retarding the movement of the first or bottom cookie as it is dispensed from the first or bottom cookie storage magazine or hopper to prevent breakage thereof;

19. means including flexible power transmission for the rotary ice cream extruder head device and normally operable adjusting means cooperable therewith for adjusting the position of the rotary ice cream extruder head device about its axis and relative to and above the guideway or trackway so that its dispensing or extruding outlet will at all times be synchronized with the movement of the first or bottom cookie, by the endless conveyor and its article-advancing means, along the guideway or trackway to assure that the dispensing or extruding outlet of the rotary ice cream extruder head device will at all times be in proper position and synchronized with the position of the first or bottom cookie when the latter comes under the rotary ice cream extruder head device;

20. power transmission means operated by a single power means in the form of an electric motor for operating all of the moving or rotating parts of the machine, including the endless conveyor and its article-advancing means; the ice cream pump for supplying frozen ice cream under pressure to the rotary ice cream extruder head device; the rotary ice cream extruder head device; the first and second rotary heat-sealing devices; and the rotary web-cutting or web-severing device, in timed relationship during operation of the machine;

21. means for enabling the rotary ice cream extruder device and the parts thereof to be mounted for rotation on the supporting frame structure of the machine above the guideway or trackway so that the rotary ice cream extruder device may be readily removed from its mounting and disassembled for cleaning, or for repair, and so that it may be maintained in a clean and sanitary condition;

22. and the rotary ice cream extruder head device embodying a generally cylindrical extruder body which includes a plurality of radially arranged ice cream chambers each having a radially inner inlet end and a tubular ice cream supply member extending axially of the said generally cylindrical body of the rotary ice cream extruder device; the tubular ice cream supply member has a discharge outlet therein which communicates sequentially with the radially inner and inlet end portions of the radially arranged ice cream chambers as the generally cylindrical body of the rotary ice cream extruder device is rotated so as to sequentially fill each of the ice cream chambers with a measured quantity of frozen ice cream and with the discharge outlet from the tubular ice cream supply member so designed, shaped and positioned prior to the time that each of the radially arranged ice cream chambers is completely filled with frozen ice cream from the discharge outlet in the tubular ice cream supply member, the discharge outlet in the tubular ice cream supply member has established communication with and is discharging frozen ice cream under pressure into the next succeeding or following device cream chamber in the generally cylindrical body of the rotary ice cream extruder device so that a constant and uniform pressure is maintained at all times in all of the radially arranged ice cream chambers as the ice cream chambers in the generally cylindrical rotary ice cream extruder body are sequentially rotated past the said discharge outlet in the said tubular ice cream supply member;

23. means for controlling the volume of semi-frozen ice cream or other edible or comestible food product fed into the food chambers of the rotary extruder device, in relation to the first or bottom cookie or other protective or bottom carrier member and for synchronizing the flow of semi-frozen flowable ice cream or like edible or comestible flowable food product with the speed of the machine; and 24. hold-down means associated with the trimmer device for preventing the filler body of flowable semi-frozen ice cream or like edible or comestible food product and the bottom cookie or like protective or carrier member onto which it is extruded from adhering to the rotary extruder device from being lifted off the guideway or trackway and carried around by and with the rotary ice cream extruder device after each extruding operation.

Other objects will appear hereinafter.

DESCRIPTION OF FIGURES IN THE DRAWINGS

FIG. 1 is a front perspective view of the new machine;

FIG. 2 is a front elevational view of the machine;

FIG. 3 is a top plan view of the machine;

FIG. 3A is a perspective view, on line 3A—3A in FIG. 3, illustrating the ice cream scooper and salvage device embodied in the machine for recovering from the peripheral surface of the rotary ice cream extruder the initial soft ice cream extruder from the rotary ice cream extruder at the start-up of the machine;

FIG. 3B is a sectional detail view showing the ice cream scraper and salvage means shown in FIGS. 3A and 12;

FIG. 3C is a perspective view illustrating the pan-like salvage receptacle of FIGS. 3A, 3B and 12 pivoted away from the extruder heat after each operation thereof;

FIG. 4 is a fragmentary top plan view of the machine showing parts of the endless conveyor unit, the first cookie storage magazine or hopper at the first work station, and the rotary ice cream extruder device;

FIG. 5 is a fragmentary perspective view of the guideway or trackway and the first or bottom cookie-centering device which is embodied in the invention;

FIG. 6 is a fragmentary side elevational view of the parts shown in FIG. 4;

Figure 22:
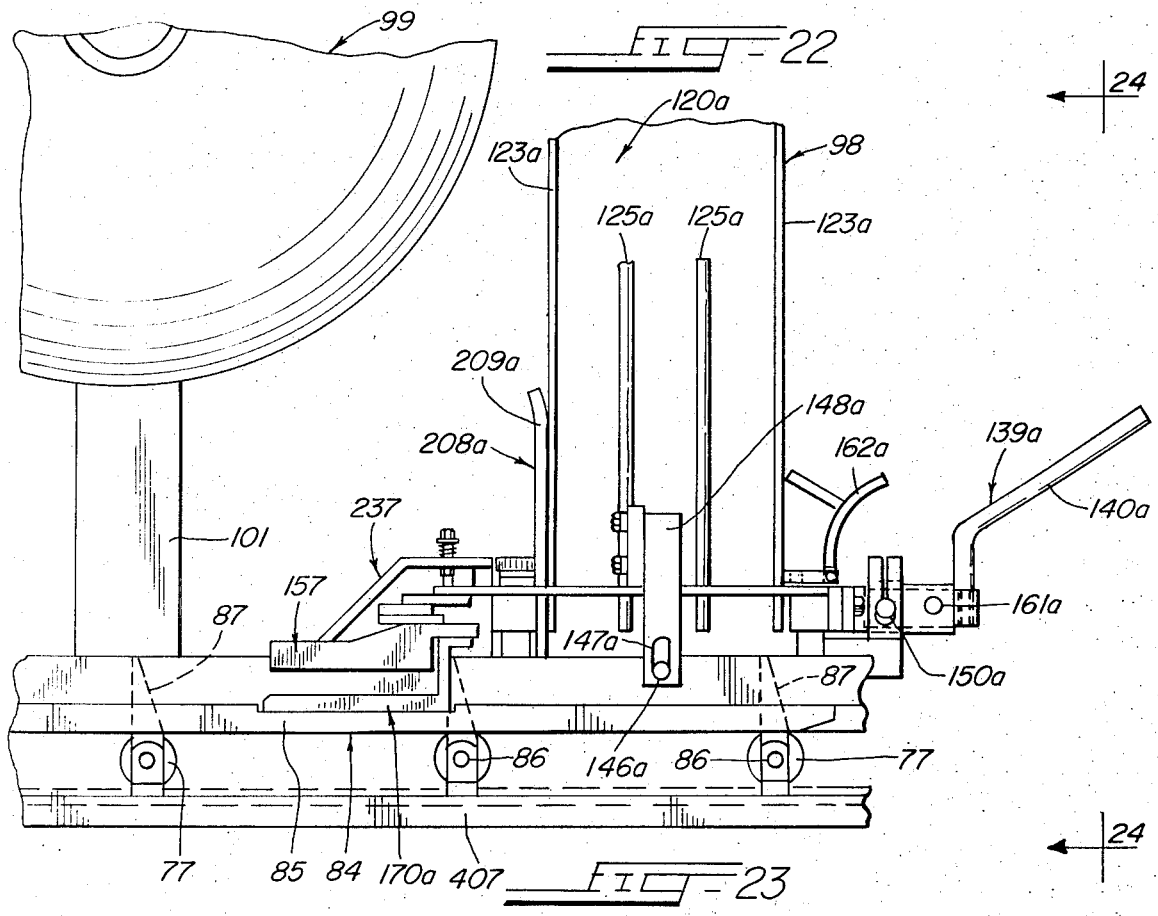
Figure 23:
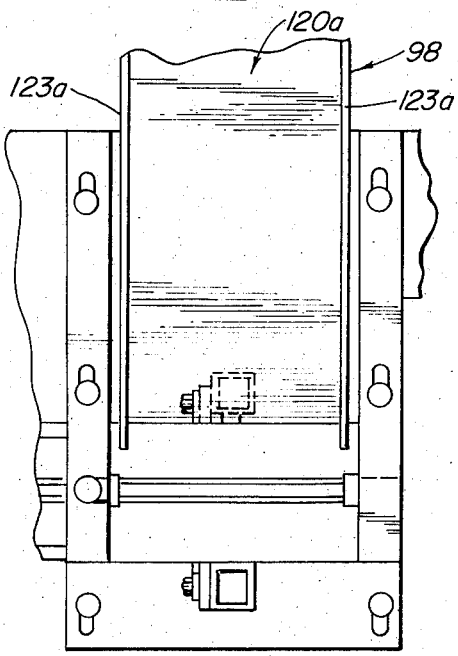
Figure 46:
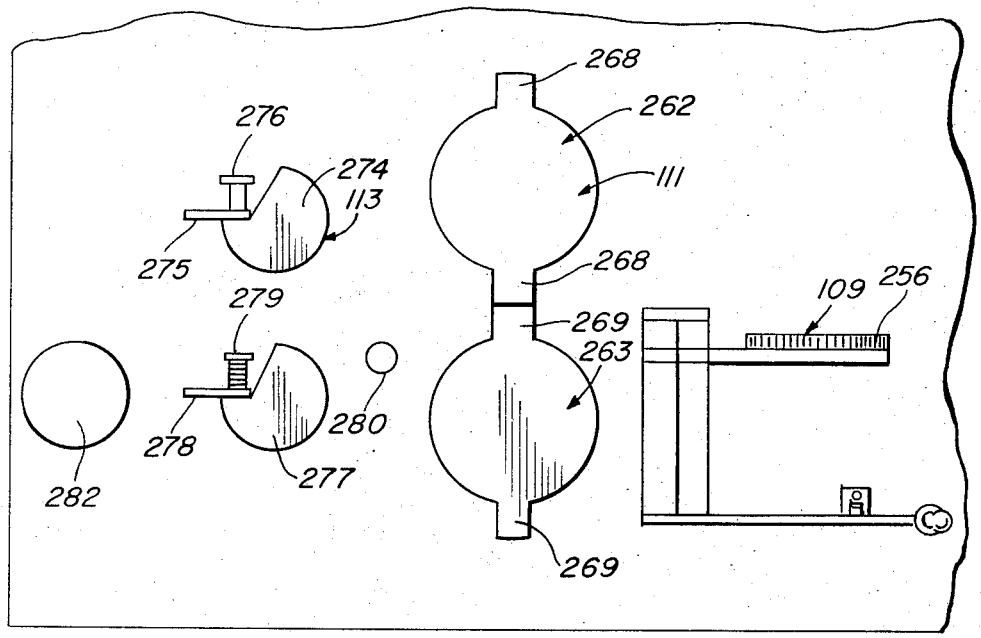
Figure 47:
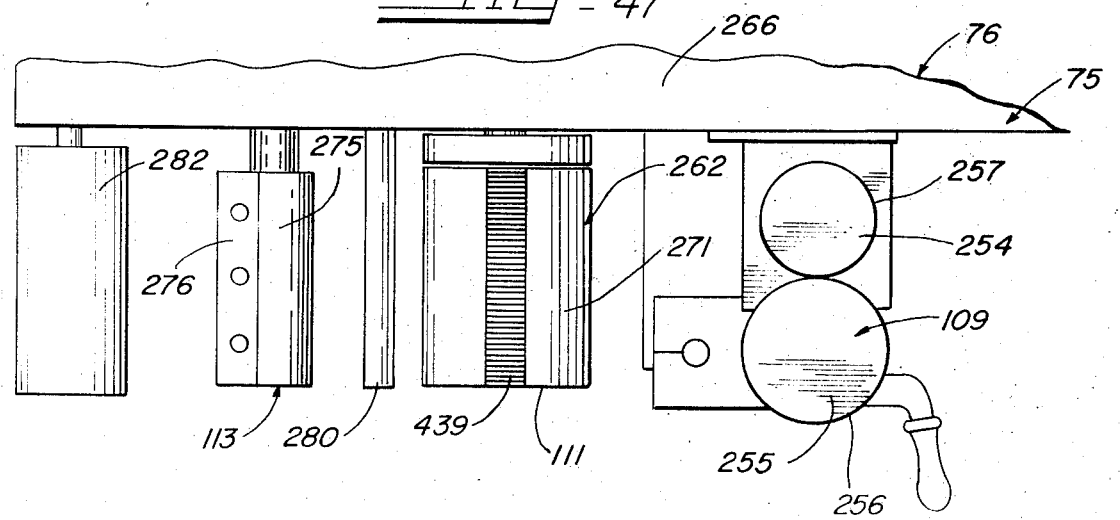

FIG. 7 is a view on line 7—7 in FIG. 6, partly in section and partly in elevation, showing parts of the first or bottom cookie storage magazine or hopper; part of the guideway or trackway; part of the endless conveyor unit and the article-advancing means or pusher finger members on the endless conveyor unit; and part of the means embodied in the machine for supporting the entire stack of cookies in the first cookie storage magazine or hopper and for raising or lifting the same up out of the path of travel of the endless conveyor and the article-advancing means or pusher finger members thereon in the event of jamming or other malfunctioning of the machine, or for other reasons;

FIG. 8 is a view on line 8—8 in FIG. 6, partly in section and partly in elevation, of certain of the parts shown in FIGS. 6 and 7;

FIG. 9 is a fragmentary top plan view of the first or bottom cookie stack-supporting and raising or lifting device embodied in the invention;

FIG. 10 is an end elevational view, on line 10—10 in FIG. 9, of the first or bottom cookie stack-supporting and raising or lifting device, shown in FIG. 9, as seen from the right hand side in FIG. 9;

FIG. 11 is a side elevational view of the first cookie stack-supporting and raising or lifting device shown in FIGS. 9 and 10;

FIG. 12 is a top plan view showing the rotary ice cream extruder device; the ice cream trimmer device for trimming the upper portion of the body of ice cream extruded from the rotary ice cream extruder device to the proper and desired size; the first or bottom cookie centering device; and the scraper and salvage means for scraping the relatively soft ice cream extruded from the rotary extruder device at the start-up of the machine and for salvaging such soft ice cream;

FIG. 13 is a fragmentary side elevational view of the rotary extruder device and illustrating the trimmer device shown in FIG. 12;

FIG. 13A is a sectional plan view on line 13A—13A in FIG. 13 of the ice cream trimmer device which is shown in FIGS. 12 and 13;

FIG. 13B is a sectional detail view, on line 13B—13B in FIG. 13, of a hold-down device employed in connection with the trimmer device shown in FIGS. 13 and 13A;

FIG. 14 is a top plan view of the first or bottom cookie-centering device shown in part in FIG. 12;

FIG. 15 is a side elevational view of the first or bottom cookie-centering device shown in FIGS. 12 and 14;

FIG. 16 is a transverse sectional view of the first or bottom cookie-centering device on line 16—16 in FIG. 14;

FIG. 17 is a lateral side elevational view of the rotary ice cream extruder device;

FIG. 18 is an end elevational view of the rotary ice cream extruder device shown in FIG. 17 showing one of the ice cream chambers in the discharge or dispenser outlet from one of the ice cream chambers in the body of the rotary ice cream extruder device;

FIG. 19 is a central vertical sectional view of the rotary ice cream extruder device, on line 19—19 in FIG. 17;

FIG. 20 is a horizontal sectional view of the rotary ice cream extruder device, on line 20—20 in FIG. 17;

FIG. 21 is a fragmentary detail view of the tubular ice cream supply member for feeding frozen ice cream under pressure into the ice cream chambers in the rotary ice cream extruder device and showing the discharge outlet therefrom;

FIG. 21A is an elevational view of the annular rim member which is removably mounted on the generally cylindrical body of the rotary ice cream extruder device and showing the dispensing or discharge outlets therein;

FIG. 22 is a fragmentary side elevational view illustrating parts of the second or bottom cookie storage magazine or hopper and the means, which forms a part of the guideway or trackway, for supporting the stack of cookies in the second or bottom cookie storage magazine or hopper and for raising or lifting the entire stack of cookies in the second or bottom cookie storage magazine or hopper upwardly out of the path of travel of the endless conveyor and the article-advancing means or pusher finger members thereon in the event of jamming or other malfunctioning of the machine, or for other reasons;

FIG. 23 is a fragmentary top plan view of the second or bottom cookie storage magazine or hopper shown in FIG. 22;

FIG. 24 is a view on line 24—24 in FIG. 22, partly in section and partly in elevation, illustrating the second or bottom cookie storage magazine or hopper; the second cookie stack-supporting and raising or lifting means; and showing parts of the endless conveyor and article-advancing means or pusher finger members thereon;

FIG. 25 is a fragmentary side elevational view illustrating the second or top and bottom cookie-centering device and one of the cookie hold-down devices embodied in the invention;

FIG. 26 is a fragmentary top plan view of the second or top and bottom cookie-centering device and cookie hold-down device shown in FIG. 25;

FIG. 27 is a side elevational view of the second or top and bottom cookie-centering device shown in FIGS. 25 and 26;

FIG. 28 is a top plan view of the second or top and bottom cookie-centering device shown in FIGS. 25, 26 and 27;

FIG. 29 is an end elevational view, partly in section, of the second or top and bottom cookie-centering device shown in FIGS. 25, 26, 27 and 28;

FIG. 30 is a fragmentary perspective view of the part of the guideway or trackway and part of the second or top and bottom cookie-centering device shown in FIGS. 25, 26, 27, 28 and 29;

FIG. 31 is a fragmentary side elevational view of one of the cookie hold-down devices embodied in the invention;

FIG. 32 is a top plan view of the cookie hold-down device shown in FIG. 31;

FIG. 33 is a central vertical sectional view, on line 33—33 in FIG. 32, illustrating one of the cookie hold-down devices;

FIG. 34 is a top plan view of the wrapper folding device embodied in the invention for folding and wrapping the web of flexible, water-resistant, heat-sealable wrapping material around the completed ice cream cookie sandwich;

FIG. 35 is a side elevational view of the wrapper folding device illustrated in FIG. 34;

FIG. 36 is an end elevational view of the wrapper folding device shown in FIGS. 34 and 35, as seen from the righthand end in FIG. 35;

FIG. 37 is a fragmentary detail view of part of the folding and wrapping device shown in FIGS. 34, 35 and 36;

FIG. 38 is a schematic view illustrating the web of flexible, water-resistant heat-sealable wrapping material overlying the completed ice cream cookie sandwich at the beginning of the folding and wrapping operations;

FIG. 39 is a view partly in section and partly in elevation showing the first step in the wrapping and folding operations;

FIG. 40 is a view, partly in section and partly in elevation, showing the next step in the wrapping and folding operations;

FIG. 41 is a view, partly in section and partly in elevation, showing the third step in the wrapping and folding operations;

FIG. 42 is a view, partly in section and partly in elevation, showing a further and final step in the wrapping and folding operations;

FIG. 43 is a view, partly in section and partly in elevation, showing the operation of heat-sealing together the parallel vertically extending bottom edge portions of the flexible, water-resistant heat-sealable wrapping material;

FIG. 43A is a view partly in section and partly in elevation, showing the flexible, water-resistant heat-sealable wrapping material folded and wrapped around the completed ice cream cookie sandwich and with its parallel vertically extending bottom edge portions heat-sealed together;

FIG. 44 is a perspective view illustrating the heat-sealing and wrapper web-cutting or web-severing devices embodied in the machine;

FIG. 45 is a view, partly schematic and partly in elevation, illustrating the heat-sealing device embodied in the machine for heat-sealing the end edge portions of the flexible, water-resistant heat-sealable wrapping material together about the completed ice cream cookie sandwich, and showing the web-cutting or web-severing device embodied in the machine for cutting or severing the completed, wrapped and heat-sealed ice cream cookie sandwiches from each other and from a chain of the same at the completion of the operations of the machine;

FIG. 46 is a view, partly schematic and partly in elevation, of the heat-sealing and web-cutting or web-severing devices shown in FIGS. 44 and 45, and showing the delivery or discharge roller at the delivery end of the machine;

FIG. 47 is a top plan view of the parts shown in FIG. 46;

FIGS. 48 to 53, inclusive, are plan views of various designs and shapes which the discharge or extrusion outlets formed in the annular rim member shown in FIG. 21A on the generally cylindrical body of the rotary ice cream extruder device may take to form correspondingly shaped ice cream bodies to conform to the shape of the bottom and top cookies which may be employed therewith to form ice cream cookie sandwiches of various designs and shapes;

FIG. 54 is a fragmentary sectional detail view on line 54—54 in FIG. 48;

FIG. 55 is a sectional view, on lines 55—55 in FIG. 56, showing parts of the power transmission means for operating the endless conveyor and the article-advancing means or pusher finger members thereon;

FIG. 56 is a side elevational view of the parts shown in FIG. 55;

FIG. 57 is a sectional view of the supporting and latching means for the wrapper web feed roll embodied in the machine;

FIG. 57A is a sectional detail view on line 57A—57A in FIG. 57;

FIG. 58 is a sectional detail view on line 58—58 in FIG. 57 showing the latching means for latching the wrapper web feed roll to the supporting frame structure of the machine;

FIG. 59 is an elevational view of the power transmission means for operating the heat-sealing and web-cutting or web-severing devices embodied in the invention;

FIG. 60 is a vertical sectional view, on line 60—60 in FIG. 2, illustrating the rotary ice cream extruder device and the power transmission means therefor and the means for latching the rotary ice cream extruder device in various adjusted vertical positions relative to the guideway or trackway;

FIG. 61 is a sectional detail view of part of the power transmission means for the rotary ice cream extruder device;

FIG. 62 is a view, partly in section and partly in elevation, illustrating the heat-sealing device for heat-sealing together the vertically extending parallel bottom edge portions of the flexible, water-resistant heat-sealable wrapping material and the power transmission means therefor;

FIG. 63 is a view, partly in vertical section and partly in elevation, of the rotary web-cutting or web-severing device and the power transmission means therefor;

FIG. 64 is a vertical sectional view of the heat-sealing device for heat-sealing the end edge portions of the flexible, water-resistant heat-sealable wrapper around the completed ice cream cookie sandwich;

FIG. 65 is an elevational view, partly schematic, illustrating the power means and the power transmission for the endless conveyor unit, the ice cream pump, and other parts embodied in the machine;

FIG. 66 is a top plan view of the parts shown in FIG. 65;

FIG. 67 is a top plan view showing the heat-sealing devices and the web-cutting or web-severing device embodied in the machine and the power transmission means therefor;

FIG. 68 is a side elevational view illustrating the flexible power transmission means for the rotary ice cream extruder device and illustrating part of the means for adjusting the position of the rotary ice cream extruder device around and relative to its horizontal axis to synchronize the position of the discharge outlets therein with the movement of the endless conveyor unit and the position of the first or bottom cookie as it is moved along the guideway or trackway by the endless conveyor and the article-advancing means or pusher finger members thereon;

FIG. 68A is a sectional view on line 68A—68A in FIG. 68;

FIG. 69 is a fragmentary vertical sectional view on line 69—69 in FIG. 68;

FIG. 70 is a sectional plan view on line 70—70 in FIG. 68;

FIG. 71 is a side elevational view of certain of the parts shown in FIGS. 68, 69 and 70;

FIG. 72 is a sectional plan view on line 72—72 in FIG. 68;

FIGS. 73 to 76, inclusive, are detail views of the means embodied in the new machine for retarding or slowing down the movement of the first or bottom cookie as it is being ejected from the first or bottom cookie storage magazine or hopper to prevent breakage thereof and the means for preventing more than one cookie at a time from being ejected or dispensed from the first or bottom cookie storage magazine or hopper;

FIG. 77 is a view, partly in section and partly in top plan, of a device associated with the second or top cookie storage magazine or hopper for preventing more than one cookie at a time from being ejected therefrom at each dispensing operation;

FIG. 78 is a fragmentary perspective and partially schematic view of the trackway or guideway embodied in the invention including the two vertically movable sections thereof and the downwardly inclined midsection of the guideway or trackway;

FIG. 79 is a transverse sectional detail view on line 79—79 in FIG. 78;

FIG. 80 is a schematic diagram of the electric circuits embodied in the invention for operating the single electric driving motor embodied in the machine and for energizing the heating coils in the heat-sealing devices embodied in the invention;

FIG. 81 is a schematic view of the power means in the form of the single electric driving motor and the power transmission means under the control of the single electric driving motor for operating the various movable means and devices embodied in the invention;

FIG. 82 is a timing chart showing the time required to perform each of the various operations of the machine as performed in a cycle of operations thereof;

FIG. 83 is a schematic view illustrating a continuous product flow unit, such as a continuous flow ice cream maker-freezer unit, and associated parts of the new machine, for controlling the volume of flowable semi-frozen ice cream, or other comestible or edible food product, fed into the rotary extruder device in relation to the first or bottom cookie or other protective or bottom carrier member and for synchronizing the flow of flowable semi-frozen ice cream or like edible food product with the speed of the machine; and FIGS. 84 to 87, inclusive, are perspective views of other forms of food products which may be made by the new machine.

1

GENERAL DESCRIPTION OF THE CONSTRUCTION AND OPERATION OF THE MACHINE

A preferred and typical embodiment of the invention is illustrated in the drawings, wherein it is generally indicated at 75 and comprises a supporting frame, generally indicated at 75 on which the operating and other parts of the machine are mounted. The machine includes an endless conveyor unit, in the form of a single sprocket chain 77, which is movably mounted at the front turn thereof, on a sprocket gear, as 78, which is, in turn, carried by a horizontally extending shaft, as 79, which is rotatably mounted in the supporting frame 76 (FIG. 1). At its opposite end or rear turn the sprocket chain endless conveyor unit 77 works over a sprocket gear 80 which is mounted on a shaft 81 and the shaft 81, the endless conveyor sprocket chain 77 and the sprocket gears 78 and 80 are driven by power means in the form of a variable speed electric motor 83 and power transmission means, generally indicated at 83, (FIGS. 2, 80 and 81) and which is arranged within a generally rectangular-shaped wheel-bearing housing 101 which is disposed below and supports the supporting frame 76 of the machine 75 and is movable therewith (FIG. 1).

The machine 75 includes a generally horizontally extending trackway or guideway, generally indicated at 84, which includes a pair of spaced horizontally extending and generally L-shaped guide rails 85 (FIGS. 5, 78 and 79) which are mounted on the supporting frame 76 and extend generally horizontally lengthwise of the machine 75 past the various work stations in the machine at which the various operations of the machine are performed, as will be explained hereinafter.

The endless conveyor sprocket chain 77 is arranged inwardly of a guard member 76a on the supporting frame 76 (FIG. 1) and guided by means of upper guide rollers 401, which are carried by supporting members 402 which are attached as at 403, to a wall 404 of an elongated generally channel-shaped housing 331, which forms part of the supporting frame 76. In addition, the endless conveyor sprocket chain 77 is guided by lower guide rollers 405 which are carried by supporting members 406, which, in turn, are supported by a horizontally extending supporting member 407 which forms part of the supporting frame structure 76 and is, in turn, supported by supporting arm members 408 which are attached to the supporting wall 404 (FIG. 7). Each of the supporting shaft members 86 has a roller 447 thereon and these rollers 447 travel between the upper and lower guide rollers 401 and 405, respectively (FIGS. 7, 8 and 24).

A plurality of horizontally extending supporting shaft members 86 are mounted on and are carried by and are attached to the single sprocket chain endless conveyor 77 and project laterally therefrom at spaced intervals thereon, and each of these supporting shaft members 86 has article-advancing means in the form of a generally wedge-shaped pusher finger member 87 thereon. These article-advancing means or pusher finger members 87 extend upwardly from the upper run of the endless conveyor unit 77–86 and engage and advance the first or bottom cookie, the first or bottom cookie with the filler body of ice cream thereon, and the assembled ice cream sandwich with the second or top cookie thereon along the guideway or trackway 84-85 through the machine from the front or feed-in end thereof (right-hand end, FIGS. 1, 2 and 3) to the discharge or delivery end thereof (left-hand end, FIGS. 1, 2 and 3) and to the various work stations at which the various operations of the machine are performed. 171

The first work station in the machine is a first and bottom cookie storage hopper or magazine, generally indicated at 119, which is mounted on the supporting frame 76 at the feed-in end of the machine (right-hand end, FIGS. 1, 2 and 3). The first or bottom cookies or wafers 89 are deposited one at a time from the lower end portion of the first cookie or wafer storage hopper or magazine 119 onto a pair of spaced generally horizontally extending cookie stack-supporting and raising or lifting arms 145 which are attached to and project inwardly from a pair of guide or track rails 144 (FIGS. 9, 10 and 78) which form a part of the guideway or trackway 84-85. These cookie stack-supporting and raising or lifting arms 145-145 and attached guide or track rails 144-144 form a part of the guideway or trackway 84-85 (FIGS. 78 and 79) and also form part of a first cookie stack-supporting and raising or lifting device, generally indicated at 161 (FIGS. 1, 2, 3, 4, 6,

7, 9 and 10) which is movably mounted on the supporting frame structure 76, as at 161 (FIGS. 6 and 11) adjacent the first cookie storage magazine or hopper 119 for supporting the entire stack of cookies 89 in the first or bottom cookie storage magazine or hopper 119 and for raising or lifting the entire stack of cookies 89 in the first cookie storage magazine or hopper 119 upwardly out of the path of travel of the article-advancing means or pusher finger members 87 on the endless conveyor 77-86-87 in the event of jamming or other malfunctioning of the machine, or for other reasons, as will be described hereinafter.

The first cookie stack-supporting and raising or lifting device 139 is manually operable about its mounting 157 by means of a handle member 140 by which the cookie stack-supporting and raising or lifting arm members 145 and their supporting rails 144 may be moved on and relative to the mounting 150 so as to raise or lift the entire stack of the first or bottom cookies in the first cookie storage magazine or hopper 119 upwardly out of the path of travel of the article-advancing means or pusher finger members 87 on the endless conveyor 77-86-87 in the event of jamming or other malfunctioning of the machine, or for other reasons.

However, when the first cookie stack-supporting and raising or lifting device 139 is in its normal and lowered position, the article-advancing means or pusher finger members 87 on the upper run of the endless conveyor unit 77-86-87 sequentially engage the first or bottom cookies 89 at the first work station and move then one at a time off from the movably mounted cookie stack-suporting and raising or lifting arms 145 and attached guide or track rails 144 to the next and second work station, namely, the rotary ice cream extruder head device, which is generally indicated at 90, and which includes a generally cylindrical ice cream extruder or dispensing body member 91 which is attached to a supporting and mounting member 92 which is rotatably journaled in an anti-friction bearing unit 93 which is supported by a depending supporting frame or carriage 39 which is attached to the supporting or mounting member 92, as will be described hereinafter (FIG. 60).

The generally cylindrical rotary extruder head device 90-91 embodies a series of radially arranged and spaced ice cream chambers 94 therein (FIGS. 17 to 20, inclusive) into which the edible ice cream filler body is sequentially fed from a tubular ice cream supply member 95 from an ice cream maker freezer by means of a positive displacent ice cream pump 311, as will be described hereinafter. Each of the ice cream chambers 94 in the generally cylindrical body 91 of the rotary ice cream extruder head device 90-91 opens, by way of an outlet or discharge opening 221 onto the peripheral surface 96 of the generally cylindrical body 91 of the rotary ice cream extruder head device 90-91, so that as the rotary ice cream extruder head device 90-91 is rotated, a measured and uniform quantity of frozen ice cream is deposited sequentially on the first or bottom cookies or wafers 89 from each of the chambers 94 in the rotary ice cream extruder head device 90-91 as the latter is rotated in the operation of the machine.

The thus partially completed ice cream cookie sandwich 89-97 is then moved by the endless conveyor 77-86-87 and the article-advancing means thereon, that is, one of its pusher finger members 87, along the trackway 84-85 to the next and third work station, which is in the form of a second cookie or wafer storage magazine or hopper, generally indicated at 98 (FIGS. 1, 2, 3, 22, 23 and 24), which will be described in detail hereinafter. The second cookie storage magazine or hopper 98 is similar in construction and operation to the first cookie storage magazine or hopper 119 and a second or top cookie or wafer 99 is deposited therefrom onto the upper surface of the ice cream filler body 97, thereby completing the assembly of the bottom and top cookies or wafers 89 and 99, respectively, with the edible filler body 97 of ice cream therebetween (FIGS. 24 and 78), and thus completing the assembly of the ice cream cookie sandwich 89-97-99.

The second cookie stack-supporting and raising or lifting device 139a, which is similar in construction and operation to the first cookie stack-supporting and raising or lifting device 139, is associated with the second cookie storage magazine or hopper 98 and includes a pair of generally horizontally extending cookie-supporting and raising or lifting arm members 145a-145a (FIGS. 1, 2, 22, 24 and 78) which are mounted on the inner sides of guide or track rails 144a-144a which form part of the guideway or trackway 84-85 (FIG. 78). Hence those parts of the second cookie stack-supporting and raising or lifting device 139a which are similar to or correspond to parts in the first cookie stack-supporting and raising or lifting device 139, have been given the same reference numerals followed by the additional and distinguishing reference character a.

In the use of the new machine 75, the entire stack of the second or top cookies 99 in the second cookie storage magazine or hopper 98, is supported by the cookie-supporting and raising or lifting arm members 145a-145a and attached guide or track rails 144-144 and the top cookies 99 are sequentially ejected from the stack of second or top cookies 99 in the second or top cookie storage magazine or hopper 98 onto the cookie-supporting and raising or lifting arm members 145a-145a by the article-advancing means in the form of the upwardly extending pusher finger members 87 on the upper run of the endless conveyor unit 77-86-87 and onto the upper surface of the ice cream filler body 97 and the underlying first or bottom cookie 89 as the latter are moved over the cookie stack-supporting and raising or lifting arm members 145a-145a and attached guide or track rails 144a-144a which may be manually operated and raised or lifted upwardly on their movable mountings 161a-161a by manipulation of the handle member 140a (FIG. 22) so as to raise or lift the entire stack of top cookies 99 upwardly in the second cookie storage magazine or hopper 98 out of the path of travel of the first or bottom cookies 89 and the filler body 97 of ice cream thereon in the event of jamming or malfunctioning of the machine, or for other reasons, as will be explained more fully hereinafter.

As may be seen by reference to FIG. 78 of the drawings, each of the rails 85-85 of the guideway or trackway 84-85 has a downwardly inclined center or midsection 409 which terminates forwardly or in advance of the second cookie stack-supporting and raising or lifting arm members 145a-145a and their supporting rails 144a-144a so that the first or bottom cookie 89 and the filler body 97 of ice cream thereon will pass under the lowermost or bottom cookie 99 in the stack of second or top cookies 99 in the second cookie storage magazine or hopper 98, as supported by the second or top cookie supporting and raising or lifting arm members 145a-145a and their attached guide or track rails 144a-144a and thus enable the article-advancing means, that is, one of the pusher finger members 97 on the upper run of the endless conveyor 77-86-87 to eject a second or top cookie 99 from the second or top cookie storage magazine or hopper 98 onto the upper surface of the filler body 97 of ice cream carried by the underlying first or bottom cookie 89.

The thus assembled ice cream cookie sandwich 89-97-99 is then moved further along the guideway or trackway 84-85 by the endless conveyor unit 77-86-87 and its article-advancing means or pusher finger members 87, to the next and fourth work station in the machine at which a feed roll 99a of flexible water-resistant heat-sealable waxed paper or like flexible water-resistant, heat-sealable plastic wrapping film 102, such as polyethylene film, is rotatably mounted on a tubular supporting sleeve 288 which, in turn, is mounted on a horizontal shaft 100 which is carried by an upright supporting member 101 which is mounted on and projects above the supporting frame 76 and the guideway or trackway 84-85 (FIGS. 1, 2, 3 and 57). At this work station the web 102 of flexible, water-resistant heat-sealable waxed paper or like flexible water-resistant heat-sealable wrapping film material is unwound from the feed roll 99 and is directed between a pair of spaced horizontally extending guide rollers 103-104 which are rotatably mounted on an upright support 105 which is attached to and projects above the supporting frame 76 over the guideway or trackway 84-85 (FIGS. 1 and 2). The web 102 of flexible, water-resistant, heat-sealable wrapping material is then directed to and through a folding and wrapping device, generally indicated at 107, and by which the web 102 of wrapping material is folded and wrapped about the body of the completed ice cream cookie sandwich 108 (FIGS. 38 to 43, inclusive, and FIG. 43A), as will be described more fully hereinafter.

The thus assembled and wrapped ice cream cookie sandwich 108, with the flexible, water-resistant, heat-sealable wrapper 102 thereon, is then moved along the trackway 84-85 by the article-advancing means or pusher finger members 87 on the upper run of the endless conveyor 77-86-87 to the next and fifth work station, namely, to the first heat-sealing device 109 at which the parallel bottom edge portions 102d of the wrapper 102 are heat-sealed together, whereupon the thus wrapped and partially heat-sealed ice cream cookie sandwich 108 is then moved by the article-advancing means or upwardly extending pusher finger members 87 on the upper run of the endless conveyor 77-86-87 to the next and sixth work station, that is, to a second heat-sealing device 111 at which the parallel end portions 112 of the wrapper 102 are heat-sealed together (FIGS. 44 to 47, inclusive), as will be described more fully hereinafter.

The thus wrapped and heat-sealed ice cream cookie sandwich 108 is then moved further along the trackway 84-85 by the article-advancing means or pusher finger members 87 on the upper run of the endless conveyor 77-86-87 to the next or seventh and final work station, namely, to the web-cutting or web-severing device, generally indicated at 113, and by which the fully wrapped and heat-sealed ice cream cookie sandwiches 108 are cut or severed from each other and from a chain of the same and are then delivered from the trackway 84-85 onto a take-away or delivery roller 282 by which they are discharged onto a take-away conveyor 115 for delivery to a freezer for storage or use, at the delivery end of the machine (left-hand end, FIGS. 1, 2, 3, 44, 45, 46 and 47).

It will be noticed by reference to FIGS. 12 and 13 that the new ice cream cookie sandwich making machine 75 includes a trimming device 185 which includes a wire trimmer or cutter member 186 which is supported by a generally U-shaped metallic frame member 187 and the wire trimmer or cutter member 186 extends transversely across the trackway 84-85 below the rotary ice cream extruder head device 90 so as to trim the upper portion of the filler body of ice cream 97 to a predetermined size as it is deposited on the first or bottom cookie 89 from the rotary extruder head device 90 (FIGS. 1, 12, 13 and 13A).

As shown in FIGS. 12, 13 and 13A, the generally U-shaped supporting frame member 185 includes a pair of spaced parallel arms 448 and a bight portion 187 and the generally U-shaped supporting frame member 185 is attached, as by welding 450, to a supporting bracket member 431 which is mounted on and projects upwardly from the guideway or trackway 84-85 (FIGS. 12 and 13). The generally U-shaped metallic supporting frame member 185 for the wire trimmer or cutter member 186 is preferably made of relatively thin and resilient stainless steel so that it will flex somewhat in use as the wire trimmer or cutter member 186 trims or cuts off the upper portion of the ice cream filler body 97, in use.

It will also be noted that the new machine 75 includes combination scraper and ice cream salvage means for scraping from the peripheral surface of the rotary ice cream extruder head device the relatively warm and soft ice cream which may be extruded from the rotary ice cream extruder head device 90 at the start-up of the machine, or when the ice cream in the ice cream chambers 94 of the rotary ice cream extruder head 90 has become warm and soft upon standing. This combination scraper and ice cream salvage means 189 includes an ice cream receptacle 410 which is arranged adjacent the peripheral surface 96 of the rotary ice cream extruder head device 90 and which includes a scraper member 193 by which the relatively warm and soft ice cream extruded from the rotary ice cream extruder head device 90 at the start-up of the machine is scraped and fed into the receptacle 410 from which it may be salvaged as by return to the frozen ice cream freezer or storage magazine or freezer 412 (FIGS. 1, 2, 3A, 3B and 12).

Having thus generally described the construction and operation of the new ice cream cookie sandwich making machine 75, a detailed description of the various components, parts and devices embodied therein will now be given, as far as possible, in the order or sequence in which such various components, parts and devices are used and function in performing the various functions and operations of the machine at the various work stations at which such functions and operations are performed.

- a -

The Endless Conveyor 77 and the Guideway or Trackway 84-85-144-145-144a-145a Therefor (FIGS. 1,2,3,5,7,8,9,10,22,24,30,78 and 79)

As pointed out hereinbefore, the single sprocket chain endless conveyor unit 77 (FIG. 78) is guided between upper and lower guide rollers 401 and 405, respectively, which are carried by suporting members 402 and 406, respectively, and the laterally projecting supporting shaft members 86, which carry the article-advancing means in the form of the upwardly extending pusher finger members 87, on the upper run of the endless conveyor 77-86-87 are guided in a horizontally extending slot 413 which is formed in the horizontally extending supporting member 407 which is supported by supporting members 408 attached to a horizontally extending wall 33 of the supporting frame 76 (FIGS. 7 and 8).

The stationary rails 85 of the generally horizontally extending guideway or trackway 84-85-144-145-144a-145a are suitably supported on the supporting frame structure 76 and are spaced laterally from each other above the endless conveyor device 77-86-87 so that the upwardly extending pusher finger members 87 on the upper run of the endless conveyor 77-86-87 project upwardly between and travel between the side rails 85 of the endless conveyor 84 so as to engage the first or bottom cookie 89 supported on the cookie stack-supporting and raising or lifting arms 144-144 as they move along the trackway or guideway 84-85-144-144 and thereafter engage the bottom cookie member 89 with the body 97 of ice cream thereon and subsequently engage the assembled bottom and top cookies 89 and 99 with the ice cream filler body 97 therebetween.

As pointed out hereinbefore, the generally horizontally extending trackway or guideway 84-85-144-145-144a-145a has a stationary mid-section 409 which is inclined or slopes downwardly (FIG. 78) so as to enable the bottom cookie 89 with the body 97 of ice cream thereon to pass under the second cookie stack-supporting and raising or lifting arm members 144a-144a and thus enable the second or top cookie 99 to be deposited thereon from the second cookie storage magazine or hopper 98 (FIG. 78).

- b -

The First or Bottom Cookie Storage Magazine or Hopper 119

(FIGS. 1,2,3,4,6,7 and 8)

The first or bottom cookie storage magazine or hopper, which is generally indicated at 119 (FIGS. 1, 2, 3, 4, 6, 7 and 8) embodies a first or bottom cookie storage or hopper member 120 which includes a chute 121 having lateral or side flanges 414 and having a lower and generally vertically extending portion 122 and an upper portion 123 which is inclined upwardly at an acute angle from the lower and generally vertically extending portion 122. Guide rails or side flanges 124 are provided on the outer edge portions of the guide member or chute 121 (FIGS. 4, 6 and 7).

The first or bottom cookie storage magazine or hopper 119 also includes auxiliary cookie guide rails 125 which are arranged or spaced outwardly of the main cookie chute 120-121-122-123-124 and these auxiliary guide rails 125 are curved to correspond to the curvature of the main cookie guide chute 120-121-122-123-124 (FIGS. 6, 7 and 8).

As best shown in FIGS. 7 and 8 of the drawings, the inclined cookie guide or chute 120-121-123-124 is attached to and is supported by an upright supporting wall member or bracket 414 which has a horizontally extending supporting base portion 415 which is attached, as by fastening elements in the form of bolts 416, to a horizontally extending supporting member 417 which, in turn, is attached by fastening elements in the form of bolts 418 to the wall 404 of the supporting frame structure 76-331 and is attached, as by bolts 419, to a horizontally extending top wall 420 of the generally channel-shaped housing portion 331 of the supporting frame structure 76; the housing portion 331 of the supporting frame structure 76 having a vertically extending rear wall 421 which is disposed at the back of the machine 75 as seen from the front thereof (FIGS. 1 and 2) (FIGS. 7 and 8).

As shown in FIGS. 7 and 8, the lower end portions of the curved front cookie guide members 125 are attached, as by welding 422, to upright supporting bracket members 148, which will be described in further detail hereinafter in connection with other parts of the machine 75.

In the use of the new machine, the first or bottom cookie storage magazine or hopper unit 119-120-122-113-124 is filled with a stack of first or bottom cookies or wafers 89 which bear against the rear guide rails or side flanges 124 thereon, with the lowermost cookie or wafer 89 resting on the movably mounted cookie-supporting and raising or lifting arm members 145-145 of the first cookie stack-supporting and lifting device 139 which, as pointed out above, forms the first part of the cookie guideway or trackway 84-85 (FIG. 78), so that as the upper run of the endless conveyor unit 77-86-87 moves along, but below the guideway or trackway 84-85-144-145, the article-advancing means in the form of the upwardly extending pusher finger members 87 on the upper run of the endless conveyor 77-86-87 engage the lowermost cookie or wafer 89 in the stack thereof and move it along and off the first or bottom cookie stack-supporting and raising or lifting arm members 144-144 onto the downwardly inclined stationary mid-portion 409 of the trackway or guideway 84-85 and toward and to a point under the rotary ice cream extruder device 90-91 from which a body 97 of ice cream is extruded from one of the chambers 94 of the rotary extruder device 90-91 by way of its extruder outlet opening 221 (FIGS. 4, 13, 18, 19 and 20) onto the first or bottom cookie 89.

- c -

The First or Bottom Cookie Stack-Supporting and Raising or Lifting Device 139 Which Forms the First and Movable Part of the Guideway or Trackway (FIGS. 1,2,3,4,6,7,8,9,10 and 11)

As pointed out above, it may happen in the use of the new machine 75 that the machine may become jammed or malfunction for any one of various reasons and, in such event, it is desirable to stop the feed of bottom cookies 89 from the first or bottom cookie storage magazine or hopper 119, as well as the feed of the top cookies 99 from the second or top cookie storage magazine or hopper 98, without stopping the movement of the endless conveyor 77-86-87 or the progress of completed or partially formed ice cream cookie sandwiches through the machine and for delivery therefrom. To this end the present invention provides a novel first or bottom cookie stack-supporting and raising or lifting device 139 for supporting the entire stack of first or bottom cookies 89 in the first cookie storage magazine or hopper 119 and for raising the entire stack of first or bottom cookies 89 up out of the path of travel of the article-advancing means or pusher finger members 87 on the upper run of the endless conveyor 77-86-87 in the event that the machine becomes jammed or malfunctions for any reason.

A similar cookie stack-supporting and raising or lifting device 139a is provided for use in conjunction with the second or top cookie storage magazine or hopper 98. However, since both of these cookie stack-supporting and lifting or raising devices 139 and 139a are similar in construction and operation, only the first cookie stack-supporting and lifting device 139, which is used in conjunction with the first or bottom cookie storage magazine or hopper 119, will be described in detail, and those parts of the second and similar cookie stack-supporting and lifting device 139a, which is used in conjunction with the second or bottom cookie storage magazine or hopper 98, have been given the same reference numerals followed by the additional and distinguishing character a (FIGS. 1, 2, 3, 4, 6, 7, 8, 9, 10, 11, 22, 24 and 78).

Thus, the first cookie stack-supporting and raising or lifting device, which is associated with the first or bottom cookie storage magazine or hopper 119, is illustrated in FIGS. 1, 2, 3, 4, 6, 7, 8, 9, 10 and 11, wherein it is generally indicated at 139 and includes an angularly extending handle member 140 which has a lower end portion which is mounted in a socket 143.

In a manner which will be described presently, the handle member 140 is manually operable to raise or lower the first cookie stack-supporting and raising or lifting arm members 145-145 which are attached to the track or guide rails 144-144, and which together form the first and movable part of the guideway or trackway 84-85-144-145-144a-145a, as pointed out hereinbefore, and as shown in FIG. 78.

The socket member 143 is attached to a supporting member 150 which is arranged between a pair of spaced supporting bracket members 155 each of which has a laterally projecting portion or arm 156 which is attached, as by a bolt 157, to a horizontally extending supporting member 158 which extends transversely across the trackway or guideway rails 144 and the first cookie stack-supporting and raising or lifting arm members 145 attached thereto, as shown in FIGS. 9 and 11, this supporting member 158 being attached to the supporting frame structure 76. A pivot pin member 161 is attached to the supporting member 160 and is rotatably journaled in bearing recesses 423 formed in the supporting bracket members 155 (FIGS. 9 and 11). A pair of split or bifurcated bearing members 152 are attached, as by welding 425, to the guideway or trackway rail members 144 and project above the guideway rail members 144 (FIGS. 10 and 11). A bearing member 153 is mounted on each of the supporting bracket members 155 and projects above the latter (FIGS. 9, 10 and 11). An eccentric slot 151 is formed in and extends through the split or bifurcated bearing members 152, and through the supporting bracket members 154 and a generally cylindrical link member 150 is mounted in and extends through the eccentric slot 151.

The first cookie stack-supporting and raising or lifting device 139 includes a latching member, generally indicated at 162, (FIGS. 9 and 11) for latching the handle member 140, the guideway or trackway rails 144 and attached cookie stack-supporting and raising or lifting arm members 145 in a raised position so as to retain the entire stack of the first or bottom cookies 89 in the first cookie storage magazine or hopper 119 up out of the path of travel of the article-advancing means or pusher finger members 87 on the endless conveyor 77-86-87. The latching member 162 extends generally horizontally above the bracket members 155 and between the bifurcated collar members 152 and has an end portion which is pivotally mounted, as at 163, on a stationary supporting member 164. The latching member 162 has an end portion 167 which is adapted to engage the handle member 140 when the handle member 140 is in its lowered position, as in dotted lines in FIG. 11, so as to hold the handle member 140 and the movably mounted trackway or guideway rails 144 and attached cookie stack-supporting and raising or lifting arm members 145 in raised but horizontal position, as in dotted lines in FIG. 11.

A handle member 168 is mounted on the upper surface of the latch member 162 and when the latch member 162 is in its normal position, as in dotted lines in FIG. 11, it is adapted to bear against and to engage the upwardly extending arm 167 of a stop member 169 which is attached, as at 423, to the supporting member 164.

The parts of the first cookie stack-supporting and raising or lifting device 139 for the first cookie storage magazine or hopper 119, as described above, are shown in full lines in FIGS. 6 and 11 in the position which they assume when the machine 75 is functioning normally. However, if the machine becomes jammed, or is otherwise malfunctioning, and it is desired to raise the entire stack of the first or bottom cookies 89 in the first or bottom cookie storage magazine 119 upwardly out of the path of travel of the pusher finger members 87 on the upper run of the endless conveyor 77-86-87, this is accomplished as follows. The handle member 140 is manually pivoted or depressed clockwise from its normal position, as in full lines in FIGS. 6 and 11, into the position in which it is shown in dotted lines in the same figures. This motion of the handle member 140 causes it rotate on its pivotal mounting pin member 161, relative to the stationary supporting brackets 155, and since the pivotal mounting pin member 161 is attached to the supporting member 160 the supporting member 160 is likewise pivoted (clockwise, FIG. 11). This pivotal motion of the supporting member 160, acts through the lost motion connection between the pin or shaft 150 and the eccentric slot 151, to move the bearing member 154 and the split collar members 152 and since the split collar members 152 are attached, as by welding 424, to the guideway or trackway rials 144, the guideway or trackway rails 144 and attached cookie stack-supporting and raising or lifting arm members 145 are raised (clockwise, FIG. 11) from their normal and lowered operation position as in full lines into raised or dotted line horizontal position, as in FIG. 11, thereby lifting or raising the entire stack of first or bottom cookies 89 upwardly in the cookie chute 120 out of the path of travel of the upwardly extending pusher finger members 87 on the endless conveyor 77-86-87 so that the endless conveyor 77-86-87 will run idle past the first cookie storage magazine or hopper 119. During this movement of the first or bottom cookie-supporting and raising or stack lifting device 139 the bearing members 154 and the split collars 152 are able to move relative to the link member 150 due to the lost motion mounting of the link member 150 in the eccentric slot 151 (FIG. 11).

In order to hold the handle member 140 in its depressed or lowered position and to hold the trackway or guideway rails 144 and their attached cookie stack-supporting and raising or lifting arm members 145 in raised and cookie stack-lifting position, as in dotted lines, FIG. 11, the manually operable latch member 162 is pivoted by its handle 168 from its normal position, as in dotted lines, FIG. 11, into its lowered or effective and latching position, as in full line in FIG. 11, with the end portion 167 of the latch member 162 engaging the lower end portion of the handle member 140 and thus holding or latching the trackway or guideway rails 144 and their attached cookie stack-supporting and raising or lifting arm members 145 in raised and cookie stack-supporting and horizontally extending position, as in dotted lines (FIG. 11).

However, when it is desired to return the guideway or trackway rails 144 and their attached cookie stack-supporting and raising or lifting arm members 145 to their normal operating and lowered horizontal position, as in full lines (FIGS. 6 and 11) so as to lower the entire stack of first or bottom cookies 89 in the first or bottom cookie storage magazine 119 into their normal and lowered position, this is accomplished by manually pivoting the latch member 162 back into its normal position (counterclockwise, from full to dotted line position, FIG. 11) whereupon the trackway or guideway rails 144 and attached cookie stack-supporting and raising or lifting arm members 145 will fall, by gravity, on the pin or shaft members 161 (counterclockwise, from dotted to full line position, FIG. 11), and thus lower the entire stack of the first or bottom cookies 89 in the first or bottom cookie storage magazine or hopper 119 into lowered and horizontal position so that the lowermost bottom cookie 89 in the stack will be deposited on the supporting arm members 145 in a position to be engaged by the article-advancing means, that is, the upwardly extending pusher finger members 87 on the upper run of the endless conveyor 77-86-87 for advancement along the trackway or guideway 84-85 to the rotary ice cream extruder head device 90-91 at the second work station in the operation of the machine.

As will be pointed out hereinafter, the second cookie stack-supporting and lifting or raising device 139a, which is associated with the second or top cookie storage magazine 98, is similar in construction and in operation to the first or bottom cookie stack-supporting and lifting or raising device 139 and may be similarly operated to raise or lift the entire stack of second or top cookies 99 in the second cookie storage magazine or hopper 98 on the cookie stack-supporting and raising or lifting arm members 145 and the second set of movable trackway or guideway rails 144a up out of the path of travel of the upwardly extending pusher finger members 87 on the endless conveyor 77-86-87 in the event of jamming or other malfunctioning of the machine 75, or for other reasons.

-d-

The Retarding and Hold Back Means for Slowing Down the Movement of the Cookie Being Dispensed from the First Cookie Storage Magazine or Hopper and for Permitting Only One Cookie at a Time to be Dispensed from the First or Bottom Cookie Storage Magazine or Hopper and from the Second or Top Cookie Storage Magazine or Hopper (FIGS. 6,7,8 and 73 to 76, Inclusive)

The new machine 75 includes a hold-back device or means, generally indicated at 208 in FIGS. 6, 7, 8 and 73 to 76, inclusive for retarding the movement of the cookie being dispensed from the first or bottom cookie storage magazine or hopper 119 and for permitting only one first or bottom cookie 89 at a time to be ejected from or dispensed from the first or bottom cookie storage magazine or hopper 119 and from the second or top cookie storage magazine or hopper 98.

This device 208 includes an upright supporting member 209 which is mounted on a horizontally extending supporting arm member 210 which extends across the guideway or trackway 84-85 at the discharge side of the first or bottom cookie storage hopper 119 (FIG. 6). The upright supporting member 209 has a laterally extending arm 214 and the upright supporting member 209 is attached to the horizontally extending supporting member 210 by means of a headed screw member 211 which extends through an opening in the laterally extending arm 214 into a threaded recess 212 in the horizontally extending supporting member 210 (FIG. 73).

A similar hold-back device, generally indicated at 208a (FIGS. 2 and 77) is associated with the second or top cookie storage magazine or hopper 98 and those parts thereof which are similar in construction and operation to corresponding parts in the form of the hold-back device 208 shown in FIGS. 73 to 76, inclusive, have been given similar reference numerals followed by the additional and distinguishing reference character a. However, in the form of the hold-back device shown in FIG. 77, and as used in conjunction with the second or top cookie storage magazine or hopper 98, only a single resilient finger 218a is embodied in the device and exerts sufficient pressure on the top cookie 99 in the assembled ice cream sandwich 89-97-99 to prevent more than one cookie at a time from being dispensed from the second or top cookie storage magazine or hopper 98 onto the second or top cookie stack-supporting and raising or lifting arms 145a on the second and movably mounted rails 144a which form part of the guideway or trackway 84-85.

The device 208 which is associated with the first or bottom cookie storage magazine or hopper 119 includes a plurality, namely, three resilient metal arms integrally attached thereto and projecting horizontally therefrom, namely, a central and upper resilient hold-back arm 218 and a pair of lower and outer resilient and slow-down or motion retarding arms 219 which project below the upper and central resilient slow-down or retarding arm 218 (FIGS. 73 to 76, inclusive).

As shown in FIGS. 7 and 8, the resilient and lower outer slow-down or motion-retarding arms 219 project forwardly along the cookie supporting and cookie stack-raising or lifting arm members 145 below the first or bottom cookie storage magazine or hopper 119 and the resilient outer and lower slow-down or motion-retarding arms 219 engage the lowermost bottom cookie 89 as it is ejected from the first or bottom cookie storage magazine 119 (FIGS. 7 and 8) and exert a spring pressure thereon and thus prevent the first or bottom cookie 89 from being ejected too rapidly by one of the pusher finger members 97 on the endless conveyor unit 77-86-87 which might result in breaking the cookie 89. At the same time, the resilient center upper arm 218 engages and exerts spring pressure on the cookie 89 and serves as a hold-back member to prevent more than one cookie at a time from being ejected or dispensed from the first or bottom cookie storage magazine or hopper 119 onto the horizontally extending cookie stack-supporting and cookie stack-raising or lifting arm members 145. During this operation, the lowermost bottom cookie 89 moves in the direction of the arrow in FIG. 73.

However, in the case of the second or top cookie storage magazine or hopper 98 only a single resilient arm member 218a to prevent more than one top or second cookie 99 from being dispensed at each dispensing operation due to the fact that the second or top cookie 99 is dispensed onto the upper surface of the ice cream filler body 97 to which it adheres.

-e-

The First or Bottom Cookie Centering Device (FIGS. 1,2,5,6,12,14,15 and 16)

It is important in the operation of the new machine 75, that the first or bottom cookie 89 from the first or bottom cookie storage magazine or hopper 119 be properly centered on the generally L-shaped guide rails 85 of the guideway 84-85 before it comes under the rotary ice cream extruder device 90 since otherwise the filler body 97 of ice cream from the rotary extruder device 90 might be deposited off-center on the first or bottom cookie 89 with the result that a malformed ice cream cookie sandwich would be formed. Such malformation of the ice cream cookie sandwich might also result from the fact that cookies or wafers may vary considerably in size.

To this end the present invention provides a novel first or bottom cookie-centering means, which is generally indicated at 170, and is shown in FIGS. 1, 2, 5, 6, 12, 14 and 16, and which includes a pair of spring urged cookie-engaging and cookie-centering arm members 171 which extend generally parallel to each other above the cookie guide rails 85 in the cookie guideway or trackway 84-85; each of the cookie-engaging and cookie-centering arm members 171 having a cookie-receiving notch 194 formed therein for the reception of an outer marginal edge portion of the first or bottom cookie 89 (FIG. 16).

As best shown in FIG. 14, the two cookie-guiding and cookie-centering arm members 171 are operatively interconnected for movement together by linkage means 425 which includes a pair of link members 195, each of which has an outer end portion pivotally connected, as at 196, to one of the cookie-guiding and cookie-centering arm members 171. Each of the link members 195 has its inner end portion pivotally connected, as at 426, to an interconnecting link member 197 which is pivotally mounted between its ends, as at 198, on a horizontally extending supporting arm member 199 which extends between and above the cookie guidewy or trackway 84-85 and has one end portion thereof attached, as at 200, to a supporting member 201, which extends transversely and horizontally across the cookie guideway or trackway 84-85 and is attached to the supporting frame 76, as at 202.

resilient means, in the form of a spring member 203, is mounted, as at 204, on a supporting member 205 at the outer side of one of the cookie-guiding and cookie-centering rails 85 of the guideway or trackway 84 and the spring member 203 has a front end portion 206 which engages the outer lateral surface 207 of one of the cooking-guiding and cookie-centering arm members 171 and thus, through the linkage 195-197-195, urges both the cookie-guiding and cookie-centering arm members 171 inwardly toward each other so that they will engage the outer marginal edge portions of the first or bottom cookie 89 as it is moved along the guideway or trackway 84-85, in the notched portions 194 of the cookie-guiding and cookie-centering arm members 171, by the article-advancing means or pusher finger members 87 on the endless conveyor unit 77-86-87.

The arrangement of the first or bottom cookie-guiding and cookie-centering device 170-171 is such that as the first or bottom cookie 89 is moved along the cookie guide rails 85 of the cookie guideway or trackway 84-85 by the upwardly extending pusher finger members 87 on the upper run of the endless conveyor unit 77-86-87, the outer marginal edge portions of the first or bottom cookie 89 enter the notched portions 194 in the spring-urged cookie-guiding and cookie-centering arm members 171 which are urged into engagement with the outer edge portions of the first or bottom cookie 89 by the spring member 203-206 and the linkage 195-197-195; the spring-urged cookie-guiding and cookie-centering arm members 171 moving in uniformity by reason of their interconnection through the linkage members 195-197-195 under the action of the single spring member 203-206.

In this manner, it is assured that as the first or bottom cookie 89 is moved along the guide rails 85 of the guideway or trackway 84-85 from the first or bottom cookie storage hopper or magazine 119 to the rotary ice cream extruder device 90 it will be properly centered on the guide rails 85 of the guideway or trackway 84-85 for the reception of a filler body 97 of ice cream extruder from the rotary ice cream extruder device 90 so that the filler body of ice cream 97 will be deposited from the rotary ice cream extruder device 90-91 in proper position on the upper surface of the first or bottom cookie 89 to assure a properly formed ice cream cookie sandwich and thus to prevent a malformed ice cream cookie sandwich from being formed due to an improper position of the first or bottom cookie 89 as it comes under the rotary ice cream extruder device 90-91, or for other reasons.

The new machine 75 also provides a second centering device for centering the second or top cookie 99 and the ice cream filler body 97 thereon, as they are moved away from the second or top cookie storage magazine or hopper 98 along the guideway or trackway 84-85 by the upwardly extending pusher finger members 87 on the upper run of the endless conveyor unit 77-86-87, as will be described hereinafter.

-f-
The Rotary Ice Cream Extruder Device
(FIGS. 1,2,3,4,6,12,13,17,18,19,20,21,60,72 and 83

As shown in FIGS, 1, 2, 3, 4, 6, 12, 13, 17, 18, 19, 20, 21, 60, 72 and 83, the rotary ice cream extruder device 90 includes a generally cylindrical body 91 which has a series of radially arranged and radially extending ice cream chambers 94 therein which are spaced radially around and relative to the generally cylindrical body 91 and are generally conical in shape with their apices or smaller ends being disposed at their radially inner and inlet ends 554 and with their larger and outer ends and discharge outlets 221 opening outwardly onto the outer peripheral surface 96 of the generally cylindrical body 91 of the rotary extruder device 90.

As will be described more fully hereinafter, the generally cylindrical body 91 of the rotary ice cream extruder device 90 is attached to and is mounted on a tubular sleeve member 92 which is disposed at one lateral side of the generally cylindrical body 91 (FIG. 60) and a tubular ice cream feeder or supply member 95 extends through the tubular sleeve member 92 and extends axially into and through the body 91 of the rotary ice cream extruder device 90-91 (FIG. 60); the tubular ice cream supply member 95 being stationary relative to the tubular sleeve member 92 and the generally cylindrical body 91 of the rotary extruder device 90-91. The tubular ice cream feeder or supply member 95 is connected at its outer end, by way of a supply tube or line 312, to a variable positive displacement ice cream pump 311 (FIG. 3) which is mounted on the longitudinally extending rear end housing portion 331 of the supporting frame structure 76 (FIG. 3). The ice cream feeder or supply member 95 has a discharge outlet opening 175 therein which is located within the generally cylindrical body 91 of the rotary ice cream extruder device 90-91 and the tubular ice cream supply member communicates sequentially with the radially inner and inlet ends 554 of the ice cream chambers 94 in the rotary ice cream extruder device 90-91 as the latter is rotated so that a measured quantity of frozen ice cream is fed or pumped sequentially into each of the ice cream chambers 94 as the rotary ice cream extruder head device 90-91 is rotated on the tubular sleeve member 92, in a manner which will be described hereinafter.

The variable positive displacement ice cream pump 311 may be of any desired and suitable design and construction and a suitable variable positive displacement pump for this purpose is one manufactured by the Waukesha Foundry Company of Waukesha, Wis. and known as its Waukesha Sanitary Pump, Model A-3, Size 10. The variable positive displacement pump 311, is connected by way of a supply line 314 (FIG. 3) to a frozen ice cream storage or supply freezer, generally indicated at 174 (FIG. 3A) in which a supply of semi-frozen ice cream is stored under a pressure of preferably in the order of from 20 to 120 pounds, as it leaves the ice cream storage freezer 412. However, as will be discussed hereinafter, the ice cream may warm up as it is extruded from the rotary ice cream extruder head device 90-91 in which the ice cream is preferably maintained at a pressure in the order of 60 to 80 p.s.i. The average volume or quantity of semi-frozen ice cream extruded from each of the ice cream chambers 94 in the rotary extruder device 90-91 at each extruding operation for cookies of an average size of from 2 × 5 ¼ inches to round or circular cookies of varying diameters, such, for example, as 2 1/6 inches in diameter, is approximately from ¼ to 6 oz., but could range up to 16 oz. or more for large cookies or cakes.

A continuous product flow ice cream maker-freezer unit 412 is one which is manufactured by the Cherry-Burrell Corporation (Park Ridge and Chicago, Ill.) and which may be one of its Models 303, 403 and 603.

The discharge outlet or slot 175 in the tubular ice cream supply member 95 is co-extensive in size and area with the area of each of the apices or radially inner inlet ends 554 of the ice cream chambers 94 in the rotary ice cream extruder device 90-91 (FIGS. 19 and 21), and the size and shape of the discharge outlets 221 of the food or ice cream chambers 94 in the rotary extruder device 90 determine the size and shape of the ice cream or like edible or comestible filler body 97 as it is discharged or dispensed from each of the food or ice cream chambers 94 onto the upper surface of the first or bottom cookie 89 on the guideway or trackway 84-85 (FIG. 13).

As shown in FIG. 60, the sides of the ice cream chambers 94 in the generally cylindrical body 91 of the rotary ice cream extruder device 90-91 are closed at one lateral side by an annular wall 429 and are closed at the opposite lateral side thereof by an annular wall 555; it being noted that the axially inner end portion of the tubular ice cream feeder or supply tube member 95 is closed at its axially inner end by the annular side wall 429 of the generally cylindrical body 91 of the rotary ice cream extruder device 90-91 (FIG. 60).

As shown in FIGS. 17 to 20, inclusive, 21A, and 48 to 54, inclusive, the generally cylindrical body 91 of the rotary ice cream extruder device 90-91 embodies an annular or ring-like rim member 557 which is removably mounted on the generally cylindrical body 91 of the rotary ice cream extruder device 90-91 by means of a generally rectangular-shaped clamping plate member 176 which extends diametrically across the generally cylindrical body 91 of the rotary ice cream extruder (FIGS. 17, 20 and 60) and which is removably held in place by means of a pair of elongated clamping screw members 177 which extend through openings 178 in the generally cylindrical body 91 of the rotary ice cream extruder device 90-91; each of the clamping screw members 177 having a threaded inner end portion 180 which is threaded into a threaded opening 181 in the wall 427 of the tubular sleeve member 92 (FIG. 20). Each of the clamping screws 178 has a handle member 182 thereon at its outer end (FIGS. 17, 20 and 60) and a spacing member 557 is arranged between the clamping plate member 176 and the generally cylindrical body 91 of the rotary ice cream extruder device 90-91 (FIGS. 17, 20 and 60).

As will be explained hereinafter, the discharge or dispensing outlets 221 from the ice cream chambers 94 in the generally cylindrical body 91 of the rotary ice cream extruder device 90-91 are formed in the removable annular rim member and may take various forms, shapes and sizes to conform to the desired shape, size and ornamental configuration of the bottom and top cookies or wafers 89 and 99, respectively of the bottom and top cookies or wafers 89 and 99, respectively, and the shape of the ice cream filler body 97 and the shape and configuration of the completed ice cream sandwich desired. This is accomplished by removing the annular rim member 557 having discharge or dispensing outlets 221 of one design therein and replacing it with another annular rim member 557 having dispensing or discharge outlets 221 of another and different design (FIGS. 48 to 54, inclusive); the removal and replacement of the annular rim member 557 being readily accomplished by removing the clamping screw members 117, by means of their handles 182, then removing the clamping plate member 176, and then sliding the annular rim member 557 off from the generally cylindrical body 91 of the rotary ice cream extruder device 90-91 (FIGS. 17 to 20, inclusive, 21A and 60).

The rotary ice cream extruder device 90-91 is rotated at a predetermined speed, by power transmission means generally indicated at 560 (FIGS. 3, 72, 80 and 81), and by power means in the form of a single electric driving motor 83 (FIG. 81) and which will be described more fully hereinafter, and as it is rotated, the radially inner and inlet ends 554 of the ice cream chambers 94 in the generally cylindrical body 91 of the rotary extruder device 90 sequentially come into registry with the outlet or dispensing slot 175 in the tubular ice cream supply or feeder member 95 so that a measured quantity or body 97 of frozen ice cream is fed or pumped sequentially into each of the ice cream chambers 94 in the body 91 of the rotary ice cream extruder device 90-91 through the radially inner and inlet ends 554 thereof and thence out of the ice cream chambers 94 through the discharge outlets or openings 221 therein onto the upper surface of the first or bottom cookie 89 as the first or bottom cookie 89 is moved along the guideway or trackway 84-85 by the article-advancing means in the form of the upwardly extending pusher finger members 87 on the upper run of the endless conveyor unit 77-86-87.

The first or bottom cookie member 89 with a measured filler body or quantity 97 of frozen ice cream thereon is then moved by the pusher finger member 87 on the upper run of the endless conveyor unit 77-86-87 into a position under the second or top cookie storage magazine or hopper 98 from which a second or top cookie 99 is deposited onto the upper surface of the ice cream filler body 97, to complete the three components 89-97 and 99 on the ice cream cookie sandwich, as will be described more fully hereinafter.

The construction of the ice cream extruder device 90-91, as thus described (FIGS. 17 to 21, inclusive, 21A and 60) is such that it may readily be removed from its mounting at 427 on the tubular sleeve member 92 by removing the fastening screws 428 (FIG. 60), by means of their handles 181, so that the entire body 91 of the rotary ice cream extruder 90-91-557 may be removed to enable the parts thereof to be cleaned and maintained in a sanitary condition, as well as for repair, and other purposes.

It will be noted that the design and construction of the rotary ice cream extruder device 90-91 and the arrangement and generally triangular shape of the ice cream chambers 94 therein, and of the radially inner ice cream inlets 554 therein, are such that as each ice cream chamber 94 comes into position to extrude a measured quantity or volume 97 of ice cream therefrom onto the first or bottom cookie 89 the discharge outlet 175 in the tubular ice cream supply member 95 is partially closed at one chamber 94 while the next or following chamber 94 is partially open so that the internal pressure of the ice cream in the chambers 94 in the body 91 of the rotary extruder head device 90 is maintained constant.

-g-

The Trimming Device for Trimming the Filler Body of Ice Cream Deposited on the First or Bottom Cookie (FIGS. 12, 13 and 13A) and the Hold-Down Means Associated Therewith (FIGS. 12, 13 and 13B)

The new machine 75 includes a trimming device for trimming the upper surface of the filler body 97 of frozen ice cream deposited from each of the ice cream chambers 94 in the generally cylindrical body 91 of the rotary ice cream extruder device 90 onto the first or bottom cookie 89 to the proper and a predetermined size and thickness, so as to assure uniformity in the overall thickness of the completed ice cream cookie sandwich. This trimming device is shown in FIGS. 12, 13 and 13B, wherein it is generally indicated at 185, and comprises a wire-like cutter or trimmer member 186 which extends transversely across the cookie guideway or trackway 84-85 below and transversely across the rotary ice cream extruder device 90-91 and is supported by a generally U-shaped supporting frame member 187 which includes a pair of spaced parallel arm members 448 which are preferably formed of somewhat flexible, resilient flat metal stock, such as stainless steel. The U-shaped supporting frame member 187 is rigidly attached, as at 450, to a pair of upright supporting bracket members 431 which are mounted on the supporting frame structure 76 along the guideway or trackway 84-85 (FIGS. 12, 13 and 13B).

As shown in FIGS. 12, 13, the wire-like trimmer member 186 engages the upper surface of the filler body 97 of ice cream as it is sequentially fed out of the outlet slots 221 in each of the ice cream chambers 94 in the annular rim member 557 on the generally cylindrical body 91 of the rotary ice cream extruder device 90-91 and trims off the excess upper portion 188 thereof so that the remaining filler body 97 of ice cream, as it remains on the upper surface of the first or bottom cookie 89, will always have the same uniform and desired thickness.

The new machine 75 includes a hold-down device, which is illustrated in FIGS. 13 and 13B, wherein it is generally indicated at 569, and which is associated with the trimming device 185 for holding the first and bottom cookie member 89, or like comestible or edible or non-edible protective or carrier member on the guideway or trackway 84-85 and against adherence to and movement with the rotary ice cream extruder device 90-91 after each extruding operation. This hold-down device 569 includes a pair of generally channel-shaped and resilient hold-down clip members (FIG. 13B) which are slidably inserted into and mounted on the stationary mid-section 409 of the guide or trackway rails 85 of the guideway or trackway 84-85, adjacent to and immediately below rotary ice cream extruder device 90-91 (FIG. 13). each of the resilient and generally channel-shaped hold-down clip members 569 includes a vertically extending side wall 570 which is disposed on the outer side of the guide or track rail 85-409, a top portion 571 which extends over the top wall of the guide or track rail 85-409 in spaced relation thereto, and a bottom portion 572 which extends under the guide or track rail 85-409 and retains the resilient clip and hold-down member 569 in position on the guide or track rail 85-409.

As shown in FIGS. 13B and 78, the rigid mid-section 409 of each of the guide or track rails 85-409 has a notched portion 568 formed therein and in the use of the machine 75 the outer marginal edge portions of the first or bottom cookie or like comestible or edible or non-edible protective or carrier member 89, engage in the notched portions 568 of the guide or track rails 85-409 and in the channel-shaped space formed by and between the upper flange portions 571 of the hold-down clip members 569 and the upper surfaces of the guide or track rails 85-409, as they are moved along the guideway or trackway 84-85 by the article-advancing means or upwardly extending pusher finger members 87 on the endless conveyor unit 77-86-87 into a position under the rotary ice cream extruder device 90-91 for the reception of a measured body 97 of flowable, semi-frozen ice cream, or like flowable edible or comestible food products, from the rotary extruder device 90-91. In this manner, the edible body of flowable semi-frozen ice cream, or like edible body, and the supporting edible cookie or like edible or non-edible cookie member 89 is prevented from adhering to and from being carried around with the rotary extruder device 90-91 during rotation thereof.

h

The Scraping and Salvaging Means for Scraping Relatively Soft Ice Cream from the Peripheral Surface of the Rotary Ice Cream Extruder Device at the Start-up of the Machine and for Salvaging Such Soft Ice Cream (FIGS. 1, 2, 3A, 3B, 6 and 12)

The new ice cream cookie sandwich making machine 75 includes means, shown in FIGS. 1, 2, 3A, 3B, 6 and 12 and therein generally indicated at 189, for scraping relatively soft ice cream from the peripheral surface 96 of the generally cylindrical body 91 of the rotary extruder device 90-91 at the start-up of the machine 75 for salvaging such relatively soft ice cream. This ice cream scraper and salvage unit 189 includes a pan-like receptacle 410 which is pivotally mounted between its ends, as at 575 on brackets 574 which are attached to upright supports 576 which are mounted on the housing-like portion 331 of the supporting frame structure 76. The pan-like receptacle 410 has an open upper end or top 190 for the reception of the relatively soft ice cream extruded onto the peripheral surface 96 of the rotary ie cream extruder device 90-91 at the start-up of the machine 75, (FIGS. 3A and 3B).

The ice cream scraper and salvage unit 189-410 includes a scraper member 193 which is formed as a part of the receptacle 410 and this scraper member 193 engages and extends tangentially across the peripheral surface 96 of the generally cylindrical body 91 of the rotary ice cream extruder device 90-91 (FIG. 12).

In the use of the new machine 75, at the start-up of the operation, the ice cream in the ice cream chambers 94 of the rotary ice cream extruder device 90-91 may be relatively warm and too soft to be formed properly as it is extruded out of the discharge or dispensing outlets 221 of the ice cream chambers 94 onto the first or bottom cookie 89, and this condition may continue until the ice cream at the proper and desired colder temperature is pumped into the ice cream chambers 94 in the rotary ice cream extruder device 90-91 from the ice cream feeder or supply tube 95 and its extruder outlet 175. Accordingly, such soft and relatively fluid ice cream will be carried by the rotary extruder device 90-91 (counterclockwise, FIG. 12) on its peripheral surface 96 until it engages the scraper member 193 on the pan-like salvage receptacle 410 by which it will be scraped from the peripheral surface 96 of the generally cylindrical body 91 of the rotary ice cream extruder device 90-91 into the body of the salvage receptacle 410 from which it may be salvaged for reuse. after each trimming operation, the pan-like receptacle 410 may be manually pivoted, at 575, away from the peripheral surface 96 of the rotary extruder device 90-91 into the position in which it is shown in FIG. 3C so as not to interfere with the further operation of the rotary extruder device 90-91.

i

Various Modified Designs of the Dispensing outlets 221 in the Annular Rim Member 557 On the Rotary Ice Cream Extruder Device 90-91 and Various Shapes of the Ice Cream Filler Body 97 Formed Thereby to Correspond with the Shapes of the Component Cookies and the Complete Ice Cream Cookie Sandwiches (FIGS. 48 to 53, Inclusive)

The new machine is designed and adapted to form ice cream cookie sandwiches of various designs, shapes and sizes and to this end the dispensing outlets 221 in the annular rim member 557 from the ice cream chambers 94 in the generally cylindrical body 91 of the rotary ice cream extruder device 90-91 may have various designs and shapes including the somewhat elongated rectangular-shaped form of the dispensing outlet 221 shown in FIG. 18, or any of the various forms, shapes and designs shown in FIGS. 48 to 53, inclusive, and which are indicated at 221a, 221b, 221c, 221d and 221e.

Thus, in the use of any of the various designs and shapes of the dispensing outlets shown in FIGS. 48 to 53, inclusive, the ice cream dispensing outlets 221a, 221b, 221c, 221d and 221e, in the annular rim member 557 on the generally cylindrical body 91 of the rotary ice cream extruder 90-91, will form correspondingly sized and shaped ice cream filler bodies 97 to be deposited on the first or bottom cookies 89, and the first or bottom cookies 89 and the second or top cookies 99 may be provided in corresponding designs and shapes so that the complete ice cream cookie sandwiches 89-97-99 produced by the machine 75 will have the shape, design and form of the ice cream filler bdoy 97 as it is formed by the extrusion of the ice cream from the ice cream chambers 94 of the rotary ice cream extruder head device 90-91 through one of the dispensing outlets 221a, 221b, 221c, 221d and 221e in the removable annular rim members 557 onto the first or bottom cookie 89.

As may be seen by reference to FIG. 62 of the drawings, the discharge or dispensing outlets 221 in the annular rim member 557 on the generally cylindrical body 91 of the rotary ice cream extruder device 90-91 are somewhat smaller in size or diameter than the adjacent radially outer ends of the ice cream chambers 94 so that a peripheral flange 561 is provided around the radially outer end of each ice cream chamber 94. These peripheral flanges 561 serve to retard the movement of the frozen ice cream from the ice cream chambers 94 and assure that it will be properly molded and formed as it passes through the dispensing or discharge outlet 221 onto the upper surface of the first or bottom cookie 89.

j

The Second or Bottom Cookie Storage Magazine or Hopper 98

(FIGS. 1,2,3,22,23 and 24)

The second or bototm cookie storage magazine or hopper unit 98 is substantially similar in construction and in operation to the first or top cookie storage magazine or hopper 119 and hence those parts thereof which are similar or correspond in construction and in operation to corresponding parts in the first or bottom cookie storage magazine or hopper 119 have been given the same reference numerals followed by the additional and distinguishing reference character a. In view of this similarity, it is deemed unnecessary to describe in detail the construction and operation of the second or bottom cookie storage magazine or hopper 98.

k

The Second or Bottom Cookie Stack-Supporting and Lifting or Raising Device 139a

(FIGS. 1,2,22,24 and 78)

The new machine 75 embodies a second cookie stack-supporting and lifting or raising device which is associated with the second or bottom cookie storage magazine or hopper 98, and is illustrated in FIGS. 1,2,22,24 and 78, wherein it is generally indicated at 139a, and is similar in construction to the first or bottom cookie stack-supporting and lifting or raising device 139 which is associated with the first or bottom cookie storage magazine or hopper 119, and hence need not be described in detail herein; those parts of the second cookie stack-supporting and lifting or raising device 139a which are similar in construction and operation to corresponding parts in the first or bottom cookie stack-supporting and raising or lifting device 139 being given the same reference numerals followed by the additional and distinguishing reference character a (FIGS. 22, 24 and 78).

Thus it will be noted (FIGS. 1, 2, 22, 24 and 78) that the elongated movably mounted rail members 144a-144a and attached cookie-supporting and lifting or raising arm members 145a of the second cookie stack-supporting and lifting and raising device 139a, like the movably mounted rail members 144a and attached cookie-supporting and lifting or raising arms 145-145 in the first cookie stack-supporting and lifting or raising device 139, form a second movable part or section of the guideway or trackway 144-145-144-145-84-85-144a-145a-144a-145a (FIG. 78).

The Second Cookie Centering Device 157

(FIGS. 1,2,25,26,27,28,29 and 30)

The new machine 75 embodies a second cookie centering device, shown in FIGS. 1, 2, 25, 26, 27, 28, 29 and 30, wherein it is generally indicated at 157, and which in use centers both the bottom cookie 89 and the second or top cookie 99 on and relative to the ice cream filler body 97, as shown in FIG. 30, after the assembled ice cream cookie sandwich 89-97-99 has passed the second or bottom cookie storage magazine or hopper 98 and as it is moved along the trackway or guideway 84-85 by the upwardly extending pusher finger members 87 on the upper run of the endless conveyor 77-86-87 into a position to have a wrapper of flexible water-resistant and heat-sealable wrapping materials or heat-sealable plastic resinous film applied thereto from the web 102 by the wrapping and folding device 107 (FIGS. 34 to 43, inclusive, and 43A), as will be described more fully hereinafter.

The second cookie centering device 157 is a composite of a lower or bottom cookie centering device 170a, which is similar in construction and operation to the first or bottom cookie centering device 170, which is shown in FIGS. 12, 14, 15 and 16, and an upper and second cookie centering device which is generally indicated at 223 in FIGS. 25, 26, 27, 28, 29 and 30. Hence those parts of the first or bottom cookie centering device 170a which are embodied in the second cookie centering device 157, and which correspond generally in construction and in operation to similar parts in the first or bottom cookie centering device 170, have been given the same reference numerals followed by the additional and distinguishing character a.

As shown in FIGS. 25, 26 and 27 to 30, inclusive, the second cookie centering device 157 includes, in addition to the first or bottom cookie centering device 170a, a second and top cookie centering device, which is generally indicated at 223 and comprises a pair of top cookie centering arms 224 which extend parallel to the cookie guideway or trackway 84-85 above the latter, and in a direction away from the second or bottom cookie storage magazine or hopper 98 toward the wrapping and folding device 107. Each of the upper and top cookie centering arm members 224 has the laterally outer end portion of a link member 225 pivotally connected thereto on its upper surface as at 226, and the laterally inner end portions of these link members 225 are pivotally connected, as at 227, to a third and interconnecting link member 228 which is pivotally mounted between its ends, as at 229, on a T-shaped supporting bracket member 230 which is attached, as at 434, to the supporting bracket 201a which extends horizontally and transversely across the cookie guideway or trackway 84-85 above the latter (FIGS. 28 and 29).

A spring member 435 is mounted on a part 435 of the supporting frame 76, as at 436, and has an end portion 437 which engages one lateral face of one of the top or upper cookie-centering arm members 224 (FIG. 25) and urges the pivotally interconnected upper cookie-centering arm members 224-224 into engagement with the outer marginal edge portions of the top cookie 99.

It will be noted that the lower or bottom cookie centering device 107a, as embodied in the second and composite cookie centering device 157, includes a pair of lower cookie centering arm members 171a which are disposed below the upper or top cookie centering arm members 224 (FIG. 29) are pivotally interconnected by linkage which includes link members 195a-195a-197a which are disposed above the linkage 225-226-227-228-230-227 for the upper or top cookie-centering arm members 224-224 (FIG. 29).

The construction and arrangement of the second cookie-centering device 157-170a are such that as the assembled but unwrapped ice cream cookie sandwich 89-97-99 is moved along the cookie guideway or trackway 84-85 by the article-advancing means, that is, the upwardly extending pusher finger members 87 on the endless conveyor unit 77-86-87 the bottom cookie centering arm members 171a are urged by the spring 203a-206a-204a into engagement with the outer edge portions of the first or bottom cookie 89 and the top cookie centering arm members 224 are urged by the coil spring 435-437 into engagement with the outer edge portions of the top cookie 99 so that the top and bottom cookies 99 and 89 are properly centered as it is moved along the guideway or trackway 84-85 by the upwardly extending pusher finger members 87 on the endless conveyor unit 77-86-87 toward the wrapping and folding device 107 so that the assembled ice cream cookie sandwich 89-97-99 will be properly centered and will be in proper position for the wrapping and folding operations.

*l*

The Cookie Hold-Down Device 173

(FIGS. 2,25,26,30,31,32 and 33)

The new machine 75 embodies a novel cookie hold-down device, which is shown in FIGS. 1, 2, 25, 26, 30, 31 32 and 33, wherein it is generally indicated at 173, and which is mounted on the machine 75 above the second cookie-centering device 157, and is adapted to be engaged by the assembled ice cream cookie sandwich 89-97-99 as it is moved along the guideway or trackway 84-85 so as to maintain the top cookie 99 in properly assembled position on the ice cream filler body 97 as the assembled ice cream cookie sandwich 89-97-99 is moved by the pusher finger members 87 on the upper run of the endless conveyor 77-86-87 toward the wrapping and folding device 107, and thus assure that the ice cream cookie sandwich will be properly assembled and wrapped.

To this end the hold-down device 173 includes a resilient metal hold-down member 237 which includes a generally horizontally extending rear end portion 238 which is pivotally mounted, as at 239, on a supporting member 240 which, in turn, is mounted on a supporting member 241 which is attached to a part of the supporting frame 76 (FIGS. 25, 31, 32 and 33).

The rear end portions 238 of the hold-down member 237 has a screw threaded bolt member 242 adjustably mounted therein and the lower end portion 243 of this bolt member 242 bears against the upper surface of the supporting member 241; a coil spring 244 being mounted on the bolt member 242 between the rear end portion 238 of the hold-down member 237 and a washer 245 which is mounted on the upper end portion of the bolt 242 (FIGS. 31, 32 and 33).

The hold-down member 237 has a downwardly inclined front end portion 246 which terminates at its lower end in a generally horizontally extending bifurcated end portion 247.

The construction and arrangement of the parts in the hold-down device 173, as thus described, are such that the -*n* hold-down arm member 246 and its bifurcated lower end portion 247 are spring urged downwardly by the tension of the spring 244 on the bolt 242 and are disposed in the path of travel of the assembled ice cream cookie sandwich 89-97-99 as it is moved along the guideway or trackway 84-85 away from the second cookie storage magazine or hopper 98. Hence when the assembled ice cream cookie sandwich 89-97-99 comes under the spring-urged bifurcated lower end portion 247 of the hold-down arm member 246 the bifurcated lower end portion 247 of the spring-urged hold-down arm member 246 urges the top cookie 99 firmly into engagement with the ice cream filler body 97 while, at the same time, firmly pressing the ice cream filler body 97 against the first or bottom cookie 89 and thus assuring that the component parts 89-97-99 of the ice cream cookie sandwich will be firmly assembled and held together as they are moved along the guideway or trackway 84-85 by the upwardly extending pusher finger members 87 on the upper run of the endless conveyor unit 77-86-87 toward the wrapping and folding device 107, which will be described hereinafter.

*n*

The Wrapping and Folding Device 107

(FIGS. 34, 35, 36, 37, 38, 39, 40, 41, 42, 43 and 43A)

The new machine 75 includes means for wrapping and folding the web 102 of flexible, moisture-resistant, heat-sealable wrapping material sequentially about each of the completed ice cream cookie sandwiches 89-97-99. This wrapping and folding device is generally indicated at 107 and the wrapping and folding operations performed thereby are illustrated in FIGS. 34 to 43, inclusive, and 43A. The parts of the wrapping and folding device 107 are so designed and constructed as to wrap and fold a section of the web 102 of flexible, moisture-resistant, heat-sealable wrapping material from the feed roll 99-100 around the assembled ice cream cookie sandwich 89-97-99 as it is moved along the guideway or trackway 84-85 to the heat-sealing devices 109 and 111 and the web-cutting or web-severing device 113; it being understood that the web 102 of wrapping material may be made of any suitable flexible, moisture-resistant or water-resistant and heat-sealable material such, for example, as waxed paper, glassine, plastic polyethylene resinous film, or the like.

Prior to the start-up of the machine 85 the web 102 of wrapping material is manually advanced from the feed roll 99-100 through the wrapping and folding device 107 and between the knurled surface 256 of the heat-sealing platens 254 and 255 (FIG. 44) which engage the web 102 of flexible, moisture-resistant, heat-sealable wrapping material and continue to advance it after the machine 75 has been put in operation. Thereafter the web 102 is sequentially wrapped and folded about the body of the assembled ice cream cookie sandwich 89-97-99 by the parts of the wrapping and folding device 107 which, and the steps performed thereby, will now be described.

Thus, by reference to FIGS. 34 to 43, inclusive, and 43A, it will be noted that the wrapping and folding device 107 includes a pair of folding members 248 each of which is attached, by an arm 249, to a part of the supporting frame 76. Each of the folding arm members 248 includes a generally vertically extending rail or body portion 250 and these body portions 250-250 extend generally parallel to each other in horizontally spaced relationship (FIGS. 34, 35, 36, 37, 38 and 39).

Each of the rails or body portions 250 has a horizontally extending arm portion 251 formed integrally therewith at its lower end and each of these horizontally extending arm portions 251 has a generally triangular-shaped and depending web portion 252 formed integrally therewith. In addition, each of the rails or body portions 250 has a generally triangular-shaped fin member 253 formed integrally therewith, and each of these generally triangular-shaped fin members 253 extends or is flared laterally outwardly and upwardly from and relative to the bodies of the folding members 250 at the front or lead-in end for the web 102 of wrapping material (FIGS. 34, 35 and 36).

As illustrated in FIGS. 34 to 43, inclusive and 43A, of the drawings, the flexible wrapper 102 is fed from the feed roll 99a-100 through the guide rolls 103-104 and enters the wrapping and folding device 107 in the direction of the arm shown in FIG. 34; the completed ice cream cookie sandwich 89-97-99 being moved along the guideway or trackway 84-85 through the successive wrapping and folding operations shown in FIGS. 38 to 43, inclusive and 43A, wherein the completed ice cream cookie sandwich 222-97-89 is shown and is indicated at 108.

As the flexible wrapper web 102 enters the wrapping and folding device 107, in the direction of the arrow shown in FIG. 34, it first engages the outwardly and upwardly projecting or flared wing members 253 on the outer sides of the upwardly flared wing members 253 by which the web 102 is first folded outwardly, as shown in FIG. 39. As the web 102 of wrapping material is advanced through the outwardly flared wing members 253, it engages the upright or generally vertically extending side walls 250 of the wrapping and folding device 107, by which the web 102 is folded upwardly on the inner sides of the side walls 250 to provide side wall portions 102a-102a along the outer marginal edge portions of the completed ice cream cookie sandwich 108 or 89-97-99. At the same time, a top cover portion 102b is formed over the upper surface of the completed ice cream cookie sandwich 108 or 89-97-99 and bottom wall cover portions 102c are formed, as shown in FIG. 41, and during this part of the folding and wrapping operation the completed ice cream cookie sandwich 108 or 89-97-99 is moved along the guideway or trackway 84-85 by the upwardly extending pusher finger members 87 on the upper run of the endless conveyor unit 77-86-87 into the position in which it is shown in dotted lines in FIG. 41.

In the next step of the folding and wrapping operation performed by the wrapping and folding device 107, as shown in FIG. 41, parts 102d of the wrapper web 102 are moved downwardly along the inner sides of the generally parallel and vertically extending members 252 into the vertically extending position in which these parts 102d of the wrapper web 102 are shown in FIG. 42.

As the ice cream cookie sandwich 108 or 89-97-99 and the flexible web 102 of wrapping material partially wrapped therearound, are moved further through the wrapping and folding device 107, into the position in which it is shown in FIG. 42, the depending portions 102d of the flexible wrapper web 102 are moved inwardly into parallel contacting relationship with each other, as shown in FIGS. 43 and 43A, and in this position the parallel bottom edge portions 102d of the wrapper 102 are ready for the first heat-sealing operation, which will now be described.

- o

The First Heat-Sealing Device for Heat-Sealing the Parallel Bottom Edge Portions 102d-102d of the Wrapper 102 Together (FIGS. 43, 44, 45, 46, 47, 62 and 67)

The new machine 75 includes a first heat-sealing device for heat-sealing the parallel bottom edge portions 102d-102d of the flexible, moisture-resistant, heat-sealable wrapper 102 as the wrapped ice cream cookie sandwich 108 or 89-97-99 is moved along the guideway or trackway 84-85 by the article-advancing means or upwardly extending pusher finger members 87 on the upper run of the endless conveyor 77-86-87. This first heat-sealing device is shown in FIGS. 43, 44, 46, 47 and 62, wherein it is generally indicated at 109, and includes an unheated but rotatable upper platen 254 and a rotatable but heated lower platen 255, both of which are arranged in coplanar relationship with each other, and both of which platens 254 and 255 are generally cylindrical in shape, and have knurled peripheral edges 256 (FIGS. 44 and 46). The unheated upper platen 254 is rotatably mounted on a supporting and driving shaft 255 which is operated in a manner which will be described hereinafter (FIG. 62). The rotatable heated lower platen 255 includes a housing 451 which is stationarily mounted on a supporting plate 258 which is pivotally mounted, as at 259, on an upright supporting shaft 457 which extends centrally through the upright stationary supporting member 260 which is mounted on the supporting frame 276, and a bell crank handle 261 is attached to the upright supporting member 260.

As shown in FIGS. 44 and 62, the heated platen member 255 embodies a rotatable externally knurled cylindrical platen head 452 which is mounted on a vertically extending shaft 453 which is rotatably mounted in anti-friction bearings 454 in the housing 451.

Electrical heating elements 455 are mounted in the housing 451 and these electrical heating elements 455 are electrically connected by conductors 456 to a source of electrical current, as will be described hereinafter.

A spring 459 has one end portion attached to the bell crank handle 261 between the ends thereof and the outer end portion of the spring 459 is attached, as at 460, to a part of the supporting frame 76 (FIG. 62).

The construction and arrangement of the parts of the first heat-sealing device 107 are such that as the bottom edge portions 102d-102d of the wrapper 102 are fed between the knurled coplanar peripheral surface 256 of the driving but unheated platen 254 and the heated idler platen 255 the bottom edge portions 102d-102d of the wrapper 102 are heat-sealed together and provided with a knurled surface 438 (FIG. 45); the heated idler platen being rotated entirely by the driving but unheated platen 255 and the heated idler platen 255 rotating on its supporting shaft 453 in the anti-friction bearings 454 in the housing 451 (FIG. 62). The spring 459 normally acts on the bell crank handle 261 and the vertically extending shaft 457 and the supporting plate 258 and the housing 451 to urge the knurled peripheral edge 256 of the heated platen head 255 into engagement with the knurled peripheral edge 256 of the unheated driving platen 254 and the bottom edge portions 102d-102d of the wrapper web 102 disposed therebetween.

-- p --

The Second Heat-Sealing Device for Heat-Sealing The End Edge Portions 112-112 of the Wrapper 102 on the Completed Ice Cream Cookie Sandwich (FIGS. 44 to 47, Inclusive, and 67)

The second heat-sealing device for heat-sealing the end edge portions 112 of the wrapper 102 on and around the ice cream cookie sandwich 89-97-99 is illustrated in FIGS. 44 to 47, inclusive, and 67, wherein it is generally indicated at 111, and comprises upper and lower rotary platen cylinders 262 and 263, respectively, which are rotatably mounted on horizontally extending supporting shafts 264 and 265 (FIG. 64) which are rotatably journaled in upright supporting members, as at 266, of the supporting frame 76 (FIG. 64). The bottom edge heat-sealing device 109 and the end edge heat-sealing device 111 are enclosed within a removable housing or cover 267 which is mounted on an end portion 558 of the supporting frame 76 (FIG. 1) and the housing 267 is shown as removed in FIGS. 2 and 3.

The upper rotary end edge heat-sealing platen cylinder 262 is internally electrically heated and has a pair of heat-sealing platens 268-268 mounted thereon and spaced radially therearound at preselected radial intervals, shown as 180°. The lower platen cylinder 263 is unheated but has a similar pair of unheated heat-sealing pressure platens 269-269 mounted thereon and spaced apart at 180° radial intervals, (FIGS. 44, 45 and 47); and each of the platens 268 and 269 having a knurled outer surface 439 (FIGS. 47 and 67). As shown in FIG. 64, the bottom heat-sealing platen 263 includes upper and lower parts 603 and 604 which are yieldably held together by a holder 605 with coil springs 470 arranged between the parts 603 and 604 resiliently urging them apart to prevent damage in the event of jamming between the upper and lower platens 262 and 263.

It will be noted that on the upper heat-sealing platen cylinder 262 the heat-sealing platens 268 project radially outwardly from the peripheral surface 270 of the upper platen cylinder 262 and that the heat-sealing platens 269 on the bottom platen cylinder 263 likewise project radially outwardly from the peripheral or circumferential surface 271 of the lower platen cylinder 263 (FIG. 44).

As shown in FIG. 64, the upper heat-sealing platen 562 has a pair of heating elements 564 therein and these heating elements 564 are electrically connected to insulated electrical conductor members or wires 565 which extend through the tubular shaft 461 and have end portions 566 which are electrically converted to annular electrical brush members 567 which are stationarily mounted in annular grooves 568 which are formed in the body of an electrical communicator device 569 which is mounted on and is rotatable with the tubular shaft 461 for rotation relative to the annular brush members 567 (FIG. 64).

In the use of the end edge heat-sealing device 111 a chain of the wrapped ice cream cookie sandwiches 89-97-99, having their bottom edge portions 102d-102d previously heat-sealed together by the bottom edge heat-sealing device 109, are fed sequentially by the pusher finger members 87 on the upper run of the endless conveyor unit 77-86-87 into the end edge heat-sealing device 111, between the top and bottom platen cylinders 262 and 263 thereof, respectively, and as the platen cylinders 262 and 263 are rotated, in a manner which will be described hereinafter, the heat-sealing platens 268 and 269 on the top and bottom platen cylinders 262 and 263, respectively, sequentially come into mating relationship with each other and heat seal the end edge portions 112 of the flexible wrapper 102 together (FIG. 45). During this operation, a knurled surface is applied to the end edge portions 112 of the heat-sealed wrapper by the knurled surfaces 439 of the heat-sealing platens 268 and 269 (FIGS. 47 and 67).

The chain of thus wrapped and heat-sealed ice cream cookie sandwiches 89-97-99 is then moved along the guideway or trackway 84-85 by the upwardly extending pusher finger members 87 on the upper run of the endless conveyor unit 77-86-87 and into operative engagement with the web-cutting or web-severing device 113, by which the thus wrapped and heat-sealed ice cream cookie sandwiches 89-97-99 are cut or severed from each other in a chain of the same (FIG. 47), as will now be described.

-g-

The Web-Cutting or Web-Severing Device for Cutting or Severing the Wrapped and Heat-Sealed Ice Cream Cookie Sandwiches From Each Other In a Chain of the Same (FIGS. 44, 45, 46, 47 and 67)

The new machine 75 embodies a web-cutting or web-severing device for cutting or severing the wrapped and heat-sealed ice cream cookie sandwiches 89-97-99 from each other in a chain of the same, after they leave the end edge heat-sealing device 111. This web-cutting or web-severing device is illustrated in FIGS. 44 to 47, inclusive, and 67, of the drawings, wherein it is generally indicated at 113, and includes an upper knife blade-supporting and generally cylindrical shaft member 247 having end portions which are rotatably journaled in the upright supporting walls 266 of the supporting frame 76-331, and the supporting shaft has a web-cutting or web-severing knife blade 275 detachably attached thereto as by fastening elements in the form of bolts 276.

The web-severing or web-cutting device 113 also includes a lower and generally cylindrical knife-supporting shaft member 277 which has end portions which are rotatably journaled in the supporting members, as 266, and the lower knife-supporting shaft member 277 has a web-cutting or web-severing knife blade 278 detachably attached thereto, as by bolts 279 (FIG. 44).

In the use of the new machine 75 the rotary web-cutting or web-severing blades 275 and 278 are rotated in timed relationship, by means and in a manner which will be described hereinafter, so as to bring the web-cutting or web-severing knife blades 275 and 278 into engagement sequentially with the heat-sealed end edge portions 112 of the wrappers 102 on the ice cream cookie sandwiches 89-97-99, as shown in FIG. 45, thereby cutting or severing the heat-sealed end edge portions 112 and thus cutting or severing the individual wrapped and heat-sealed ice cream cookie sandwiches 89-97-99 from each other in a chain thereof (FIG. 45).

An idler roller 280 is rotatably mounted between the end edge heat-sealing device 111 and the web-cutting or web-severing device 113 to prevent jamming of the wrapped and heatsealed ice cream cookie sandwiches 89-97-99 from the machine 75 as they travel from the end edge heat-sealing device 111 to the web-cutting or web-severing device 113 (FIGS. 44, 45 and 46).

-r

The Take-Away Roller and Delivery Conveyor For the Completed, Wrapped and Heat-Sealed Ice Cream Cookie Sandwiches FIGS. 44, 46 and 47)

As the completed, wrapped and heat-sealed ice cream cookie sandwiches 89-97-99 are cut or severed from a chain thereof, by the web-cutting or web-severing device 113, they move onto a platform 281 which is stationarily mounted on an upright supporting bracket 286 which is mounted on the supporting frame 76, and this platform 281 guides the completed, wrapped and heat-sealed ice cream cookie sandwiches onto a delivery roller 282 which is mounted on a shaft 287 which has end portions rotatably journaled in the upright supporting frame member 266. The roller-supporting shaft 287 has a drive pulley 284 at one end thereof which is driven by a belt 283 which also works around a drive pulley 285 which is attached to the supporting shaft 277 for the lower web-cutting knife blade 281 (FIG. 44). The thus completed, wrapped and heat-sealed ice cream cookie sandwiches 89-97-99 are thus delivered by the delivery roller 282 onto the endless conveyor unit 115 which extends transversely of the endless conveyor 77-86-87 and the guideway or trackway 84-85 at the take-away or delivery end of the machine 75, and by which the completed, wrapped and heat-sealed ice cream cookie sandwiches 89-97-99 may be removed for packaging and shipment or freezer storage.

-s

The Means for Mounting the Feed Roll for the Web of Flexible, Moisture-Resistant Wrapping Material on Its Supporting Shaft (FIGS. 57, 57A and 58)

The present invention embodies means, shown in FIGS. 57, 57A and 58, for mounting the feed roll of the flexible moisture-resistant heat-sealed wrapper 102 on its supporting shaft 100 and for latching it thereon, and for adjusting the mounting means for wrapper feed roll to flexible, moisture-resistant heat-sealable wrapping materials of varying widths.

This construction is shown in FIGS. 57, 57A and 58 of the drawings, wherein it is generally indicated at 440, and wherein it is shown associated with the flexible, moisture-resistant heat-sealable wrapping material 102 and its mounting on the horizontally extending supporting shaft 100.

Thus, by reference to FIG. 57, it will be noted that the supporting shaft 100 is stationarily mounted in a sleeve 293 which is attached to and is carried by the upright support 101 for the wrapper feed roll-supporting shaft 100. As also shown in 57, the wrapper feed roll-supporting shaft 100 has a reduced portion 292 on which spaced anti-friction bearing structures 289 and 290 are mounted, and a tubular sleeve member 411 is rotatably mounted on the anti-friction bearings 289 and 290. The axially inner end portion of the tubular sleeve 411 member has an annular flange 442 formed thereon which engages or bears against an annular flange or stop member 443 which is fastened to the shaft 100, as by welding 444, and a tubular core or hub of the flexible wrapper feed roll is slidably mounted on the tubular sleeve member 411 and at its inner end engages the annular flange 442 on the tubular sleeve member 411 (FIG. 57).

The new machine 75 embodies a latching device, generally indicated at 298 (FIG. 57) for latching the tubular sleeve member 411 to its supporting shaft 100. The latching device 298 includes a generally cylindrical latching shaft member 299 which is rotatably mounted in a cylindrical bore 300 which is formed in the body of the tubular sleeve member 411 and extends horizontally inwardly from the outer end portion of the tubular sleeve member 411; the latching shaft member 299 having a handle portion 301 thereon at its outer end and which is disposed exteriorily of the tubular sleeve member 411 (FIG. 57).

The manually operable latching shaft member 299-301 has an inner end portion 302 on which a camming latch member 303 is mounted, the camming latch member 303 having an eccentric cam portion 441 which is adapted frictionally to engage and bear against the peripheral surface of the shaft 100-292 so as to removably latch the tubular sleeve member 411 to its supporting shaft 100-292 (FIGS. 57 and 57A)

The construction and arrangement of the parts described immediately above are such that the tubular sleeve member 411 may be manually slid onto the shaft 100-292 and clamped or latched thereon by manipulating the latching shaft 299 by its handle member 301 to engage the eccentric portion 441 of the camming latch member 303 with the peripheral surface of the shaft 100-292 and thereby securely fasten or latch the tubular sleeve member 411 in position on its supporting shaft 100-292.

The new machine 75 also provides adjusting means, shown in FIGS. 57 and 58, and therein generally indicated at 440, for adjustably mounting the tubular supporting sleeves member 411 and the feed roll supporting shaft 100-292 in its supporting frame member 293 on the upper end portion of the upright supporting member 101 so as to accommodate the supporting shaft 100-292 and the tubular sleeve member 411 to the use of flexible, moisture-resistant, heat-sealable wrapping material 102 of varying widths. To this end the adjusting means 440 includes a tubular latching member 306 which is rotatably mounted in a tubular bore or recess 307 which is formed in the supporting member 293 and which extends tangentially thereacross with the outer peripheral surface of the tubular latching member 306 engaging the peripheral surface of the feed roll-supporting shaft 100, as shown in FIGS. 57 and 58. The tubular latching member 306 is mounted on and is attached to a supporting shaft member 309 which has a handle member 310 thereon which is disposed exteriorly of the supporting member 293 (FIG. 58).

It will be noted (FIG. 58) that the tubular latching member 306 has a recessed portion 445 formed therein and that a portion 446 of the peripheral edge portion of the supporting shaft 100 is adapted to project into and to engage in the recess 445 when the tubular latching member 306 is in latched position with and relative to the supporting shaft 100 (FIG. 58).

In the use of the new machine 75, the feed roll-supporting shaft 100, and the tubular sleeve member 411 thereon, may be accommodate accomodated or adjusted for use with feed rolls or webs of flexible, moisture-resistant heat-sealable wrapping material 102 of varying widths by manually rotating the tubular latching member 306 and its supporting shaft 209, by means of its handle 310, so as to move the tubular latching member 306 out of frictional engagement with the outer peripheral surface of the supporting shaft 100, and then slidably adjusting the supporting shaft 100 and the tubular sleeve member 411 thereon axially along the supporting shaft 100, and then removing the tubular sleeve member 411 from the supporting shaft 100 and replacing it with a tubular sleeve member 411 of the desired size or length to accommodate a web 102 of flexible, moisture-resistant heat-sealable wrapping material of the desired width, whereupon the supporting shaft 100 and the tubular sleeve member 411 thereon may be firmly latched to the supporting shaft 100 by rotating the tubular latching shaft member 306 on its supporting shaft 309 by means of its handle 310 so as to cause the peripheral edge portion 446 of the supporting shaft 100 to enter into and frictionally engage in the recess or slot 445 in the tubular latching shaft member 306 (FIG. 58).

It is to be noted, in this connection, that a typical flexible, moisture-resistant heat-sealable wrapping material 8 inches in width is adequate for wrapping ice cream cookie sandwiches 1 × ⅞ inches in width and 5 1/16 inches in length, and ⅛ to 3/16 inch in thickness, although the dimension and the size of the cookies or wafers employed in making the new ice cream cookie sandwiches may vary within a preferred and typical range of from 1 to 3 inches in width; 2 to 5 ¼ inches in length; and ½ to 2 inches in height or thickness or, in the case of round cookies 1 to 7 inches in diameter or ½ to 2 inches in thickness, or for wrapping frozen cake slabs or like food products from ¼ to ½ to 2 inches in thickness, employed with an edible cookie or wafer cover or with a non-edible protective cover such as a piece of plastic resinous material cardboard, or the like.

- t

The Power Means and Power Transmission Means

FIGS. 2, 55, 56, 59, 60, 62, 63, 64, 65, 66, 67, 68, 69, 70, 72 and 81)

In General

The power means and power transmission means for the new ice cream cookie sandwich making machine 74 are illustrated in FIGS. 2, 55, 56, 59, 60, 63, 64, 65, 66, 67, 68, 69, 70, 72, 81 and 83 of the drawings wherein they are generally indicated at 82, and comprise a single variable speed operating or driving electrical motor 83 of suitable design and construction such, for example, as 3 H.P., and which is arranged in the portable wheel-bearing housing 401 and the motor 83 has a drive shaft 316 on which a drive pulley 317 is mounted (FIGS. 2, 65, 66 and 81); certain of the major components or parts of the power transmission means being arranged within a housing 595 (FIG. 66). A timing belt 318 works around the drive pulley 317 and over other parts of the power transmission means embodied in the new machine 75 and which cooperate with the single electric driving motor 83 and with the timing belt 318 to operate all of the movable parts of the new machine 75 in timed and properly synchronized relationship so that the operations performed thereby will be properly timed and synchronized.

- 2

The Power Means and Power Transmission Means for the Positive Displacement Ice Cream Pump 311

(FIGS. 2, 4, 65, 81, and 83)

The power transmission means for the positive displacement ice cream pump 311 are shown in FIGS. 81 and 83 and include a timing belt 318 which works over a pulley 317 which is mounted on the shaft 316 of the single electric driving motor 83 and the timing belt 318 works over a pulley 327 on a shaft 328 which carries a sprocket gear 329 (FIG. 81). A sprocket chain 330 works over the sprocket gear 329 and over a sprocket gear 570 which is mounted on a drive shaft 332 (FIG. 31).

The power transmission means for the positive displacement ice cream pump 311, as described above, is such that when the main drive motor 83 is energized, power is transmitted from the motor 83 by way of the motor shaft 316, pulley 317 and timing belt 318 to the pulley 327 and thence to the shaft 328, sprocket gear 329, sprocket chain 602, sprocket gear 570, shaft 332, sprocket gear 599, sprocket chain 330, sprocket gear 600, and thence to the drive shaft 601 of the positive displacement ice cream pump 311 so as to pump a supply of semi-frozen ice cream from the ice cream maker-freezer unit 412, by way of the ice cream supply line 314, through the pressure relief valve 577, through the positive displacement pump 311 and thence by way of the ice cream feeder tube 95-175 sequentially into each of the ice cream or food chambers 94 in the rotary ice cream extruder device 90-91 (FIGS. 17 to 21, inclusive, 21A and 60).

- 3 -

The Power Means and Power Transmission Means For the Endless Conveyor Unit 77-86-87

(FIGS. 55, 56, 65, 66, 67 and 81)

The power means and power transmission means for the endless conveyor unit 77-86-87 is shown in FIGS. 55, 56, 65, 66, 67 and 81, wherein it is generally indicated at 82, and includes the power means in the form of the variable speed single electric driving motor 83, the timing belt 318, and a sprocket chain 322 which works over a sprocket gear 321 on the shaft 320 and around a sprocket gear 323 which is mounted on a shaft 324. This shaft 324 carries a gear 325 which meshes with a gear 326 which is mounted and over which the sprocket chain 559 of the endless conveyor 77-86-87 works at one end of the machine 75 (left end, FIGS. 1, 2 and 81).

The above-described arrangement of the power means 83 and the power transmission means 82 for the endless conveyor 77-86-87 are such that when the single variable speed electric driving motor 83 is energized, power is transmitted therefrom by way of the motor shaft 316, pulley 317, timing belt 318, pulley 319, shaft 320, sprocket gear 321, sprocket chain 322, sprocket gear 323, shaft 324, gears 325 and 326, shaft 81 and sprocket gear 80 to drive the sprocket chain 559 of the endless conveyor 77-86-87 which at the other end of the machine (right hand end, FIGS. 2 and 80) works over the sprocket gear 331 on the shaft 79 (FIGS. 1, 2 and 81).

The power transmission means 82 for the endless conveyor unit 77-86-87 and the power transmission means for other operating parts of the new machine 75, which will be described hereinafter, are located in the elongated generally channel-shaped housing portion 331 of the supporting frame structure 76 which is located at the rear of the machine 75 as seen from the front thereof in FIGS. 1 and 2.

- 4 -

The Power Transmission Means for the Rotary Ice Cream Extruder Head Device 90-91

(FIGS. 6, 60, 65, 66, 68, 70 and 81)

The power transmission means for the rotary ice cream extruder device 90-91 is shown in FIGS. 6, 60, 65, 66, 68, 70 and 81, wherein it is generally indicated at 560, and is housed within a box-like housing or carriage 483 (FIGS. 3 and 60).

Thus the power transmission means 560 for the rotary ice cream extruder device 90-91 includes a main sprocket driving chain 333 which works around a sprocket gear 334 which is attached to the tubular mounting sleeve member 92 on which the generally cylindrical body 91 of the rotary ice cream extruder device 90-91 is mounted (FIG. 60).

The main driving sprocket chain 333 for the rotary ice cream extruder device 90-91 works in the box-like housing or carriage 483 (FIGS. 60 and 68), and is driven by a gear 336 which is mounted on the shaft 79 which carries the sprocket gear 78 for the endless chain 559 of the endless conveyor unit 77-86-87 at one end of the machine 75 (right hand end, FIGS. 1, 2 and 3).

This gear 336 meshes with a gear 337 on a shaft 338 and the shaft 338 carries a sprocket gear 339 which meshes with and drives the sprocket chain drive 333 for the rotary ice cream extruder device 90-91, and the sprocket chain 333 also meshes with a sprocket gear 340 and works around a pair of idler gears 341 and 342 which are mounted on stub shafts 571 and 510, respectively.

The construction and arrangement of the parts of the power transmission means 560 for the rotary ice cream extruder device 90-91 as described above, are such that when the endless conveyor unit 77-86-87 is driven by the single electric driving motor 83 for the machine 75, as described above, power is delivered by way of the shaft 79, gears 336-337, shaft 338 and sprocket gear 339 to drive the sprocket chain drive 333 for the rotary extruder device 90-91 which then works around the sprocket gear 340 and over the idler gears 341 and 342 and over the sprocket gear 334 on the tubular mounting sleeve member 92 on which the rotary ice cream extruder device 90-91 is mounted to rotate the rotary ice cream extruder device 90-91 in timed relationship with the movement of the endless conveyor unit 77-86-87 and other operating parts of the new machine 75.

- 5 -

The Power Transmission Means for the Heat-Sealing Device 109 for Heat-Sealing the Bottom Edge portions 102*d* of the Wrapper 102 Together About the Completed Ice Cream Cookie Sandwich FIGS. 43, 44, 46, 47, 59, 62, 67 and 81)

The power transmission means for operating the two rotary heating-sealing platens 254 and 255 of the heat-sealing device 109 for heat-sealing the two parallel bottom edge portions 102*d*-102*d* of the ice cream cookie sandwich wrapper 102 together, is shown in FIGS. 43, 44, 46, 47, 59, 62, 67 and 81, wherein it is generally indicated at 346 and comprises a driving gear 347 which meshes with the gear 326 on the shaft 81 which carries the driving sprocket gear 80 for the sprocket chain 559 of the endless conveyor unit 77-86-87 (FIG. 81).

The gear 347 is mounted on a horizontal shaft 348 and this shaft 348 carries a bevel gear 349 which meshes with a bevel gear 350 which is mounted on a vertically extending shaft 351 on the upper end portion of which the driving but unheated platen 254 of the bottom edge heat-sealing device endless is mounted (FIGS. 59 and 62).

The construction and arrangement of the parts of the power transmission means 346 for the heat-sealing device 109 for heat-sealing the bottom edge portions 102*d*-102*d* of the wrapper 102 for the ice cream cookie sandwich 108 together is such that when the single driving motor 83 is energized and the ledless driving chain 559 for the endless conveyor unit 77-86-87 is driven, in the manner described above, power is transmitted by way of the shaft 81, gear 326, gear 347, shaft 348, and gears 349 and 350 to rotate the vertically extending supporting shaft 351 for the driving but unheated platen 254 of the heat-sealing platen unit 109, thereby rotating the platen 254 which, being in contact with the heated platen 255 rotates the heated platen 255 on its supporting shaft 453 (FIG. 62) with the result that the two platens 254 and 255 heat-seal the bottom edge portions 102*d*-102*d* together and provide a knurled surface 438 thereon (FIG. 45). During this operation the heated platen 255 rotates idly on its supporting shaft 453 in the anti-friction bearings 454 (FIG. 62).

- 6 -

The Power Transmission Means for the Heat-Sealing Device 111 for Heat-Sealing the End Edge Portions 112 of the Wrapper 102 Together (FIGS. 2, 44, 45, 46, 47, 59, 64, 67 and 81)

The power transmission means for the heat-sealing device 111 for heat-sealing the end edge portions 112 of the wrapper 102 together about the completed ice cream cookie sandwich 108, is illustrated in FIGS. 2, 44, 45, 46, 47, 59, 64, 67 and 81 and includes a driving gear 352 which meshes with the driving gear 347 for the power transmission means 346 for the heat-sealing device 109 for heat-sealing the bottom edge portions 102d-102d of the wrapper 102 together (FIGS. 59, 64 and 81).

The gear 352 is mounted on a tubular shaft 461 which supports the upper heat-sealing platen 262 and the tubular shaft 461 carries a second gear 462 which is attached to the gear 352, as at 463 (FIG. 64). A second gear 464 is attached to the gear 462, as at 465, and the gear 464 is mounted on a shaft 466, on which the lower heat-sealing platen 263 is mounted, and the shaft 466 is rotatably journaled in anti-friction bearing structures 467 which are mounted in a housing 468 which is attached, as at 563, to a wall 562 of the supporting frame 76 (FIG. 64). The shaft 462 is similarly mounted in anti-friction bearing structures 469 which are mounted in the housing member 468 (FIG. 64).

In the use of the new machine 75, when the single driving motor 83 is energized and the endless conveyor 77-86-87 is operated, in the manner described above, power is transmitted by way of the shaft 81, gear 326 and gears 347 and 352 to the hollow tubular shaft 461 on which the upper and heated heat-sealing platen 262 is mounted, thereby rotating the upper heat-sealing platen 262 with the tubular supporting shaft 461. At the same time power is transmitted to the unheated lower platen 263 by way of the tubular shaft 461, gears 352, 462 and 464, and shaft 466 to the lower and unheated heat-sealing platen 263 to rotate the latter, thereby heat-sealing the end edge portions 112 of the wrapper 102 together (FIG. 64).

As shown in FIG. 64, when the tubular shaft 461 and the heated upper heat-sealing platen 262 of the heat-sealing device 111 mounted thereon are rotated, the annular brushes 567 working in the annular grooves 568 of the electric commutation device 569 generate an electric current which is transmitted by the electrical conductors 565-565 in the tubular shaft 461 to the two heating elements 564 in the upper and heated heat-sealing platen 262 of the heat-sealing device 111 for heat-sealing together the end edge portions 112 of the web 102 of flexible, moisture-resistant, heat-sealable wrapping material around the ice cream cookie sandwiches 89-97-99-108.

- 7 - the power transmission means for the rotary
web-severing or web-cutting device 113

(FIGS. 44, 45, 46, 47, 59, 63, 64, 67 and 81)

and for the take-away or delivery roller 282

(FIGS. 44 and 81)

The web-severing or web-cutting device 113 and the upper and lower cutter knives 274-275 and 277-278, respectvely, embodied therein, are operated in synchronism with the endless conveyor unit 77-86-87 and with the other operating parts of the machine 75, and the power transmission means therefor is shown in FIGS. 44, 45, 46, 47, 58, 63, 64, 67 and 81.

The upper rotary web-severing or web-cutting knife member 274 is mounted on a shaft 471 which is rotatably journaled in an anti-friction bearing member 472 which is mounted on a housing unit 473 which is formed, in part, by the housing section 331 of the supporting frame structure 76 (FIG. 63). Similarly, the lower web-severing or web-cutting knife member 277 is mounted on a shaft 474 which is rotatably journaled in an anti-friction bearing member 475 which is mounted on the housing unit 473-331-76 (FIG. 63). The supporting shaft 471 for the upper web-cutting or web-severing knife member 274 has a gear 476 mounted thereon and this gear 476 meshes with the gear 352 on the drive shaft 461 for the upper heat-sealing platen 262 of the heat-sealing device 111 for heat-sealing the end edge portions 112 of the flexible, moisture-resistant, heat-sealable wrapping material about the ice cream cookie sandwich 89-97-99 (108). (FIGS. 63 and 64). The supporting shaft 471 for the upper web-cutting or websevering knife member 274 also has a spur gear 477 thereon and this spur gear 477 meshes with a gear 462 which is attached to the gear 352 (FIGS. 63 and 64). The supporting shaft 471 for the upper web-cutting or web-severing knife member 274 also has a gear 481 mounted thereon and this gear 481 meshes with a gear 482 on the supporting shaft 474 for the lower web-cutting or web-severing knife member 777 (FIG. 63).

The construction and arrangement of the parts in the power transmission means for the upper and lower rotary web-cutting or web-severing knife members 274 and 277, respectively, is such that when the driving motor 83 is energized and the endless conveyor 77-86-87 and the heat-sealing platens 262 and 263 in the heat-sealing device 111 for heat-sealing the end edge portion 112 of the wrapper 102 together, are operated, in the manner described above, power is delivered by way of the shaft 461, gear 352, gear 462, gear 479, gear 477, and the supporting shaft 471 for the upper rotary web-cutting or web-severing knife members 274 to rotate the latter while, at the same time, power is transmitted by way of the gear 481 on the shaft 471 to the gear 482 on the supporting shaft 474 for the lower rotary web-cutting or web-severing knife member 277 to rotate the latter (FIGS. 63, 64 and 81).

At the same time, power is transmitted by way of the pulley 285 on the supporting shaft 474 for the lower rotary web-cutting or web-severing knife member 277, belt 283 and pulley 284 to the supporting shaft 287 for the take-off or delivery roller 282 to rotate the latter and thus discharge the completed wrapped and heat-sealed ice cream cookie sandwich 89-97-99 onto the delivery or take-away conveyor 114 (FIG. 45).

- u - the means for adjusting the height or position of The
rotary ice cream Extruder Head Device 90-91 to
accommodate it to making ice cream cookie
sandwiches of varying thicknesses (FIGS. 60, 68 and 68A)

The new machine 75 includes a means for adjusting the vertical height or position of the rotary ice cream extruder device 90-91 relative to and above the cookie guideway or trackway 84-85 to accommodate the rotary ice cream extruder device 90-91 to making ice cream cookie sandwiches of varying thicknesses. This adjusting means is generally indicated at 359 in FIGS. 60, 68 and 68A, and comprises the tubular sleeve member 92 which is attached to the body 91 of the rotary ice cream extruder device 90-91 and the vertically adjustable carriage or supporting frame structure 483 which is attached to the tubular sleeve member 92 as at 484 and 485 (FIG. 60). the vertically adjustable carriage or supporting frame structure 483 includes a pair of horizontally spaced vertically extending wall members 486 and 487, and the means 359 for adjusting the vertical height or position of the rotary ice cream extruder device 90-91 includes a pair of latching or clamping members 488 and 489. The latching or clamping member 488 projects through a slot 490 which is formed in the wall 486 and through a similar slot 491 formed in the wall 587, and has a threaded inner end portion 492 which is threaded into a threaded or tapped opening 493 which is formed in the wall 494 which is formed as a part of the supporting frame structure 76 and extends parallel to the vertically extending wall 487 of the vertically extending supporting frame or carriage 483 for the rotary ice cream extruder device 90-91 (FIG. 60). A clamping flange member 495 is formed on the inner end portion of the clamping or latching member 488 and a handle member 496 is provided on the clamping or latching member 488 externally of the vertically extending wall member 486.

The clamping or latching member 498 extends through an opening 497 in the wall 486 of the vertically extending supporting frame or carriage 483 and this clamping or latching member 489 has a threaded inner end portion 498 which is threaded into a clamping flange member 500 is provided on the inner end portion of the clamping or latching member 489 and below the handle member 496 on the clamping or latching member 488 (FIG. 60).

The means 359 for adjusting the vertical height or position of the rotary ice cream extruder device 90-91 includes a vertically extending screw-threaded operating rod member 502 which is threaded into an internally threaded member 503 which is threaded into a socket 503 which is mounted in the bottom wall 505 of the depending extension 504 of the vertically extending supporting frame or carriage 483 for the rotary ice cream extruder device 90-91 (FIGS. 60, 68 and 68A). The lower end portion of the operating rod member 502 extends through an opening 506 in a wall 505 of the supporting frame structure 76 and a handle member 507 is mounted on the operating rod member 502 below the wall member 505 (FIGS. 68 and 68A).

The construction and arrangement of the parts of the adjusting means 359 for adjusting the vertical position or height of the rotary ice cream extruder device 90-91 relative to and above the trackway or guideway 94-85 are such that the rotary ice crea extruder device 90-91 may be adjusted vertically relative to the endless conveyor unit 77-86-87 and the guideway or trackway 84-85 by manipulating and loosening the clamping or latching members 488 and 489, by means of their handles 496 and 501, respectively, and then raising the entire supporting frame or carriages 483 and the rotary ice cream extruder device 90-91 and its tubular mounting sleeve member 92, by manipulating the screw-threaded operating rod member 502 in its threaded socket 503 by means of the handle member 507 thereon (FIGS. 68 and 68A). This motion acts, through the bottom wall 505 of the depending extension 504 of the vertically extending supporting frame or carriage 483, to adjust the vertical position or height of the rotary ice cream extruder device 90-91 to the desired vertical position or height relative to and above the guideway or trackway 84-85 and the endless conveyor unit 77-86-87 to accommodate the rotary ice cream extruder device 90-91 to the making of ice cream cookie sandwiches (and cookies embodied therein) of varying thicknesses. During this operation the clamping or latching member 488 projects through the slots 490 and 491 in the walls 486 and 487, respectively, and the clamping or latching member 489 projects through the slots 497 and 500 in the walls 486 and 487, respectively. The supporting frame or carriage 483 for the rotary ice cream extruder head device 90-91 may then be clamped in the desired vertically adjusted position by manipulating the clamping or latching members 488 and 489, by means of their handles 496, and 501, respectively, thereby causing the clamping flanges 495 and 500 on the clamping and latching member 488 and 489, respectively, to engage the inner surface of the wall 487 and thus clamp or latch the supportng frame or carriage 483 and the rotary ice cream extruder device 90-91 in the desired vertically adjusted position relative to and above the guideway or trackway 84-85.

- v - the means for radially adjusting the position of the rotary ice cream extruder head device 90-91 and its dispensing outlet 221 to synchronize the position of the dispensing outlet 221 with the movement of the endless conveyor unit 77-86-87 and the position of the first or Bottom Cookie 89 as moved Thereby along the Guideway or TrackWay 84-85

(FIGS. 68 TO 72, Inclusive

The new machine 75 includes means for radially adjusting the position of the rotary ice cream extruder device 90-91 and the annular rim memer 557 thereon and its dispensing or discharge outlets 221 to synchronize the position of the dispensing or discharge outlets 221 in the rotary ice cream extruder device 90-91 with and relative to the endless conveyor unit 77-86-87 and the position of the first or bottom cookie 89 as it is advanced along the guideway or trackway 84-85 by the article-advancing means or upwardly extending pusher finger member 87 on the upper run of the endless conveyor unit 77-86-87. This means is illustrated in FIGS. 68 to 72, inclusive, wherein it is generally indicated at 508, and comprises an elongated arm member 509 which has an end portion which is pivotally mounted, as at 510, in the housing-like section 331 of the supporting frame structure 76 (FIG. 68).

The other end portion of the pivotally mounted arm member 509 has the gear 342 rotatably mounted thereon by way of the shaft 510, the sprocket chain drive 333 working over this gear 342 (FIGS. 68 and 81). A vertically extending operating screw member 513 is rotatably and screw threadedly mounted in a tubular vertically extending internally threaded socket 518 and the operating screw member 513 has an upper end portion which is pivotally connected as at 515, to the pivotally mounted arm member 509 between its ends (FIG. 68), and the operating screw member 513 has a lower end portion 516 which extends through the horizontal wall 507 of the supporting frame structure 76 and has a handle member 517 thereon below the wall 507 (FIG. 68).

The construction and arrangement of the parts in the adjuting means 508, as described above, and as shown in FIGS. 68 to 72, inclusive, is such that the rotary ice cream extruder device 90-91 and the annular rim member 557 thereon and its dispensing outlet 221 may be radially adjusted to synchronize them with the movement of the endless conveyor unit 77-86-87 and the position of the first or bottom cookie 89 thereon as it is moved by the article-advancing means or upwardly extending pusher finger member 87 on the upper run of the edless conveyor unit 77-86-87. This is accomplished by manipulating the operating screw member 513, by means of its handle member 517, and this motion of the operating screw member 513 acts, through its pivotal connection 515 with the pivotally mounted arm member 509, so as to move the pivotally mounted arm member 509.

Thus, if the pivotally mounted arm member 509 is pivoted on its pivotal mounting 510 in a counterclockwise direction (FIG. 68) the gear 342 thereon will be lowered correspondingly and this movement of the gear 342 will act, through the sprocket chain drive 333 and the gear 334 on the tubular sleeve mounting 92 for the rotary ice cream extruder device 90-91, to rotate the rotary ice cream extruder device 90-91 on its tubular sleeve mounting 92 and on and relative to its supporting structure or carriage 359 (FIG. 66) and thereby radially move the dispensing outlets 221 in the annular rim member 557 on the rotary ice cream extruder device 90-91 into synchronism with the endless conveyor 77-86-87 and the first or bottom cookie 89 as it is moved along the guideway or trackway 84-85 by the article-advancing means or upwardly extending pusher finger members 87 on the upper run of the endless conveyor unit 77-87-86; the extent of the pivotal movement of the pivotally mounted arm member 509 and the gear 342 carried thereby and the corresponding degree of radial movement of the rotary ice cream extruder device 90-91-557 and of its dispensing outlets 221 being determined by the degree of manual rotation of the operating screw 513 in its internally threaded socket 518 and this action may be repeated until the dispensing outlets 221 in the rotary ice cream extruder device 90-91-557 have been properly synchronized with the endless conveyor unit 77-86-87 and the first or bottom cookie 89 thereon.

- w -

The MEANS for Tensioning the Power Transmission Means for the Rotary Ice Cream Extruder Head Device 90-91

(FIGS. 68, 81 and 72)

The new ice cream cookie sandwich making machine 75 includes means for maintaining a constant and uniform tension on the power transmission, that is, on the sprocket chain drive 333 for the rotary ice cream extruder 90-91, so as to maintain a constant and uniform speed of rotation of the rotary ice cream extuder device 90-91 in the various vertical positions or heights to which it may be adjusted relative to the endless conveyor unit 77-86-87, and the guideway or trackway 84-85, to accommodate it to the manufacture of ice cream cookie sandwiches and cookies embodied thereon of various thicknesses. This tensioning means is shown in FIGS. 68, 71 and 72, wherein it is generally indicated at 519, and comprises a rigid arm member 520 having an end portion which is pivotally mounted, as at 521, on a vertically extending supporting member 522 which is mounted on the wall 507 of the supporting frame structure 76 (FIG. 68). The rigid pivotally mounted arm member 520 has an end portion which is pivotally connected, as at 523, to a second rigid arm member 524 on which the sprocket gear 340 is rotatably mounted as at 525 (FIG. 68). A coil spring 526 has a lower end portion which is mounted in a socket 527 which, in turn, is mounted in the wall 507 of the supporting frame structure 76 and the upper end portion of the coil spring 526 is attached, as at 528, to the rigid arm member 524 between the end thereof (FIG. 68).

The construction and arrangement of the parts in the tensioning means 519, as described above, are such that the coil spring unit 526-527-528 exerts a constant downward pull on the rigid arm member 524 and thereby tends to rotate the sprocket gear 340 thereon outwardly against the sprocket drive chain 333 (counterclockwise, FIG. 68) and thus maintains a constant and uniform tension on the sprocket drive 333 for the rotary extruder device 90-91 in any and all of its vertically adjusted position, and thus assures that the rotary ice cream extruder device 90-91 will at all times be rotated at a constant and uniform speed in any position to which it may be adjusted vertically to accommodate it to the making of ice cream cookie sandwiches (and cookies embodied therein) of varying thicknesses.

- x -

The Electrical Control Circuits for the Single Driving Motor 83 and for the Heat-Sealing Devices 109 and 111

(FIGS. 1,2,3,64,65 and 80)

The electrical control circuits for the single driving motor 83 in the machine 75 and for the heat-sealing devices 109 and 111 are illustrated in FIGS. 1,2,3,64,65 and 80, wherein they are generally indicated at 529 and are arranged within an electrical control housing 596 (FIG. 65) and include a motor control circuit 530 for the vehicle speed single electric driving or operating motor 83, the motor control circuit 530 being connected by a line 531 to a suitable source of electric current (not shown). A manually operable control switch 532 is embodied in the motor circuit 530 and a jogger switch unit 533 is also arranged in the motor control circuit 530 for the purpose of enabling the electric driving motor and the several power transmission means under its control to be jogged or manually set into operation in intermittent steps when it is desired to start-up or test the machine, or for other reasons. A rheostat unit 534 is also embodied in the motor control circuit 530 for controlling the speed of operation of the variable speed single electric driving motor 83

The control circuit for the heating unit 455 in the heated platen 255 of the heat-sealing device 109 (FIG. 62) is indicated at 535 and is connected to the power intake line 531 and has a manually operable control switch 536 therein. A rheostat heat control unit 537 is likewise mounted in the control circuit 535 for the heating unit 455 of the heated platen 255 of the heat-sealing device 109 (FIG. 80).

The control circuit for the two heating units 564 in the heated upper platen 262 of the heat-sealing device 111 is indicated at 538 (FIG. 80) and is connected to the power intake line 531 and to the electrical conductors 565-566 from the electrical commutator device 569-567 (FIG. 64), and has a manually operable control switch 539 therein and also embodies a rheostat heat control unit 540 for controlling the current supply to and the temperature of the heating units 564 of the upper and heated platen 262 in the heat-sealing device 111 (FIG. 81). A warning signal light 541 is also arranged in the circuit 530 (FIGS. 1 and 80).

It will be noted that when the new machine 75 is in operation, the electrical commutator device 569 on the tubular shaft 461 and the annular brushes 567 embodied therein is supplied with electrical current from the power intake line 531 (FIG. 80) by way of the electrical conductors 573 to the insulated electrical conductors 565-566 through the tubular operating shaft 461 for the upper and heated platen 262 of the heat-sealing device 111 to the two heating units 564 therein to heat the upper heating platen 262 (FIGS. 64 and 80).

The manual control switches 532, 539 and 536 and the warning signal lamp 541 are mounted in an electrical control panel or box 542 which is mounted on an upright tubular electrical conductor supporting member 543 which is mounted on the supporting frame structure 76 and extends above the same (FIGS. 1 and 2). An electrical conduit 597-598 leads from the electrical control housing 596 through the upright supporting member 543 to the control panel or box (FIGS. 1, 2 and 65).

- y -

The Timing Chart
(FIG. 82)

A timing chart showing the cyclical relationship of the various operations performed by the new machine 75 is illustrated in FIG. 82 of the drawings and illustrates the cylical relationship of the various operations performed by the machine 75, from the time the first or bottom cookie 89 is dispensed from the first or bottom cookie storage magazine 119 onto the trackway or guideway 94-85 etc., until the completed, wrapped and heat-sealed ice cream cookie sandwich 89-97-99 is cut or severed from a chain thereof and is ejected by the discharge roller 282 onto the endless take-away or delivery conveyor 115 the cylical relationship of the various operations being indicated by the bar graphs 544 to 553, inclusive, and the explanatory legends to the left thereof on the chart (FIG. 82).

- z -

The Means for Controlling the Volume of Flowable Semi-Frozen Ice Cream Which is Fed Into the Rotary Ice Cream Extruder Device 90-91 and For Synchronizing the Flow of Flowable Semi-Frozen Ice Cream with the Speed of the Machine As shown in FIG. 83, the new machine 75 includes means for controlling the volume of flowable semi-frozen ice cream or other flowable comestible or edible food product which is fed into the rotary extruder device 90-91, in relation to the first or bottom cookie or other edible or non-edible protective or carrier member 89, and for synchronizing the flow of flowable semi-frozen ice cream or like edible or comestible food product with the speed of the machine 75. This means includes the combination of the positive displacement pump 311, the variable speed electric driving motor 83, a pressure relief valve 557 which is arranged in the supply line 314-312 from the continuous product flow ice-cream maker-freezer unit 412 to the positive displacement pump 311 and thence to the rotary ice cream extruder device 90-91; the pressure relief valve 577 being provided with a waste discharge outlet line 578 which flows into a waste receptacle 579 (FIG. 83). The continuous flow ice cream maker-freezer unit 412 may be of any suitable design, construction and capacity gnd for this purpose the continuous flow ice cream maker-freezer unit manufactured by the Cherry-Burrell Corporation, Park Ridge, Ill. and Chicago, Ill., and known as its Models 303, 403 and 603 are satisfactory for use in the present invention.

This combination of devices, as shown in FIGS. 83, is such that when the new machine 75 is in operation the volume of flowable semi-frozen ice cream or like comestible or edible and flowable food product fed into the rotary extruder device 90-91 is maintained constant and uniform in relation to the first or bottom cookie 89 or like protective or carrier member and the flow of flowable semi-frozen ice cream or similar edible food product from the continuous product flow or ice cream maker-freezer unit 412 is synchronized with the speed of operation of the machine 75.

In the event that the pressure of the flowable semi-frozen ice cream or other comestible or edible food product in the supply line 314-312 ro the rotary extruder device 90-91 becomes excessive, it is relieved by the pressure-relief valve 577, which may be designed and adjusted for any desired pressure, and in such event the overlow or waste flowable, semi-frozen ice cream or other flowable food product will be discharged from the supply line 314, by way of the pressure relief valve 577, and the waste discharge outlet 578 therefrom into the waste receptacle 579 for salvage and reuse.

- 2 -

SUMMARY OF THE OPERATIONS OF THE MACHINE

Having thus described in detail the various means and devices embodied in the new machine 75 for making ice cream cookie sandwiches, a summary of the operations of the machine will now be given, reference being had to the preceding descriptions of the various means and devices for further details thereof.

Thus, when the single electric driving or operating motor 82 is energized by the manually operable control switch 532 (FIGS. 1 and 81) and the manually operable control switches 536 and 539 for the electrical heating coils 455 in the heat-sealing platen 255 of the heat-sealing device 109 and for the heating coils 564-564 in the heat-sealing platen 262 of the heat-sealing device 111, respectively, the power is delivered to the positive displacement ice cream pump 311 by way of the single electric driving motor 83, motor shaft 316 pulley 317, timing belt 318, pulley 327, shaft 328, gear 329, sprocket chain 602, sprocket gear 570, shaft 332, sprocket gear 599, sprocket chain 330, sprocket gear 600, and shaft 601 (FIG. 81) to operate the ice cream pump 331 and thus force a supply of flowable semi-frozen ice cream from the ice cream maker-freezer unit 412 by way of the supply line 314, and pressure relief valve 577 into the tubular ice cream supply line 95 and thence by way of the discharge outlet 175 sequentially into the ice cream chambers 84 of the rotary ice cream extruder device 90-91.

At the same time, power is delivered from the single electric driving motor 83 by way of the motor shaft 316, pulley 317, timing belt 318, pulley 319, shaft 320, sprocket gear 321, sprocket chain 82, sprocket gear 323, shaft 324, gears 325 and 326, shaft 81, and sprocket gear 80 to drive the endless sprocket drive chain 559 of the endless conveyor unit 77-86-87 (FIG. 81) and thus advance the article-advancing means or upwardly extending pusher finger members 87 on the upper run of the endless conveyor unit 77-86-87 along the guideway or trackway 84-85 and into engagement with the first or bottom cookie 89 deposited from the first or bottom cookie storage magazine or hopper 119 onto the auxiliary cookie-supporting and cookie stack-lifting or raising arms 145-145 of the first or bottom cookie stack-supporting and cookie stack-lifting or raising device 139 which forms the first movable section of the guideway or trackway 84-85 (FIGS. 9, 10 and 11). The first or bottom cookie 89 thus deposited on the first and movable section 144-145 of the guideway or trackway 84-85 at the first work station in the machine 75 is then moved along the guideway or trackway 84-85, by the article-advancing means or upwardly extending pusher finger member 87 on the endless conveyor unit 77-86-87-559 into engagement with the first or bottom cookie-centering device 170 by which it is properly centered on the guideway or trackway 84-85 for reception of a measured body 87 of frozen ice cream from the rotary ice cream extruder device 90-91 at the second work station in the machine 75.

When the endless conveyor unit 77-86-87-559 is thus operated, power is also transmitted thereby by way of the sprocket gear 78, shaft 79, gears 336 and 337, shaft 338 sprocket gear 339 and sprocket drive chain 333 to the sprocket gear 334 on the tubular mounting sleeve member 92 on which the rotary ice cream extruder head device 90-91 brings the radially arranged ice cream chambers 94 therein and their radially inner and inlet ends 554 sequentially into registration with the outlet or discharge slot 175 in the tubular ice cream supply member 95 so that the ice cream chambers 94 in the rotary ice cream extruder device 90-91 are sequentially filled with frozen ice cream under pressure from the positive displacement pump 311. At the same time, a body 97 of frozen ice cream is dispensed sequentially from each of the ice cream chambers 94 by way of one of the dispensing or discharge outlets 221 in the annular rim member 557 on the generally cylindrical body 91 of the rotary ice cream extruder device 90-91 onto the first or bottom cookie 89 (FIGS. 17 to 21 inclusiee and 21A); the body 97 of ice cream being trimmed to the proper and desired size by the wire trimmer 186 of the wire trimmer device 185 as described hereinbefore (FIGS. 12, 13 and 12A)

It should be noted, in this connection, that the soft ice cream extruded from the rotary ice cream extruder head device 90-91-557 at the start-up of the machine 75, is scraped from the peripheral surface 96 of the rotary ice cream extruder head device 90-91-557 by the scraper member 193 on the combination scraper and salvage device 89 and discharged into the pan receptacle 190-410 to be salvaged for refreezing and reuse (FIGS. 3, 3A and 12).

The first or bottom cookie 89 with the measured body 97 of frozen ice cream thereon is then moved by the article-advancing means or upwardly extending pusher finger members 87 on the upper run of the endless conveyor unit 77-86-87 along the guideway or trackway 84-85 and over the downwardly inclined and rigid or non-movable mid-section 409 thereof to the next and third work station of the machine 75 and onto the second movable section or second and top cookie stack-supporting and raising or lifting arm members 144a14 145a of the trackway or guideway 84-85 for the reception of the second or top cookie 99 from the second or top cookie storage magazine or hopper 98; it being noted, in this connection, that the downwardly inclined mid-section 409 of the guideway or trackway 84-85 (FIG. 78) enables the first or bottom cookie 89 and the body 97 of frozen ice cream thereon to be moved by the pusher finger members 87 on the upper run of the endless conveyor unit 77-86-87 along the downwardly inclined rigid mid-section of the guideway or trackway 84-85 under the second auxiliary cookie supporting and cookie stack-raising or lifting rails 144a-144a-145a so that the top cookie 99 may be deposited thereon, as shown in FIG. 24.

The thus assembled ice cream cookie sandwich 89-97-99 is then moved by the upwardly extending pusher finger members 87 on the upper run of the endless conveyor unit 77-86-87 along the guideway or trackway 84-85 and into engagement with the second-centering device 157-170a (FIGS. 25 to 30, inclusive) by which the assembled ice cream cookie sandwich 89-97-99 is properly centered for the wrapping and folding operations, while, at the same time, the assembled ice cream cookie sandwich 89-97-99 is engaged by the hold-down device 173-237 (FIGS. 25 to 30, inclusive) which holds the components of the ice cream cookie sandwich 89-97-99 in properly assembled position for the wrapping and folding operations.

The assembled ice cream cookie sandwich 89-97-99 is then moved along the trackway or guideway 84-85 by the upwardly extending pusher finger members 87 on the upper run of the endless conveyor unit 77-86-87 to the next and fourth work station in the machine 75, into engagement with and through the wrapping and folding device 107 by which a portion of the flexible, moisture-resistant, heat-sealable wrapper web 102 from the feed roll 99a is folded and wrapped around the assembled ice cream cookie sandwich 89-97-99, as shown in FIGS. 34 to 43, inclusive, and 43A, as hereinbefore described, thereby forming the parallel and abutting bottom edge portions 102d-102d and the end edge portions of the wrapper 102 on the ice cream cookie sandwich 89-97-99 (FIGS. 43 and 43A and 45).

When the single driving motor 83 is energized and the endless conveyor unit 77-86-87 is set into operation, as described above, power is also transmitted to the driving but unheated heat-sealing platen 254 of the heat-sealing device 109 by way of the sprocket gear 80, shaft 81, gear 347, shaft 348, and gears 349 and 350 (FIGS. 62 and 81), thereby rotating the driving but unheated platen 254 on its supporting shaft 351 (FIG. 62). This rotation of the driving but unheated platen 254 of the heat-sealing device 109 acts, throug the knurled through peripheral edge 256 thereon (FIG. 44) to rotate the heated platen 255 in engagement therewith, on its supporting shaft 453 (FIG. 62), and thus heat-sealing the bottom edge portions 102d—102d of the wrapper 102 together while at thesame time providing a knurled surface 438 on the wrapper 102 (FIG. 45) at the fifth work station in the operation of the machine 75.

The thus wrapped and partially heat-sealed ice cream cookie sandwich 89-97-99 is then moved along the guideway or trackway 84-85 by the article-advancing means or upwardly extending pusher finger members 87 on the upper run of the endless conveyor unit 77-86-87 toward and into engagement with the second heat-sealing device 111 and between the upper and lower platens 262 and 263 thereof, respectively, at the sixth work station in the operation of the machine, by which the end edge portions 112 of the wrapper 102 are heat-sealed together (FIGS. 44, 45 and 46). During this second heat-sealing operation, power is transmitted from the endless conveyor unit 77-86-87-559 by way of the sprocket gear 80, shaft 81, gears 326 and 347, gear 352, gears 462, 464, and shafts 461 and 466 to rotate the upper and lower heat-sealing platens 262 and 263, respectively, of the heat-sealing device 111, and thereby heat-seal the end edge portions 112 of the wrapper 102 together about the complete ice cream cookie sandwich 89-97-99 (FIG. 45).

After the end edge portions 112 of the wrapper 102 are thus heat-sealed together by the heat-sealing device 111, the thus completely assembled and wrapped and heat-sealed ice cream cookie sandwich 89-97-99 is then moved by the upwardly extending pusher finger members 87 on the upper run of the endless conveyor 77-86-87-559 along the trackway or guideway 84-85 to the next and seventh and final work station in the operation of the machine, at which the heat-sealed and edge portions 112 of the wrapper 102 are cut or severed from each other in a chain of the wrapped and heat-sealed ice cream cookie sandwich 89-97-99 by the rotary web-cutting or web-severing device 113 and the upper and lower rotary knife members 275 and 287 embodied therein (FIGS. 44, 45 46 and 47). The thus completed, wrapped and heat-sealed ice cream cookie sandwiches 89-98-99 are transferred by the delivery or discharge roller 282 onto the take-away or delivery conveyor 115 for packaging and for freezer storage. During this operation, power is transmitted to the rotary cutter knife blade members 275 and 278 and their supporting shafts 274 and 277, respectively, by way of the gear 352, shaft 461, gears 462 and 464, shaft 466, gears 478 and 481 and shafts 471 and 474 to rotate the rotatable web-cutting or web-severing knife members 275 and 278 and thus cut or sever the heat-sealed and interconnected end edge portions 112 of the wrapper web 102 and the wrapped and heat-sealed ice cream cookie sandwiches joined thereby in a chain of the same from each other (FIG. 45).

At the same time, power is delivered by way of the pulley 285 on the shaft 474 of the lower rotary web-cutting or web-severing knife member 278, and the belt 283 and the pulley 284 to rotate the delivery or take-away roller 282 by which the completed, wrapped and heat-sealed ice cream cookie sandwich 114 are discharged onto the take-away or delivery conveyor 115 for packaging or for freezer storage and for use.

- 3 -

OTHER FORMS OF COMESTIBLE OR EDIBLE FOOD PRODUCTS WHICH MAY BE MADE BY THE MACHINE 75

(FIGS. 84 TO 87, INCLUSIVE)

Other forms of comestible or edible food products which may be made in the use of the new machine 75 are illustrated in FIGS. 84 to 87, inclusive, of the drawings, and will now be described.

Figure 84:
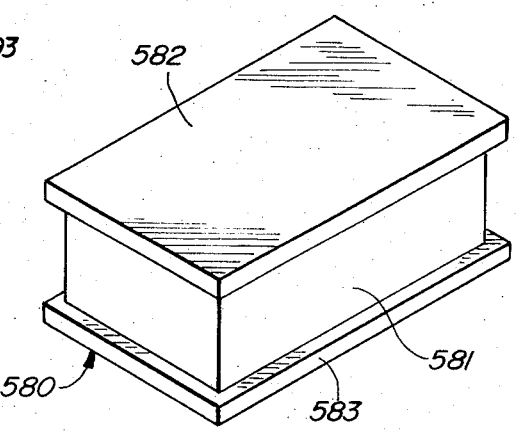

Thus, in FIG. 84 there is illustrated a sandwich type of food product which may be made in the use of the new machine 75, and which is generally indicated at 580, and which includes an edible filler body 581 of semi-frozen ice cream, soft cheese, or the like, which is arranged between a pair of top and bottom non-edible protective or carrier members 582 and 583, respectively, which may be made of paperboard, plastic resinous material, or the like.

In making this sandwich type of food product 580 in the use of the new machine 75 the non-edible top and bottom protective or carrier members 582 and 583, respectively, replace the edible protective or carrier members in the form of the top cookie 99 and the bottom cookie 89, respectively, as hereinbefore described, and may be dispensed from the storage magazine or hoppers 98 and 119, respectively. After the completion of the food product 580 (FIG. 84) and the wrapping and sealing thereof, the non-edible top protective or carrier member 582 may be removed from the sandwich type food product 580 and the edible filler body 581 of semi-frozen ice cream or other edible food product consumed while the consumer holds it on the bottom supporting and protective or carrier member 583.

Figure 85:
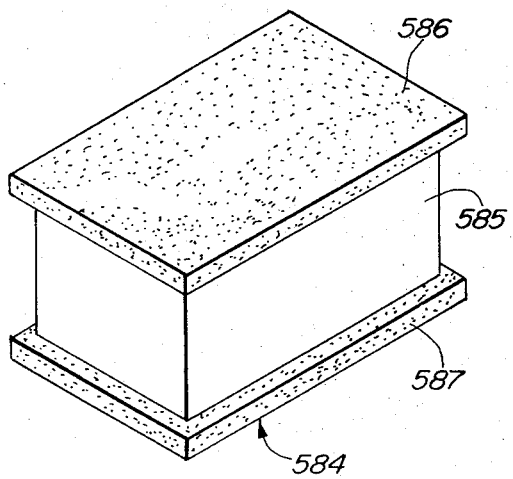

In FIG. 85 there is illustrated another sandwich-type of food product, which is generally indicated at 584, and includes an edible filler body 585 of semi-frozen ice cream or like comestible or edible material arranged between top and bottom edible protective or carrier members 586 and 587, respectively, in the form of frozen cakes or similar edible pastry products.

Figure 86:
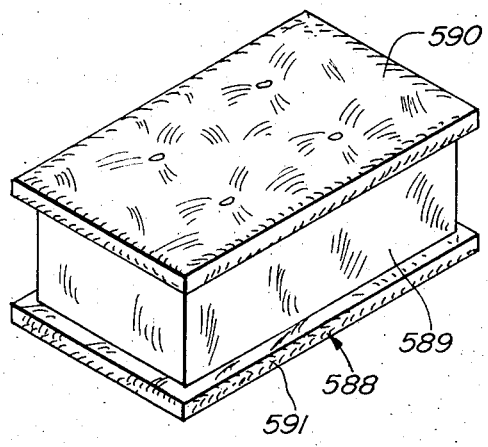

FIG. 86 illustrates another form of an edible sandwich type food product which may be made in the use of the new machine 75 and which includes an edible filler body 589 of soft cheese arranged between top and bottom edible protective or carrier members 590 and 591, respectively, which are in the form of crackers.

Figure 87:
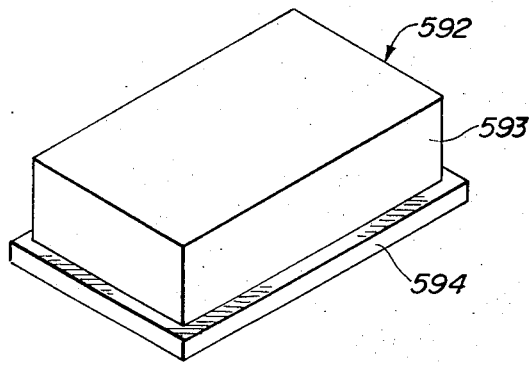

Another form of edible food product which may be made in the use of the new machine 75 is illustrated in FIG. 87 of the drawings, wherein it is generally indicated at 592, and consists of an edible body 593 of soft cheese, semi-frozen ice cream, or like edible material, mounted on a supporting and protective or carrier member 594 in the form of cake, or sliced bread which may be, for example, a low moisture content bread such as pumpernickel bread.

As used hereinbefore and as used hereinafter in the claims the term "cookie" is intended to mean, and does mean, conventional baked cookies of various designs, sizes, shapes and configurations, as well as wafers, crackers, slices of bread, and similar edible articles which may be arranged on one or both sides of an edible filler body of semi-frozen ice cream, soft cheese, oleomargarine, frozen cake, brick ice cream slabs, or other similar edible food products which may be pumped into and dispensed or discharged from the rotary extruder device 90-91.

Likewise, the terms "protective member" and "carrier member", as used hereinafter in certain of the claims, is intended to means and does mean an edible protective or carrier member such, for example, as an edible cookie, wafer, cracker, slice of bread, or the like, having thereon an edible body of semi-frozen ice cream, soft cheese, frozen cake slab, sliced brick ice cream, oleomargarine, or the like, or a non-edible protective or carrier member having an edible body thereon, such as those described above.

It will thus be seen from the foregoing description, considered in conjunction with the accompanying drawings, that the present invention provides a new and improved machine for making ice cream cookie sandwiches, or similar edible sandwich products, and thus has the desirable advantages and characteristics and accomplishes its intended objects, including those hereinbefore pointed out and others which are inherent to the invention.

We claim:

1. A machine for making ice cream cookie sandwiches of the type which includes as component parts thereof, a body of frozen ice cream arranged between a first or bottom cookie and a second or top cookie, comprising:
   a. a supporting frame structure;
   b. a generally horizontally extending trackway or guideway supported by the said supporting frame structure and having a plurality of work stations arranged therealong;
   c. a first or bottom cookie storage magazine or hopper mounted on the said supporting frame structure at the first one of the said work stations;
   d. conveyor means movably mounted on the said supporting frame structure and including
      1. article-advancing means for advancing the components of the said ice cream cookie sandwiches sequentially along the said guideway or trackway to and past each of the said work stations;
   e. means forming a part of the said trackway or guideway at the said first one of the said work stations and below the said first cookie storage magazine or hopper for supporting a stack of the said first or bottom cookies in the said first or bottom cookie storage magazine or hopper with the lowermost cookie in the said stack thereof resting on the said cookie stack-supporting and lifting means;
   f. manually operable means for movably mounting the said cookie stack-supporting means on the said supporting frame structure for movement from a first and lowered and generally horizontal position in which the said cookie stack-supporting and lifting means forms a part of the said guideway or trackway and is adapted to support the lowermost cookie in the said stack thereof in the path of travel of the said article-advancing means along the said guideway or trackway into a second and raised and generally horizontal position above the said guideway or trackway with the lowermost cookie in the said stack thereof disposed out of the path of travel of the said article-advancing means on the said conveyor means;
   g. ice cream dispensing means rotatably mounted on the said supporting frame structure at a second one of the said work stations above the said guideway or trackway for dispensing a measured body of frozen ice cream onto the said first or bottom cookie at a second one of the said work stations;
   h. a second or top cookie storage magazine or hopper arranged at a third one of the said work stations;
   i. the said guideway or trackway including an inclined section which is inclined downwardly from an upper end portion adjacent to the said second work station and the said ice cream dispensing means to a lower end portion adjacent the said third work station and the said second or top cookie storage magazine or hopper;
   j. second cookie stack supporting means forming a part of the said guideway or trackway at the said third one of the said work stations and below the said second cookie storage magazine or hopper at the lower end portion of the said inclined section of the said guideway or trackway for supporting a stack of the said second or top cookies in the said second or top cookie storage magazine or hopper with the lowermost cookie in the said stack of second or top cookies resting on the said second cookie stack-supporting and lifting means and in the path of travel of the said article-advancing means on the said conveyor means as the said article-advancing means moves the said first or bottom cookie with the body of frozen ice cream thereon from the lower end portion of the said inclined section of the said guideway or trackway under the said second cookie stack-supporting and lifting means; and
   k. means for operating the said conveyor means and the said article-advancing means thereon and the said ice cream dispensing means in timed relationship with each other.

2. A machine for making ice cream cookie sandwiches as defined in claim 1 which includes
   a. manually operable means for moving the said second cookie stack-supporting and raising or lifting means on the said supporting frame structure for movement from a first and lowered generally horizontal position in which the said second cookie stack-supporting and lifting means forms a part of the said guideway or trackway and is adapted to support the lowermost cookie in the said stack of top or second cookies in the path of travel of the said article-advancing means on the said conveyor means into a second and raised and generally horizontal position above the said guideway or trackway with the lowermost second or top cookie in the said second or top cookie storage magazine or hopper disposed out of the path of travel of the said article-advancing means on the said conveyor means.

3. An edible sandwich making machine for making edible sandwiches of the type which includes a body of edible material arranged between a first or bottom cookie and a second or top cookie, comprising:
   a. a supporting frame structure;
   b. a generally horizontally extending guideway or trackway supported by the said supporting frame structure and having a plurality of work stations arranged therealong;
   c. a first or bottom cookie storage magazine or hopper mounted on the said supporting frame structure above the said guideway or trackway at the first one of the said work stations and adapted to deposit a first or bottom cookie one at a time from the said first or bottom cookie storage magazine or hopper onto the said guideway or trackway;
   d. edible body dispensing means mounted on the said supporting frame structure at a second one of the said work stations and adapted to deposit a body of edible material onto the upper surface of each of the first or bottom cookies;
   e. a second or top cookie storage magazine or hopper mounted on the said supporting frame structure above the said guideway or trackway at another one of the said work stations and adapted to deposit a second or top cookie one at a time onto the upper surface of the said body of edible material carried by the said first or bottom cookie to form an edible sandwich;
   f. wrapper supply means mounted on the said supporting frame structure at another and fourth one of the said work stations for supplying flexible wrapping material to the said edible sandwich;

g. folding and wrapping means mounted on the said supporting frame structure at another and fifth one of the said work stations for folding and wrapping the said flexible wrapping material around the said edible sandwiches;

h. conveyor means movably mounted on the supporting frame structure for movement along the said guideway or trackway and adapted to move the said first or bottom cookies one at a time from the said first or bottom cookie storage magazine or hopper at the said first work station along the said guideway or trackway to the said edible body dispensing means at the said second one of said work stations and for moving the said first or bottom cookie with the said body of edible material thereon along the said guideway or trackway to the said second or top cookie storage magazine at the said third one of said work stations for the deposit of a second or top cookie on the said body of edible material from the said second or top cookie storage magazine to complete the said edible sanwich and for moving the said edible sandwich along the said guideway or trackway to the said wrapper supply means at a fourth one of said work stations and to the said folding and wrapping means at a fifth one of said work stations;

i. power means;

j. power transmission means under the control of said power means for operating the said conveyor means;

k. the said conveyor means including
　1. an endless conveyor unit movably mounted on the said supporting frame structure and movable along the said guideway or trackway; and
　2. article-advancing means carried by and arranged at spaced intervals along the said endless conveyor unit and adapted to engage sequentially the lowermost cookie in the said first or bottom cookie storage magazine and to move the said lowermost or bottom cookie from a stack of the said first or bottom cookies in the said first or bottom cookie storage magazine along the said guideway or trackway successively to each of the said work stations;

l. cookie stack-supporting and raising or lifting means movably mounted on the said supporting frame structure below the said first or bottom cookie storage magazine or hopper and when in a first or lowered position adapted to support a stack of the said first or bottom cookies in the said first or bottom cookie storage magazine with the lowermost cookie in the said stack resting upon the said cookie stack-supporting and lifting means, and in a position to be engaged by the said article-advancing means on the said endless conveyor; and m. manually operable means movably mounted on the said supporting frame structure below the said first or bottom cookie storage magazine or hopper for moving the said cookie stack-supporting and raising or lifting means and the said stack of cookies in the said first or bottom cookie storage magazine or hopper from a first or lowered position upwardly into a raised and generally horizontal second position relative to and above the said guideway or trackway so as to move the lowermost first or bottom cookie in the said stack thereof upwardly out of the path of travel of the said article-advancing means on the said endless conveyor unit.

4. An edible sandwich making machine as defined in claim 3 in which the said cookie stack-supporting and raising or lifting means includes
　a. generally horizontally extending laterally spaced cookie-supporting trackway members forming part of the said guideway or trackway and adapted when in their first or lowered position to support the lowermost first or bottom cookie in the said stack thereof in the path of travel of the said article-advancing means on the said endless conveyor.

5. An edible sandwich making machine as defined in claim 3, which includes
　a. manually operable latching means for latching the said cookie stack-supporting and raising or lifting means and the said stack of first or bottom cookies supported thereby in a raised upwardly extended and generally horizontal position relative to and above the said guideway or trackway with the lowermost first or bottom cookie disposed thereon positioned out of the path of travel of the said article-advancing means on the said endless conveyor unit.

6. An edible sandwich making machine as defined in claim 3 which includes
　a. second cookie stack-supporting and raising or lifting means movably mounted on the said supporting frame structure below the said second or bottom cookie storage magazine or hopper and adapted to support a stack of the said second or bottom cookies in the said second or top cookie storage magazine or hopper with the lowermost cookie in the said stack of said second or top cookies resting upon the said second cookie stack-supporting and raising or lifting means in a position to be engaged by the said article-advancing means on the said endless conveyor unit.

7. An edible sandwich making machine as defined in claim 6 which includes
　a. manually operable means movably mounted on the said supporting frame structure below the said second or top cookie storage magazine or hopper for moving the said second cookie stack-supporting or raising and lifting means and the said stack of second or top cookies in the said second or top cookie storage magazine or hopper vertically upwardly relative to the said guideway or trackway so as to move the said lowermost top or second cookie supported thereby upwardly out of the path of travel of the said article-advancing means on the said endless conveyor unit.

8. An edible sandwich making machine as defined in claim 7 which includes
　a. manually operable means for latching the said second cookie stack-supporting and raising or lifting means and the said stack of second or top cookies supported thereby in an upwardly raised and generally horizontal position relative to and above the said guideway or trackway with the lowermost second or top cookie supported thereby disposed out of the path of travel of the said article-advancing means on the said endless conveyor unit.

9. An edible sandwich making machine for making edible sandwiches of the type which includes a body of edible material arranged between a first or bottom cookie and a second or top cookie comprising
   a. a supporting frame structure;
   b. a generally horizontally extending guideway or trackway supported by the said supporting frame structure and having a plurality of work stations arranged therealong;
   c. a first or bottom cookie storage magazine or hopper mounted on the said supporting frame structure above the said guideway or trackway at the first one of the said work stations and adapted to deposit a first or bottom cookie one at a time from the said first or bottom cookie storage magazine or hopper onto the said guideway or trackway;
   d. edible body dispensing means mounted on the said supporting frame structure at a second one of the said work stations and adapted to deposit a body of edible material onto the upper surface of each of the said first or bottom cookies;
   e. a second or top cookie storage magazine or hopper mounted on the said supporting frame structure above the said guideway or trackway at another one of the said work stations and adapted to deposit a second or top cookie one at a time onto the upper surface of the said body of edible material carried by the said first or bottom cookie to form an edible sandwich;
   f. wrapper supply means mounted on the said supporting frame structure at another and fourth one of the said work stations for supplying the flexible moisture-resistant, heat-sealable wrapping material to the said edible sandwich;
   g. folding and wrapping means mounted on the said supporting frame structure at another and fifth one of the said work stations for folding and wrapping the said flexible wrapping material around the said edible sandwiches;
   h. conveyor means movably mounted on the supporting frame structure for movement along the said guideway or trackway and adapted to move the said first or bottom cookies one at a time from the said first or bottom cookie storage magazine or hopper at the said first work station along the said guideway or trackway to the said edible body dispensing means at the said second one of said work stations and for moving the said first or bottom cookie with the said body of edible material thereon along the said guideway or trackway to the said second or top cookie storage magazine at the said third one of said work stations for the deposit of a second or top cookie on the said body of edible material from the said second or top cookie storage magazine to complete the said edible sandwich and for moving the said edible sandwich along the said guideway or trackway to the said wrapper supply means at a fourth one of said work stations and to the said folding and wrapping means at a fifth one of said work stations;
   i. heat-sealing means arranged at a sixth one of said work stations for heat-sealing the said flexible, moisture-resistant, heat-sealable wrapping material around the said edible sandwiches;
   j. power means; and
   k. power transmission means under the control of said power means for operating the said edible body dispensing means, the said wrapper supply means, the said folding and wrapping means, the said conveyor means and the said heat-sealing means in timed relationship with each other.

10. An edible sandwich making machine for making edible sandwiches of the type which includes a body of edible material arranged between a first or bottom cookie and a second or top cookie, comprising
   a. a supporting frame structure;
   b. a generally horizontally extending guideway or trackway supported by the said supporting frame structure and having a plurality of work stations arranged therealong;
   c. a first or bottom cookie storage magazine or hopper mounted on the said supporting frame structure above the said guideway or trackway at the first one of the said work stations and adapted to deposit a first or bottom cookie one at a time from the said first or bottom cookie storage magazine or hopper onto the said guideway or trackway;
   d. edible body dispensing means mounted on the said supporting frame structure at a second one of the said work stations and adapted to deposit a body of edible material onto the upper surface of each of the said first or bottom cookies;
   e. a second or top cookie storage magazine or hopper mounted on the said supporting frame structure above the said guideway or trackway at another one of the said work stations and adapted to deposit a second or top cookie one at a time onto the upper surface of the said body of edible material carried by the said first or bottom cookie to form an edible sandwich;
   f. wrapper supply means mounted on the said supporting frame structure at another and fourth one of the said work stations for supplying flexible, moisture-resistant, heat-sealable, wrapping material to the said edible sandwich;
   g. folding and wrapping means mounted on the said supporting frame structure at another and fifth one of the said work stations for folding and wrapping the said flexible wrapping material around the said edible sandwiches;
   h. conveyor means movably mounted on the supporting frame structure for movement along the said guideway or trackway and adapted to move the said first or bottom cookies one at a time from the said first or bottom cookie storage magazine or hopper at the said first work station along the said guideway or trackway to the said edible body dispensing means at the said second one of said work stations and for moving the said first or bottom cookie with the said body of edible material thereon along the said guideway or trackway to the said second or top cookie storage magazine at the said third one of said work stations for the deposit of a second or top cookie on the said body of edible material from the said second or top cookie storage magazine to complete the said edible sandwich and for moving the said edible sandwich along the said guideway or trackway to the said wrapper means at a fourth one of said work stations and to the said folding and wrapping means at a fifth one of said work stations;
   i. the said first folding and wrapping means including
      1. the first folding means for folding the said web of flexible, moisture-resistant, heat-sealable wrapping material around the said edible sandwiches to form substantially parallel vertically extending mating bottom edge portions of the said flexible, moisture-resistant, heat-sealable wrapping material on each of the said edible sandwiches;
2. second folding means for folding the said web of flexible, moisture-resistant, heat-sealable wrapping material around the said edible sandwiches to form mating end portions of the said flexible, moisture-resistant, heat-sealable wrapping material on the said edible sandwiches;
j. first heat-sealing means for heat-sealing the said substantially parallel vertically extending mating bottom edge portions of the said flexible, moisture-resistant, heat-sealable wrapping material together;
k. second heat-sealing means for heat-sealing the said mating end portions of the said flexible, moisture-resistant, heat-sealable wrapping material together at the ends of the said edible sandwiches;
l. power means; and
m. power transmission means under the control of said power means for operating the said edible dispensing means, the said wrapper supply means, the said conveyor means, the said first and second wrapping means, and the said first and second heat-sealing means in timed relationship with each other.

11. An edible sandwich making machine as defined in claim 10, in which
a. the said flexible, moisture-resistant, heat-sealable wrapping material is heat-sealed around the said edible sandwiches forming a chain of the wrapped and heat-sealed edible sandwiches interconnected at their ends by the said flexible, moisture-resistant heat-sealed mating wrapping end portions; and in which the said edible sandwich making machine includes
b. means operated by the said power transmission means in timed relationship with the said wrapper supply means and with the said conveyor means, the said first and second folding and wrapping means, and with the first and second heat-sealing means for cutting or severing the said heat-sealed mating end portions of the said wrapping material so as to sever each of teh said wrapped and heat-sealed edible sandwiches from each other in the said chain of wrapped and heat-sealed sandwiches.

12. An edible sandwich making machine as defined in claim 11 in which
a. the said first heat-sealing means is in the form of a pair of heat-sealing platens arranged in juxtaposition to each other and in side by side horizontal coplanar relationship and adapted to engage and heat-seal together the said vertically extending bottom edge portions of the said flexible, moisture-resistant, heat-sealable wrapping material; and in which
b. the said second heat-sealing means is in the form of a pair of rotary heat-sealing platens arranged in juxtaposition to each other and in a generally horizontal position one above the other and adapted to engage sequentially and to heat-seal together the generally horizontally extending end portions of the said flexible, moisture-resistant, heat-sealable wrapping material at the ends of each of the said edible sandwiches.

13. An edible sandwich making machine for making edible sandwiches of the type which includes a body of edible material arranged between a first or bottom cookie and a second or trop cookie, comprising
a. a supporting frame structure;
b. a generally horizontally extending guideway or trackway supported by the said supporting frame structure and having a plurality of work stations arranged therealong;
c. a first or bottom cookie storage magazine or hopper mounted on the said supporting frame structure above the said guideway or trackway at the first one of the said work stations and adapted to deposit a first or bottom cookie one at a time from the said first of bottom cookie storage magazine or hopper onto the said guideway or trackway;
d. edible body dispensing means mounted on the said supporting frame structure at a second one of the said work stations and adapted to deposit a body of edible material onto the surface of each of the said first or bottom cookies;
e. a second or top cookie storage magazine or hopper mounted on the said supporting frame structure above the said guideway or trackway at another one of the said work stations and adapted to deposit a second or top cookie one at a time onto the upper surface of the said body of edible material carried by the said first or bottom cookie to form an edible sandwich;
f. wrapper supply means mounted on the said supporting frame structure at another and fourth one of the said work stations for supplying flexible wrapping material to the said edible sandwich;
g. folding and wrapping means mounted on the said supporting frame structure at another and fifth one of the said work stations for folding and wrapping the said flexible wrapping material around the said edible sandwiches;
h. conveyor means movably mounted on the supporting frame structure for movement along the said guideway or trackway and adapted to move the said first or bottom cookies one at a time from the said first or bottom cookie storage magazine or hopper at the siad first work station along the said guideway or trackway to the said edible body dispensing means at the said second one of the said work stations and for moving the said first or bottom cookie with the body of edible material thereon along the said guideway or trackway to the said second or top cookie storage magazine at the said third one of said work stations for the deposit of a second or top cookie on the said body of edible material from the said second or top cookie storage magazine to complete the said edible sandwich and for moving the said edible sandwich along the said guideway or trackway to the said wrapper supply means at a fourth one of said work stations and to the said folding and wrapping means at a fifth one of said work stations;
i. power means;
j. power transmission means under the control of said power means for operating the said edible body dispensing means, the said wrapper supply means, the said folding and wrapping means and the said conveyor means in timed relationship with each other;

k. centering means movably mounted on the said supporting frame structure and movable laterally thereon and relative thereto in the path of travel of the said first or bottom cookies as they are moved by the said conveyor means along the said guideway or trackway between the said first or bottom cookie storage magazine or hopper and the said edible dispensing means for centering each of the said first or bottom cookies on and relative to the said guideway or trackway so as to center the said first or bottom cookies in properly centered position on the said guideway or trackway as they are moved into position at the said work station for the reception of a body of edible material from the said edible body dispensing means; and l. means for movably mounting the said centering means on the said supporting frame structure for movement laterally thereon and relative thereto.

14. An edible sandwich making machine as defined in claim 13 which includes a. second centering means movably mounted on the supporting frame structure and movable laterally thereon and relative thereto in the path of travel of the said edible sandwiches along the said guideway or trackway between the second or top cookie storage magazine or hopper and the said folding and wrapping means for centering the said edible sandwiches on and relative to the said guideway or trackway as they are moved along the said guideway or trackway by the said conveyor means from the said edible body dispensing means to the said folding and wrapping means; and b. means for movably mounting the said second centering means on the said supporting frame structure for movement laterally thereon and relative thereto.

15. A machine for making edible sandwiches as defined in claim 14, which includes a. resilient hold-down pressure means movably mounted on the said supporting frame structure in the path of travel of the said edible sandwiches from the said second or top cookie storage magazine or hopper to the said folding and wrapping means and adapted to engage the upper surface of the said second or top cookie in each of the said edible sandwiches and to apply pressure thereon as the said edible sandwiches are moved along the said guideway or trackway by the said conveyor means from the said second or top cookie storage magazine or hopper to the said folding and wrapping means and in which the said resilient hold-down pressure means includes b. a hold-down member having 1. a rear end portion which is pivotally mounted on the said supporting frame structure above the said guideway or trackway; and 2. a front end portion which projects downwardly and forwardly along the said guideway or trackway in the path of travel of the said edible sandwiches therealong.

16. A machine for making ice cream cookie sandwiches of the type which includes a body of flowable semi-frozen ice cream arranged between a first or bottom cookie and a second or top cookie, comprising a. a supporting frame structure;

b. a generally horizontally extending guideway or trackway supported by the said supporting frame structure and having a plurality of work stations arranged at intervals therealong;

c. a first or bottom cookie storage magazine or hopper mounted on the said supporting frame structure at the first one of the said work stations on and above the said guideway or trackway for dispensing the said first or bottom cookies one at a time from the said first or bottom cookie storage magazine or hopper onto the said guideway or trackway and for movement therealong to additional work stations;

d. a rotary ice cream extruder device rotatably mounted on the said supporting frame structure at a second one of the said work stations along and above the said guideway or trackway for extruding a measured body of flowable semi-frozen ice cream onto each of the said first or bottom cookies as it is moved along the said guideway or trackway from the said first or bottom cookie storage magazine into a position under the said rotary ice cream extruder device;

e. supply means for supplying flowable semi-frozen ice cream to the said rotary ice cream extruder device;

f. a second or top cookie storage magazine or hopper mounted on the said supporting frame structure above the said guideway or trackway and arranged at a third work station along the said guideway or trackway for dispensing a second or top cookie onto the said measured body of flowable semi-frozen ice cream at the said third work station to complete the said ice cream cookie sandwich;

g. means for wrapping a sheet of flexible, moisture-resistant wrapping material around the said ice cream cookie sandwich at another one of the said work stations;

h. conveyor means movably mounted on the said supporting frame structure for movement along the said guideway or trackway and including 1. article-advancing means carried by and movable with the said conveyor means along the said guideway of trackway for sequentially engaging and moving the said first or bottom cookies, and the said first or bottom cookies with a measured body of flowable semi-frozen ice cream thereon, and the assembled ice cream cookie sandwiches to and past the said work stations;

i. means for rotating the said rotary ice cream extruder device;

j. means for operating the said conveyor means and the said article-advancing means carried thereby in timed relationship with the rotation of the said rotary ice cream extruder device; and k. means coacting with the said supply means for controlling the volume of flowable semi-frozen ice cream which is fed into the said rotary ice cream extruder device and for synchronizing the flow of flowable semi-frozen ice cream with the speed of operation of the said machine.

17. A machine for making ice cream cookie sandwiches of the type which includes a body of flowable, semi-frozen ice cream arranged between a first or bottom cookie and a second or top cookie comprising a. a supporting frame structure;

b. a guideway or trackway on the said supporting frame structure and having a plurality of work stations arranged therealong;

c. a first or bottom cookie storage magazine at a first one of the said work stations and adapted to dispense the said first or bottom cookies sequentially therefrom onto the said guideway or trackway;

d. a generally cylindrical ice cream extruder device rotatably mounted on the said supporting structure at a second one of the said work stations for rotation above the said guideway or trackway and having 1. a peripheral surface facing toward the said guideway or trackway; and including 2. a plurality of radially arranged ice cream chamgers each adapted to hold a measured body of flowable semi-frozen ice cream and each having a. an ice cream inlet at its radially inner end, and each having b. a dispensing or discharge outlet at its radially outer end opening onto the said peripheral surface of said generally cylindrical ice cream extruder device and adapted to dispense a measured body of flowable semi-frozen ice cream from one of the said ice cream chambers onto one of the said first or bottom cookies;

h. first power transmission means for rotating the said generally cylindrical ice cream extruder device;

i. means for supplying flowable semi-frozen ice cream under pressure sequentially through the said ice cream inlets to each of the said ice cream chambers in the said generally cylindrical ice cream extruder device as the latter is rotated;

j. second power transmission means for operating the said conveyor means in timed relationship with the rotation of the said generally cylindrical ice cream extruder device; and k. single power means for operating the said first power transmission means and the said conveyor means, the means for supplying flowable semi-frozen ice cream through the ice cream inlets to each of the ice cream chambers in the ice cream extruder device, and the second power transmission means in timed relationship with each other.

18. A machine for making ice cream cookie sandwiches as defined in claim 17 which includes a. means for rotatably mounting the said generally cylindrical ice cream extruder device upon the said supporting frame structure relative to and above the said guideway or trackway; and b. means for adjusting the position of the said generally cylindrical rotary ice cream extruder device vertically upon the said supporting frame structure and relative to and above the said guideway or trackway.

19. A machine for making ice cream cookie sandwiches as defined in claim 17 in which a. each of the said ice cream chambers is generally triangular in radial cross section and has its smaller end portion at its radially inner and inlet end and has its larger end at its radially outer and dispensing or discharge outlet end.

20. A machine for making ice cream cookie sandwiches as defined in claim 17 in which the said generally cylindrical ice cream extruder device includes a. a generally cylindrical body member in which the said ice cream chambers are formed and having (1) a peripheral surface; and b. an annular rim member removably mounted on the peripheral surface of the said generally cylindrical body member and having the said dispensing or discharge outlets formed therein.

21. A machine for making ice cream cookie sandwiches as defined in claim 20 in which a. the said dispensing or discharge outlets formed in the said annular rim member are shaped to conform to the shape of the said first or bottom cookies and to the shape of the said second or top cookies and to the shape of the said body of frozen ice cream therebetween.

22. A machine for making ice cream cookie sandwiches as defined in claim 17 which includes a. means for removably mounting the said generally cylindrical ice cream extruder device upon the said supporting frame structure relative to and above the said guideway or trackway.

23. A machine for making ice cream cookie sandwiches as defined in claim 17 in which a. the said means for supplying flowable semi-frozen ice cream under pressure through the said ice cream inlets to each of the said ice cream chambers in the said generally cylindrical ice cream extruder device includes 1. a tubular flowable semi-frozen ice cream supply member extending axially and centrally through the said generally cylindrical ice cream extruder device and having formed therein a. a discharge outlet having communication sequentially with the said ice cream inlets to said ice cream chambers as the said generally cylindrical ice cream extruder device is rotated;

2. pump means for pumping flowable semi-frozen ice cream under pressure through the said tubular frozen ice cream supply member and its said discharge outlet sequentially through the said ice cream inlets into each of the said ice cream chambers as the said ice cream extruder device is rotated; and 3. third power transmission means under the control of the said single power means for operating the said pump means.

24. A machine for making ice cream cookie sandwiches as defined in claim 23, in which a. the said discharge outlet in the said tubular ice cream supply member is positioned so that it has communication sequentially with each of the said ice cream inlets to the said ice cream chambers as the said generally cylindrical ice cream extruder device is rotates so that as a measured body of flowable semi-frozen ice cream is being dispensed from one of said ice cream chambers through its dispensing or discharge outlet the ice cream inlet into a second and following one of said ice cream chambers moves into communication with the said discharge outlet from the said tubular ice cream supply member.

25. A machine for making ice cream cookie sandwiches as defined in claim 17 in which a. the said first power transmission means for rotating the said generally cylindrical ice cream extruder device includes 1. flexible power transmission means; and in which the said machine includes b. means for maintaining a constant and uniform tension on the said flexible power transmission means for the said generally cylindrical ice cream extruder device as the said generally cylindrical ice cream extruder device is rotated.

26. A machine for making ice cream cookie sandwiches as defined in claim 25 which includes a. manually operable means coacting with the said mounting means and with the said flexible power transmission means for rotating the said generally cylindrical ice cream extruder device upon its said mounting means so as to synchronize the position of the said dispensing or discharge outlets in the said ice cream chambers relative to the movement of the said conveyor means and the position of the said first or bottom cookie as it is moved along the said guideway or trackway by the said conveyor means and into a position to have a measured body of frozen ice cream deposited therein from one of the said ice cream chambers.

27. A machine for making ice cream cookie sandwiches as defined in claim 17 which includes a. a supporting frame or carriage for the said generally cylindrical ice cream extruder device and its said mounting means; and b. means for vertically and adjustable mounting the said supporting frame or carriage and the said generally cylindrical ice cream extruder device and the said mounting means therefor on the said supporting frame or carriage to position the said generally cylindrical ice cream extruder device in various adjusted vertical position relative to and above the guideway or trackway.

28. A machine for making ice cream cookie sandwiches as defined in claim 17, which includes a. means rotatably mounted on the said supporting frame structure above the said guideway or trackway at a fourth one of the said work stations for supplying a web of flexible, moisture-resistant, heat-sealable sheet wrapping material as a wrapper around each of the said ice cream cookie sandwiches as they are moved sequentially along the said guideway or trackway by the said conveyor means past the said fourth work station;

b. means for wrapping and folding the said web of flexible, moisture-resistant, heat-sealable wrapping material as a wrapper sequentially around the said ice cream cookie sandwiches at another and fifth one of the said work stations;

c. heat-sealing means movably mounted on the said supporting frame structure at another and fifth one of said work stations and above the said guideway or trackway for heat-sealing the said flexible, moisture-resistant, heat-sealable wrapping material around the said ice cream cookie sandwiches at the said fifth one of the said work stations with heat-sealed portions of the said web of flexible, moisture-resistant, heat-sealable wrapping material joining the thus wrapped and heat-sealed ice cream cookie sandwiches together in a chain of the said wrapped and heat-sealed ice cream cookie sandwiches;

d. third power transmission means under the control of said single power means for operating the said heat-sealing means in timed relationship with the said conveyor means and the said generally cylindrical ice cream extruder device;

e. web-cutting or web-severing means movably mounted on the said supporting frame structure at a sixth one of the said work stations along and above the said guideway or trackway for cutting or severing the said heat-sealed portions of the said web of flexible, moisture-resistant, heat-selable wrapping material from each other in a chain of the said wrapped and heat-sealed ice cream cookie sandwiches; and f. fourth power transmission means under the control of the said single power means for operating the said web-cutting or web-severing means in timed relationship with the said conveyor means and with the said generally cylindrical ice cream extruder device and with the said heat-sealing means.

29. A machine for making ice cream cookie sandwiches as defined in claim 17, which includes a. web supply means arranged at one of the said work stations for supplying a web of flexible, moisture-resistant, heat-sealable material to the said ice cream cookie sandwiches as they are moved sequentially along the said guideway or trackway by the said conveyor means;

b. wrapping and folding means arranged at a further and fifth one of the said work stations for sequentially wrapping and folding the said flexible, moisture-resistant, heat-sealable material around the said ice cream cookie sandwiches as they are moved sequentially along the said guideway or trackway by the said conveyor means;

c. heat-sealing means arranged at another and sixth one of the said work stations for heat-sealing the said flexible, moisture-resistant, heat-sealable wrapping material sequentially around each of the said ice cream cookie sandwiches;

d. web-mounting means for rotatably supporting the said web of the said flexible, moisture-resistant, heat-sealable wrapping material on the said supporting frame structure above the said guideway or trackway; and e. adjusting means for adjusting the said web-mounting means transversely of the said guideway or trackway to support webs of said flexible, moisture-resistant, heat-sealable wrapping material of varying widths for wrapping ice cream cookie sandwiches of varying sizes.

30. A machine for making ice cream cookie sandwiches as defined in claim 17, in which a. each of the said ice cream dispensing or discharge outlets from the said ice cream chambers in the said generally cylindrical rotary extruder device has the form of the said first or bottom cookie onto which a measured body of frozen ice cream is extruded from each of the said ice cream chambers through the said ice cream dispensing or discharge outlet therefrom so that the body of frozen ice cream extruded from each of the said ice cream chambers through the said ice cream dispensing or discharge outlet therefrom is shaped and molded to conform to the shape of the said first or bottom cookie.

31. A machine for making ice cream cookie sandwiches as defined in claim 17, which includes a. scraper means arranged adjacent to and bearing against the said peripheral surface of the said generally cylindrical rotary ice cream extruder device for removing relatively soft ice cream from the peripheral surface of the said generally cylindrical rotary ice cream extruder device at the start-up of the operation of the said machine and when the supply of ice cream fed to the said generally cylindrical ice cream extruder device is relatively warm and soft.

32. A machine for making ice cream cookie sandwiches as defined in claim 31, which includes
   a. waste receptacle means arranged adjacent to the said scraper means for receiving said waste ice cream scraped from the peripheral surface of the said generally cylindrical ice cream extruder device by the said scraper means.

33. A machine for making edible sandwiches of the type which includes a pair of wafer-like edible members having a filler body of edible material disposed between the said pair of edible wafer-like members, comprising
   a. a supporting frame structure;
   b. a guideway or trackway supported by and extending along the said supporting frame structure and having a plurality of work station arranged at intervals therealong;
   c. means mounted on the said supporting frame structure at a first one of the said work stations for sequentially depositing a first or bottom one of the said pair of wafer-like edible members on the said guideway or trackway;
   d. edible body dispensing means movably mounted on the said supporting frame structure above the said guideway or trackway at a second one of the said work stations for sequentially depositing a measured quantity of said filler body of edible material onto the said first or bottom one of the said pair of wafer-like edible members;
   e. means mounted on the said supporting frame structure at a third one of the said work stations for sequentially depositing the second and top one of said pair of wafer-like edible members on the said filler body of edible material;
   f. conveyor means movably mounted on the said supporting frame structure for movement along and relative to the said guideway or trackway and embodying
      1. article-advancing means for engaging and advancing the said first or bottom one of said pair of wafer-like edible members from the said first work station to the said second one of said work stations for the deposit of the said filler body of edible material thereon and for advancing the said first or bottom one of the said wafer-like edible members with the said filler body of edible material thereon to the said third one of said work stations for the deposit of the second one of said pair of wafer-like edible members onto the said filler body of edible material;
   g. means mounted on the said supporting frame structure for operating the said edible body dispensing means;
   h. means mounted on the said supporting frame structure for operating the said conveyor means and the said article-advancing means embodied therein in timed relationship with the said means for operating the said edible body dispensing means;
   i. means mounted on the said supporting frame structure at another and fourth one of said work stations along the said guideway or trackway for supplying a web of flexible, moisture-resistant, heat-sealable wrapping material to each of the said edible sandwiches as they are moved sequentially along the said guideway or trackway by the said conveyor means and the said article-advancing means embodied therein;
   j. means mounted on the said supporting frame structure at a fifth one of said work stations along the said guideway or trackway for wrapping and folding the said web of flexible, moisture-resistant, heat-sealable wrapping material sequentially around each of the said edible sandwiches as they are moved sequentially along the said guideway or trackway by the said conveyor means and the said article-advancing means embodied therein;
   k. heat-sealing means movably mounted on the said supporting frame structure at another and sixth one of the said work stations along the said guideway or trackway for sequentially heat-sealing portions of the said web of flexible, moisture-resistant, heat-sealable wrapping material around each of the said edible sandwiches as they are moved along the said guideway or trackway by the said conveyor means and the said article-advancing means embodied therein with heat-sealed interconnecting portions of the said web of flexible, moisture-resistant, heat-sealable wrapping material joining the said edible sandwiches together in a chain of the same;
   l. web-cutting or web-serving means movably mounted on the said supporting frame structure at another and seventh one of the said work stations for cutting or severing the said heat-sealed interconnecting portions of the said web of flexible, moisture-resistant, heat-sealable wrapping material so as to cut or sever the thus wrapped and heat-sealed edible sandwiches from each other in the said chain of the same;
   m. means mounted on the said supporting frame structure for operating the said heat-sealing means in timed relationship with the said edible body dispensing means and with the said conveyor means and the said article-advancing means embodied therein; and
   n. means mounted on the said supporting frame structure for operating the said web-cutting or web-severing means in timed relationshop with the said conveyor means and the said article-advancing means embodied therein and with the said edible body dispensing means and with the said heat-sealing means.

34. A machine for making ice cream cookie sandwiches of the type which includes a body of frozen ice cream arranged between a first or bottom cookie and a second or top cookie comprising:
   a. a supporting frame structure;
   b. a guideway or trackway supported by said guideway or trackway and having a plurality of work stations arranged therealong;
   c. means for depositing first or bottom cookies sequentially onto the said guideway or trackway at a first one of the said work stations;
   d. a rotary ice cream extruder device rotatably mounted on the said supporting frame structure at a second one of the said work stations along and above the said guideway or trackway for dispensing a measured body of flowable semi-frozen ice cream sequentially onto each of the said first or bottom cookies;

e. means for rotatable mounting the said rotary ice cream extruder device on the said supporting frame structure;

f. conveyor means mounted on the said supporting frame structure and extending along the said guideway or trackway for sequentially moving each of the said first or bottom cookies along the said guideway or trackway from the said first work station to the second work station for the reception of a measured body of flowable semi-frozen ice cream from the said rotary ice cream extruder device;

g. the said rotary ice cream extruder device including 1. a generally cylindrical body having a peripheral surface and having therein
   a. a plurality of radially extending and circumferentially spaced ice cream chambers each extending radially inwardly from the said peripheral surface of the said generally cylindrical body and each having at its radially inner end
      1. an ice cream inlet;

h. means for rotating the said rotary ice cream extruder device including the said generally cylindrical body thereof;

i. means for supplying flowable semi-frozen ice cream to the said ice cream inlets to the said ice cream chambers in the said generally cylindrical body as the said generally cylindrical body is rotated;

j. the said generally cylindrical body having mounted thereon on its peripheral surface
   1. an annular member having therein
      a. a plurality of circumferentially spaced dispensing or discharge outlets each in registry with one of the said ice cream chambers in the said generally cylindrical body and each of the said dispensing or discharge outlets providing a dispensing or discharge outlet from one of the said ice cream chambers for dispensing a measured body of flowable semi-frozen ice cream onto the upper surface of one of the said first or bottom cookies as the said first or bottom cookies are moved sequentially along the guideway or trackway by the said conveyor means from the said first work station to the said second work station; and k. means arranged at another and third work station along the said guideway or trackway for depositing a second and top cookie onto the said measured body of flowable semi-frozen ice cream on the said first or bottom cookie.

35. A machine for making ice cream cookie sandwiches as defined in claim 34 in which
   a. the said annular member is removably mounted on the peripheral surface of the said generally cylindrical body of the said rotary ice cream extruder device; and which includes
   b. means for removably mounting the said annular member on the peripheral surface of the said generally cylindrical body of the said rotary ice cream extruder device.

36. A machine for making ice cream cookie sandwiches as defined in claim 35 in which
   a. the said dispensing or discharge outlets in the said annular member are shaped, sized and designed to form the body of flowable, semi-frozen ice cream extruded from each of the said ice cream chambers to corresponde in shape, size and design to the shape, size and design of the said first or bottom cookie.

37. A machine for making ice cream sandwich which includes a body of semi-frozen ice cream arranged upon and carried by a first edible protective and supporting or carrier member, comprising
   a. a supporting frame structure;
   b. a guideway or trackway supported by the said supporting frame structure and housing a plurality of work stations arranged therealong;
   c. a rotary extruder member rotatably mounted on the said supporting frame structure above the said guideway or trackway at one of the said work stations and having therein
      1. a plurality of food chambers each adapted to hold a measured volume of a flowable semi-frozen ice cream;
      2. each of the said food chambers in the said rotary extruder member housing therein
         a. an inlet for said flowable semi-frozen ice cream and having
         b. a dispensing outlet for the discharge of a measured body of the said flowable, semi-frozen ice cream onto the said first edible protective and supporting or carrier members as the said first edible protective and supporting or carrier members are moved sequentially along the said guideway or trackway into a position under the said rotary extruder member at the said one of the same work stations;
   d. means for rotatably mounting the said rotary extruder member upon the said supporting frame structure;
   e. means for feeding the said first edible protective and supporting or carrier members sequentially onto the said guideway or trackway at another one of the said work stations;
   f. conveyor means for sequentially moving the said first edible protective and supporting or carrier members sequentially along the said guideway or trackway to the said one work station for the reception of a measured body of the said flowable semi-frozen ice cream from one of the said dispensing outlets in the said rotary extruder member;
   g. means for supplying the said flowable semi-frozen ice cream to the said food chambers in the said rotary extruder member through the said inlets thereto; including
      1. a supply line for supplying the said flowable semi-frozen ice cream to the said inlets to the said food chambers in the said rotary extruder member; and
      2. a continuous storage unit in the form of a continuous flow ice cream maker-freezer for making semi-frozen flowable ice cream and supplying it under pressure through the said supply line to the said food chambers in the said rotary extruder member by way of the said inlets thereto;
   h. means arranged at another one of the said work stations along the said guideway or trackway for feeding a second protective member sequentially onto the said measured body of the said flowable semi-frozen ice cream;

i. folding and wrapping means for folding and wrapping a sheet of wrapping material around the said edible protective members with the said measured body of the said flowable semi-frozen ice cream arranged therebetween;

j. a pressure-relief valve arranged in the said supply line between the said continuous flow ice cream maker-freezer and the said rotary extruder member;

k. receptacle means arranged adjacent the said pressure relief valve for the reception of flowable semi-frozen ice cream discharged from the said supply line through the said pressure relief valve in advance of the said rotary extruder member;

l. means for rotating the said rotary extruder member; and m. means for operating the said conveyor means in timed relationship with the said rotary extruder member.

38. A machine for making an ice cream sandwich as defined in claim 37 which includes a. A hold-down means mounted on the said guideway or trackway below the said rotary extruder device and above the said conveyor means and in registry with the said dispensing outlets of the said rotary extruder device during the operation of dispensing a measured body of said flowable semi-frozen ice cream for holding the said first edible protective or carrier member and the said body of flowable, semi-frozen ice cream thereon on the said guideway or trackway and against adherence to the said rotary extruder member and against upward movement away from the said guideway or trackway by the said rotary extruder device.

39. A machine for making ice cream sandwiches as defined in claim 38 in which the said guideway or trackway includes a. spaced and substantially parallel guide or track rails each housing
  1. an upper surface along which the said first edible protective and supporting or carrier member is moved by the said conveyor means; and in which the said hold-down means includes b. a hold-down member mounted on each of the said guide or track rails and including
  1. a generally horizontally extending upper portion extending over and above the said upper surface of the corresponding one of said guide or track rails; and in which
  2. the said generally horizontally extending upper portions of the said hold-down members cooperate with the said guide or track rails to provide therebetween c. a channel through which the said first edible protective or carrier member is moved along the said guideway or trackway by the said conveyor means and in which said channel the said first edible protective or carrier member is held against adherence to the said rotary extruder member and against upward movement away from the guide guide or track rails by the said rotary extruder member and in a position to receive a measured body of the said flowable semi-frozen ice cream from one of the said dispensing outlets in the said rotary extruder member.

* * * * *